United States Patent
Kim et al.

(10) Patent No.: US 12,471,227 B2
(45) Date of Patent: Nov. 11, 2025

(54) DISPLAY DEVICE HAVING A TRANSPARENT DISPLAY PANEL AND FRAME TO WHICH THE DISPLAY PANEL IS COUPLED

(71) Applicant: LG ELECTRONICS INC., Seoul (KR)

(72) Inventors: Hoyoung Kim, Seoul (KR); Kwanghyun Ahn, Seoul (KR); Taegon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 18/509,063

(22) Filed: Nov. 14, 2023

(65) Prior Publication Data

US 2024/0179861 A1 May 30, 2024

(30) Foreign Application Priority Data

Nov. 30, 2022 (KR) .......... 10-2022-0164895
May 4, 2023 (KR) .......... 10-2023-0058417

(51) Int. Cl.
H05K 5/00 (2025.01)
H05K 5/02 (2006.01)

(52) U.S. Cl.
CPC .................. H05K 5/0217 (2013.01)

(58) Field of Classification Search
CPC ... H05K 5/0217; G06F 1/1601; G06F 1/1652; G09F 9/301
See application file for complete search history.

(56) References Cited

U.S. PATENT DOCUMENTS

| | | | |
|---|---|---|---|
| 10,314,183 B2 * | 6/2019 | Heo | G06F 1/1675 |
| 11,576,270 B2 * | 2/2023 | Rha | G09F 27/005 |
| 11,775,024 B1 * | 10/2023 | Jiang | F16M 11/046 |
| | | | 361/679.02 |
| 11,994,913 B2 * | 5/2024 | Jin | G06F 1/1601 |

(Continued)

FOREIGN PATENT DOCUMENTS

| KR | 10-2017-0006013 | 1/2017 | |
|---|---|---|---|
| KR | 20170006013 A * | 1/2017 | G09F 9/30 |

(Continued)

OTHER PUBLICATIONS

Korean Intellectual Property Office Application No. 10-2023-0058417, Office Action dated May 15, 2025, 5 pages.

*Primary Examiner* — Rockshana D Chowdhury
(74) *Attorney, Agent, or Firm* — LEE, HONG, DEGERMAN, KANG & WAIMEY

(57) ABSTRACT

A display device may include: a display panel; a frame to which the display panel is coupled; a roller extending along one side of the display panel; a cover unwound from or wound around the roller; a bar which is positioned behind the display panel, to which one end of the cover is fixed, and which is movably coupled to the frame; a pair of reels which opposite each other with respect to the roller; a driving assembly which rotates the pair of reels; and a pair of wires which are wound around or unwound from the pair of reels, and which are fixed to the bar, wherein the reel may include a groove which is formed in a helix shape on an outer circumferential surface of the reel, and around which the wire is wound or from which the wire is unwound.

15 Claims, 40 Drawing Sheets

(56) References Cited

U.S. PATENT DOCUMENTS

| | | | |
|---|---|---|---|
| 12,101,423 B2* | 9/2024 | Li | G06F 1/1624 |
| 12,249,259 B2* | 3/2025 | Kim | G09F 9/301 |
| 2017/0156219 A1* | 6/2017 | Heo | G02F 1/133305 |
| 2019/0064578 A1* | 2/2019 | Cho | H10K 77/111 |
| 2020/0135064 A1* | 4/2020 | Lee | G06F 1/1684 |
| 2021/0392765 A1* | 12/2021 | Pyo | G06F 1/181 |
| 2023/0225067 A1* | 7/2023 | Kim | H05K 5/0247 361/807 |

FOREIGN PATENT DOCUMENTS

| | | | | |
|---|---|---|---|---|
| KR | 10-2021-0083018 | | 7/2021 | |
| KR | 20210083018 A | * | 7/2021 | G06F 1/1652 |

\* cited by examiner

FIG. 19
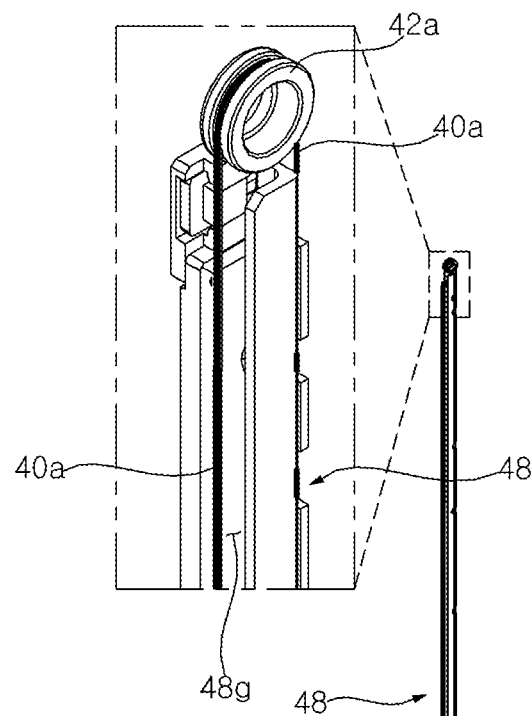
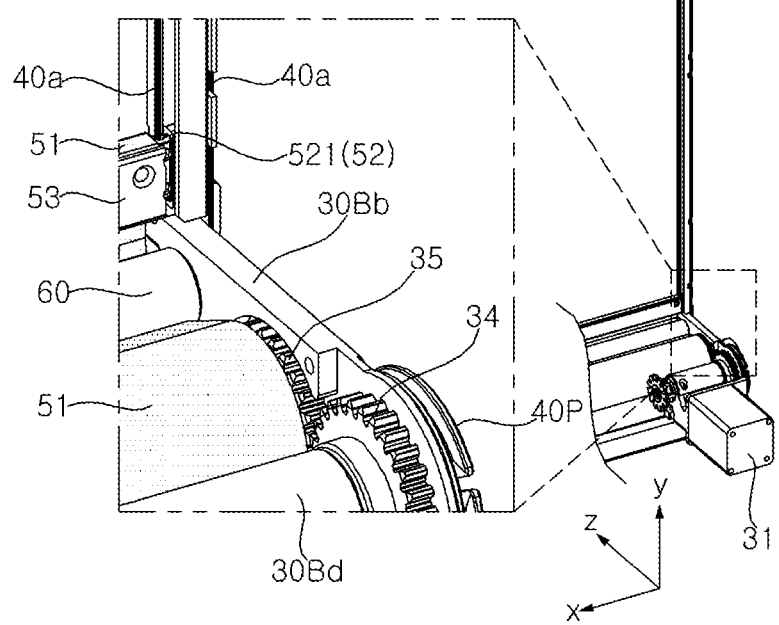

DISPLAY DEVICE HAVING A TRANSPARENT DISPLAY PANEL AND FRAME TO WHICH THE DISPLAY PANEL IS COUPLED

CROSS-REFERENCE TO RELATED APPLICATION

Pursuant to 35 U.S.C. § 119, this application claims the benefit of earlier filing date and right of priority to Korean Application Nos. 10-2022-0164895, filed on Nov. 30, 2022, and 10-2023-0058417, filed on May 4, 2023, the contents of which are all incorporated by reference herein in their entirety.

BACKGROUND OF THE INVENTION

Field of the Invention

The present disclosure relates to a display device, and more particularly, to a display device having a transparent display panel.

Description of the Related Art

As the information society develops, the demand for display devices is also increasing in various forms. In response to this, various display devices such as Liquid Crystal Display Device (LCD), Plasma Display Panel (PDP), Electroluminescent Display (ELD), Vacuum Fluorescent Display (VFD), and Organic Light Emitting Diode (OLED) have been researched and used in recent years.

Among these, a liquid crystal panel includes a TFT substrate and a color filter substrate that face each other with a liquid crystal layer interposed therebetween, and may display an image by using light provided from a backlight unit. In addition, an OLED panel may display an image by depositing an organic material layer capable of self-emitting light on a substrate on which a transparent electrode is formed.

Recently, many studies have been conducted on a transparent display panel capable of displaying an image to a user and allowing a user to see the back of the display panel.

SUMMARY OF THE INVENTION

It is an objective of the present disclosure to solve the above and other problems.

Another objective of the present disclosure may be to provide a display device having a transparent display panel.

Another objective of the present disclosure may be to provide a cover for opening or closing the rear of a transparent display panel and a mechanism thereof.

Another objective of the present disclosure may be to provide a structure capable of minimizing noise and wear that may occur during movement of a cover.

Another objective of the present disclosure may be to provide a structure capable of minimizing the inclination of a cover to one side.

Another objective of the present disclosure may be to provide a structure capable of applying tension to a cover unwound from a roller.

Another objective of the present disclosure may be to provide a structure capable of matching the length of a cover being unwound from a roller and the length of a wire being wound around a reel.

In accordance with an aspect of the present disclosure, a display device may include: a display panel displaying an image, and having a light transmittance; a frame to which the display panel is coupled; a roller extending along one side of the display panel, and rotatably coupled to the frame; a cover unwound from or wound around the roller; a bar which extends along the roller, which is positioned behind the display panel, to which one end of the cover is fixed, and which is movably coupled to the frame; a pair of reels which opposite each other with respect to the roller, and which are coupled to the frame; a driving assembly which rotates the pair of reels; and a pair of wires which are wound around or unwound from the pair of reels, and which are fixed to the bar, wherein the reel may include a groove which is formed in a helix shape on an outer circumferential surface of the reel, and around which the wire is wound or from which the wire is unwound.

BRIEF DESCRIPTION OF THE DRAWINGS

The above and other objects, features and advantages of the present disclosure will be more apparent from the following detailed description in conjunction with the accompanying drawings, in which:

FIGS. 1 to 40 are diagrams illustrating examples of a display device according to embodiments of the present disclosure.

DETAILED DESCRIPTION

Figure 1:
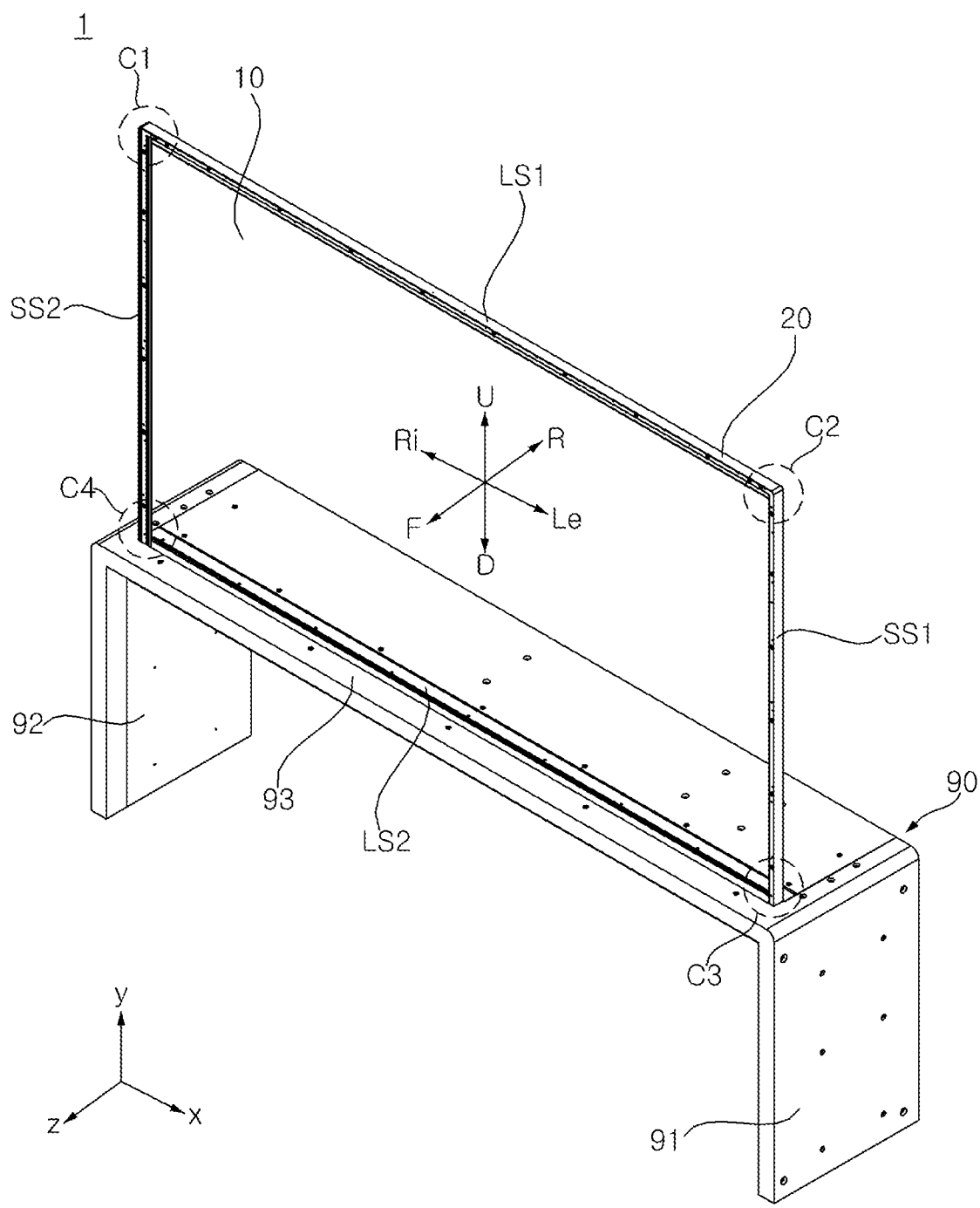

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the following description, even if the embodiment is described with reference to specific drawings, if necessary, reference numerals not appearing in the specific drawings may be referred to, and reference numerals not appearing in the specific drawings are used in a case where the above reference numerals appear in the other figures.

Direction indications of up (U), down (D), left (Le), right (Ri), front (F), and rear (R) shown in the drawings are only for convenience of explanation, and the technical concept disclosed in this specification is not limited thereto.

Referring to FIG. 1, the display device 1 may include a display 10, a side frame 20, and a housing 90. The display 10 may display an image. The side frame 20 may extend along the circumference of the display 10. The side frame 20 may be referred to as a frame 20. The housing 90 may be located below the display 10 and the side frame 20. Alternatively, the housing 90 may be located above, left, or right of the display 10 and the side frame 20. For example, the housing 90 may have a desk shape as a whole, and may include a top plate coupled to one side of the display 10 and legs 91 and 92 placed on a ground.

The display 10 may include a first long side LS1, a second long side LS2 opposite to the first long side LS1, a first short side SS1 adjacent to the first and second long sides LS1 and LS2, and a second short side SS2 opposite to the first short side SS1. Meanwhile, for convenience of description, it is illustrated that the lengths of the first and second long sides LS1 and LS2 are longer than the lengths of the first and second short sides SS1 and SS2, but it may also be possible that the lengths of the first and second long sides LS1 and LS2 are substantially equal to or longer than the lengths of the first and second short sides SS1 and SS2.

The long sides LS1 and LS2 and the short sides SS1 and SS2 of the display 10 may be formed in the side frame 20.

A direction parallel to the long sides LS1 and LS2 of the display 10 may be referred to as a left-right direction. A direction parallel to the short sides SS1 and SS2 of the display 10 may be referred to as an up-down direction. A direction perpendicular to the long sides LS1 and LS2 and the short sides SS1 and SS2 of the display 10 may be referred to as a front-rear direction.

A direction in which the display 10 displays an image may be referred to as front (F, z), and a direction opposite to this may be referred to as rear (R). The side of the first short side SS1 may be referred to as a left side (Le, x). The side of the second short side SS2 may be referred to as a right side Ri. The side of the first long side LS1 may be referred to as an upper side (U, y). The side of the second long side LS2 may be referred to as a lower side D.

The first long side LS1, the second long side LS2, the first short side SS1, and the second short side SS2 may be referred to as an edge of the display 10. A point where the first long side LS1, the second long side LS2, the first short side SS1, and the second short side SS2 meet each other may be referred to as a corner. A point where the first long side LS1 and the second short side SS2 meet may be referred to as a first corner C1. A point where the first long side LS1 and the first short side SS1 meet may be referred to as a second corner C2. A point where the second long side LS2 and the first short side SS1 meet may be referred to as a third corner C3. A point where the second long side LS2 and the second short side SS2 meet may be referred to as a fourth corner C4.

Hereinafter, a display panel using an organic light emitting diode (OLED) will be described as an example, but the display panel applicable to the present disclosure is not limited thereto.

Figure 2:
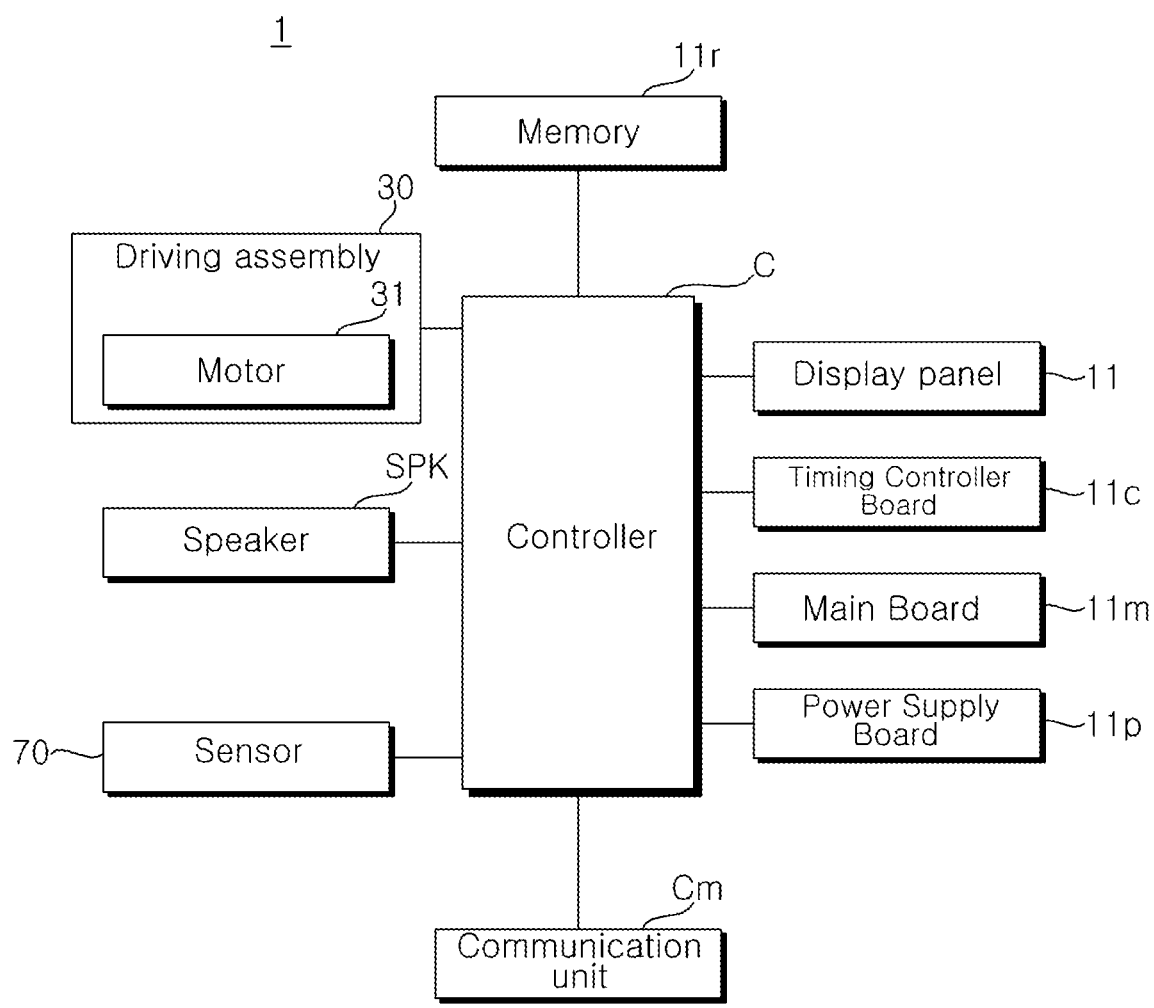

Referring to FIG. 2, a controller C of the display device 1 may control the operation of the display device 1. The controller C may be electrically connected to components of the display device 1. A display panel 11, a main board 11m, a power supply board 11p, and a timing controller board 11c may be installed in an inner space of the housing 90 (see FIG. 1), and electrically may be connected to the controller C. The main board 11m may control the display device 1. The controller C may be implemented as the main board 11m or may be a higher-level control unit that controls the main board 11m or the like. The power supply board 11p may provide power to each component of the display device 1. The timing controller board 11c may provide an image signal to the display panel 11.

A motor 31 of a driving assembly 30 may be electrically connected to the controller C. The controller C may control the operation of the motor 31. The controller C may control the rotation amount (rotation angle), rotation direction, and rotation speed of the motor 31. For example, the motor 31 may be a step motor.

A speaker SPK may be installed in the inner space of the housing 90. The speaker SPK may be electrically connected to the controller C. A speaker hole (not shown) may be formed in the housing 90, and the speaker SPK may provide sound through the speaker hole.

A communication unit Cm may transmit information of the display device 1 to an external device, or transmit various types of information or signals from an external device to the display device 1. The communication unit Cm may communicate with a remote control device, a portable terminal, a wired/wireless router, or other communication infrastructure (e.g., a server). For example, the communication unit Cm may perform wireless communication with an external device by using a communication technology such as IEEE 802.11 WLAN, IEEE 802.15 WPAN, UWB, Wi-Fi, Zigbee, Z-wave, and Blue-Tooth.

A memory 11r may be electrically connected to the controller C. The memory 11r may store basic data (e.g. basic specification information for each component of the display device, such as display resolution, brightness, and sound output value) for the display device 1, data and a program for controlling the operation of the display device 1, data input from outside, data processed by the control unit C, or the like. For example, the memory 11r may store information related to the operation of the motor 31. For example, the memory 11r may include ROM, RAM, EPROM, flash drive, hard drive, or the like. For example, the memory 11r may be classified as a sub-component of the controller C.

Meanwhile, a sensor 70 described later may be electrically connected to the controller C.

Figure 3:
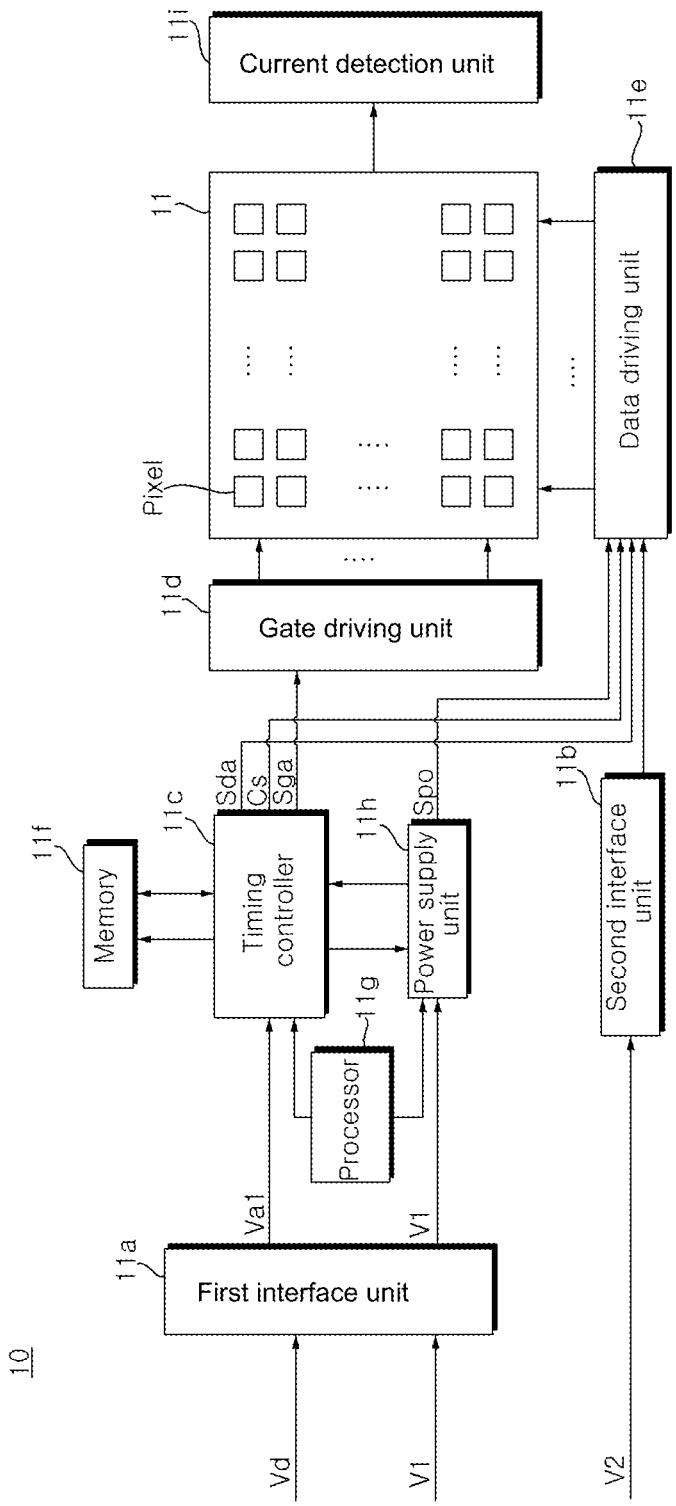

Referring to FIG. 3, the display 10 may include a display panel 11, a first interface unit 11a, a second interface unit 11b, a timing controller 11c, a gate driving unit 11d, a data driving unit 11e, a memory 11f, a processor 11g, a power supply unit 11h, and a current detection unit 11i. The display panel 11 may be an Organic Light Emitting Diode (OLED) panel.

The first interface unit 11a may receive a first DC power V1 from a power supply unit outside the display 10, and the first DC power V1 may be provided to the operations of the power supply unit 11h and the timing controller 11c.

The second interface unit 11b may receive second DC power V2 from a power supply outside the display 10, and the second DC power V2 may be provided to the data driving unit 11e.

The timing controller 11c may output a data driving signal Sda and a gate driving signal Sga, based on an image signal Vd input to the first interface unit 11a. For example, the first interface unit 11a may convert the image signal Vd and output a converted image signal Va1, and the timing controller 11c may output a data driving signal Sda and a gate driving signal Sga based on the converted image signal Val. Such a driving signal Sda may be a driving signal for subpixels of the display panel 11. In addition, the timing controller 11c may further output a control signal Cs to the data driving unit 11e.

The gate driving unit 11d and the data driving unit 11e may provide a scanning signal and an image signal to the display panel 11 through a gate line GL and a data line DL according to a gate drive signal Sga and a data drive signal Sda of the timing controller 11c. Accordingly, the display panel 11 may display an image.

The power supply unit 11h may provide various types of power to the gate driving unit 11d, the data driving unit 11e, and the timing controller 11c.

The current detection unit 11i may detect current flowing through a subpixel of the display panel 11. The detected current may be input to the processor 11g for cumulative current calculation. The calculated cumulative current may be stored in the memory 11f.

The processor 11g may perform various controls within the display 10. For example, the processor 11g may control the gate driving unit 11d, the data driving unit 11e, and the timing controller 11c.

Figure 4:
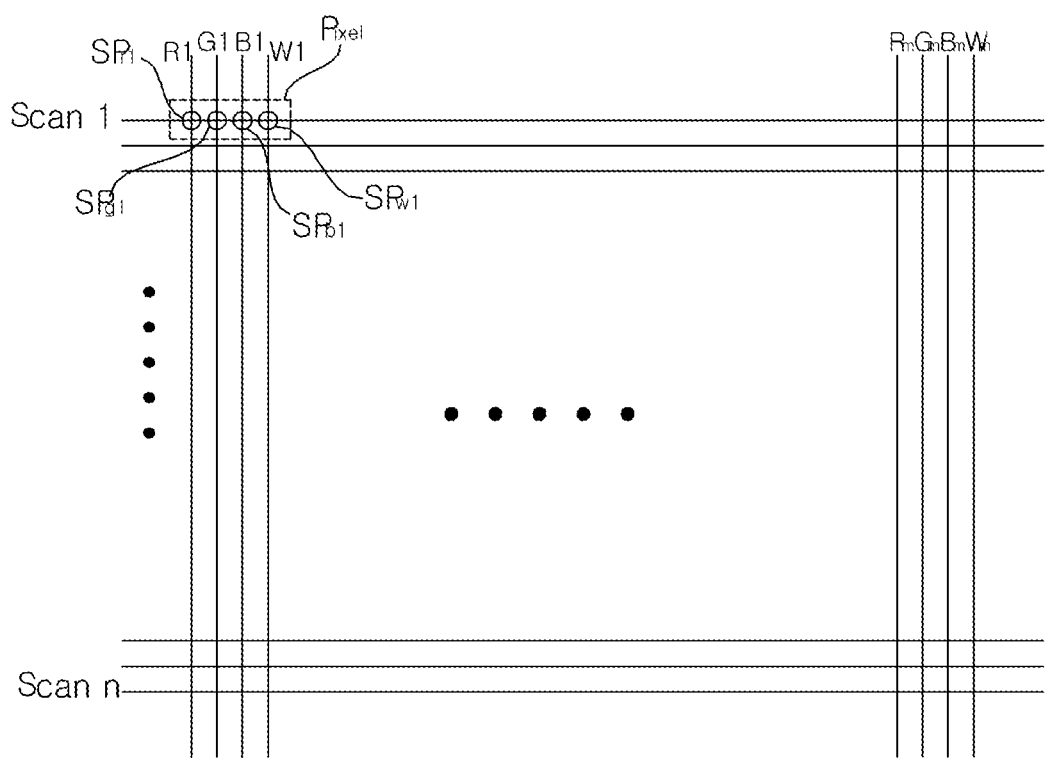
Figure 5:
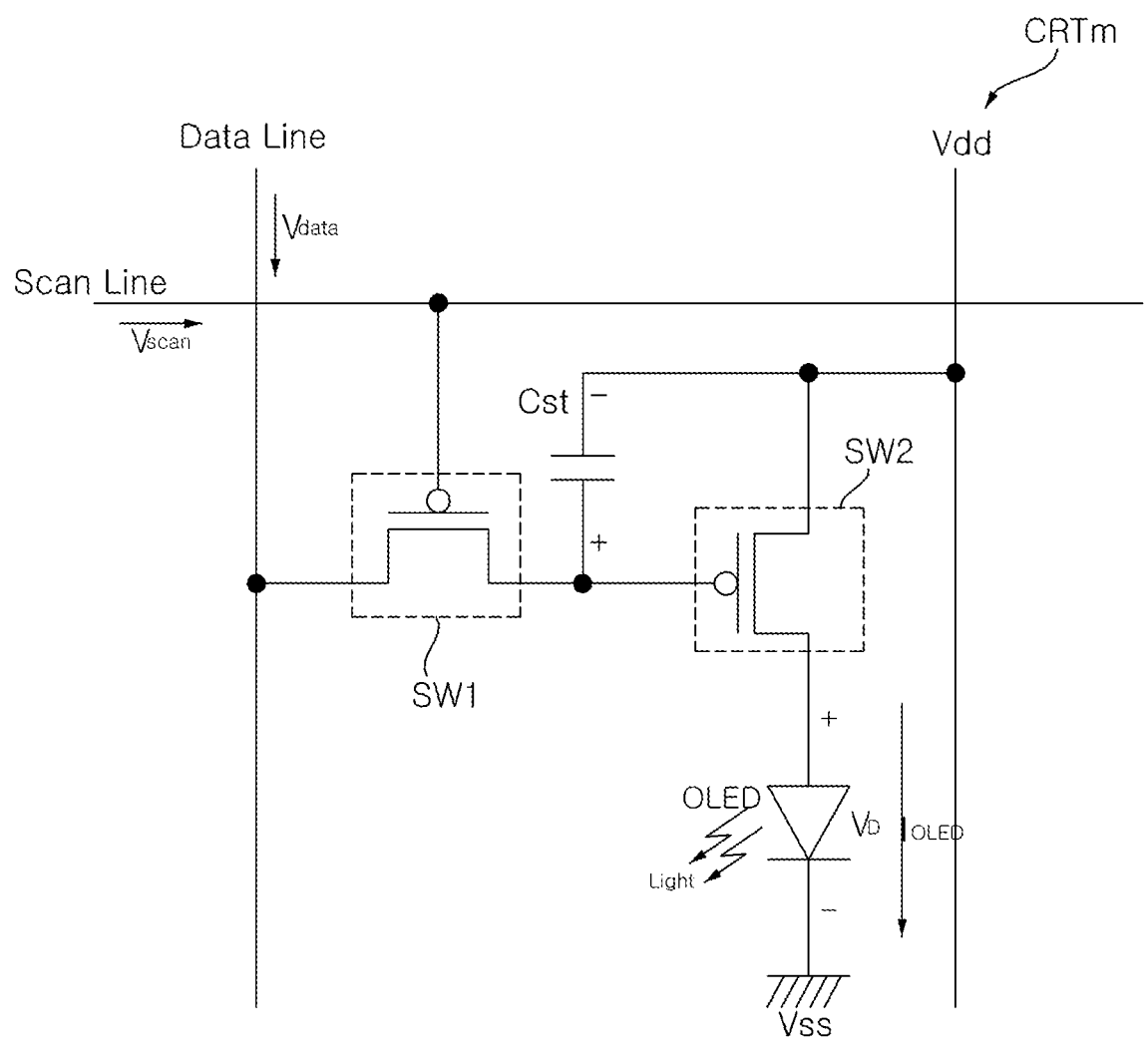

Referring to FIGS. 4 and 5, the display panel 11 may include a plurality of scan lines (Scan 1 to Scan n) and a plurality of data lines R1, G1, B1, W1 to Rm, Gm, Bm, Wm. The plurality of data lines R1, G1, B1, W1 to Rm, Gm, Bm, and Wm may intersect with the plurality of scan lines Scan 1 to Scan n. A subpixel may be defined in an intersection area of the scan line and the data line. The pixel may be a hold type element that continuously emits light from the organic light emitting layer OLED during a unit frame image, after a scan signal is applied. For example, a pixel may include RGBW subpixels. For another example, a pixel may include RGB subpixels.

The circuit CRTm of the subpixel is an active type, and may include a scan switching element SW1, a storage capacitor Cst, a driving switching element SW2, and an organic light emitting layer OLED.

The scan switching element SW1 may be turned on according to the scan signal Vscan input from the scan line. When the scan switching element SW1 is turned on, the scan switching element SW1 may transmit the data signal Vdata input from the data line to one end of the storage capacitor Cst or the gate terminal of the driving switching element SW2.

The storage capacitor Cst may be provided between the gate terminal and the source terminal of the driving switching element SW2, and may store a difference between the level of the data signal transmitted to one end of the storage capacitor Cst and the level of the DC power VDD transmitted to the other end of the storage capacitor Cst.

For example, if the data signal has a different level according to a Pulse Amplitude Modulation (PAM) method, the power level stored in the storage capacitor Cst may vary according to the level difference of the data signal Vdata.

For another example, if the data signal has a different pulse width according to a Pulse Width Modulation (PWM) method, the power level stored in the storage capacitor Cst may vary according to a difference in pulse width of the data signal Vdata.

The driving switch element SW2 may be turned on according to the power level stored in the storage capacitor Cst. When the driving switching element SW2 is turned on, the driving current IOLED proportional to the stored power level may flow through the organic light emitting layer OLED. Accordingly, the organic light emitting layer OLED may perform a light emitting operation.

The organic light emitting layer OLED may include an RGBW light emitting layer EML corresponding to a subpixel, include at least one of a hole injection layer HIL, a hole transport layer HTL, an electron transport layer ETL, or an electron injection layer EIL, and may also include a hole blocking layer HBL, or the like.

Meanwhile, although FIG. 5 shows p-type MOSFET as a scan switching element SW1 and a driving switching element SW2, a switching element such as a n-type MOSFET, JFET, IGBT, or SIC may be used.

Figure 6:
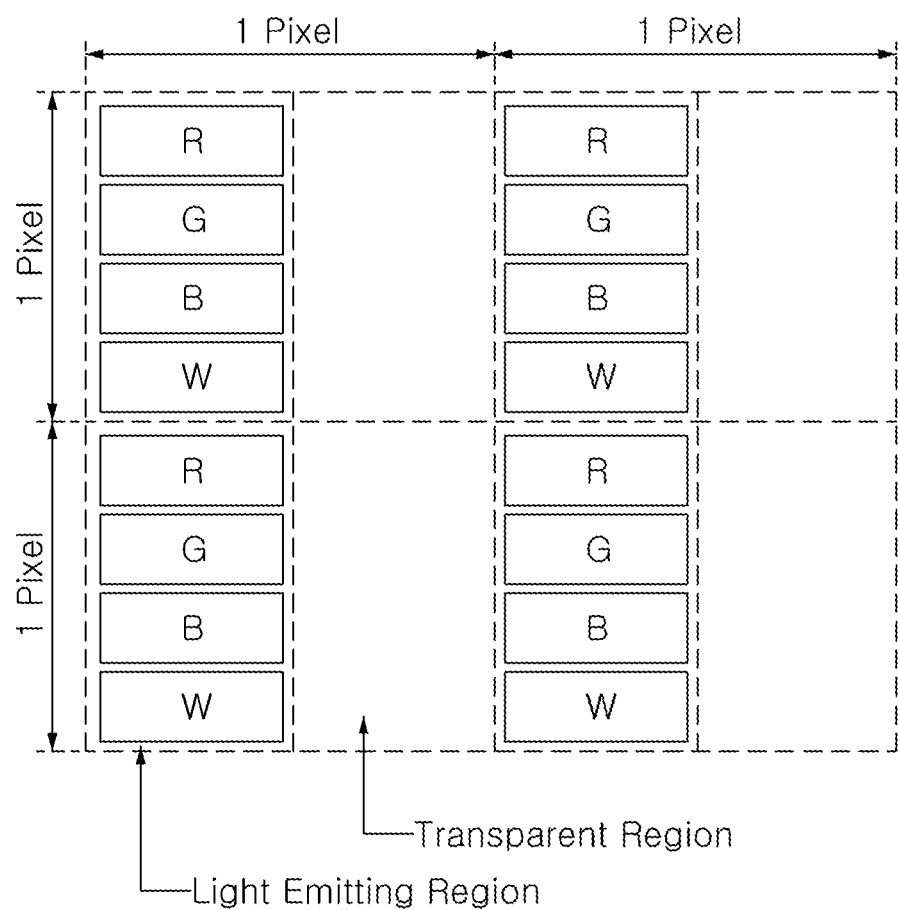

Referring to FIG. 6, a pixel may include a light emitting region and a transparent region. In the light emitting region, Red, Green, Blue, White (RGBW) subpixels may be disposed in a longitudinal direction, and the transparent region having no subpixel may be disposed next to the light emitting region.

Accordingly, the display panel 11 having a plurality of pixels may display an image and transmit light. The display panel 11 may be referred to as a transparent display panel or a transparent OLED panel.

Figure 7:
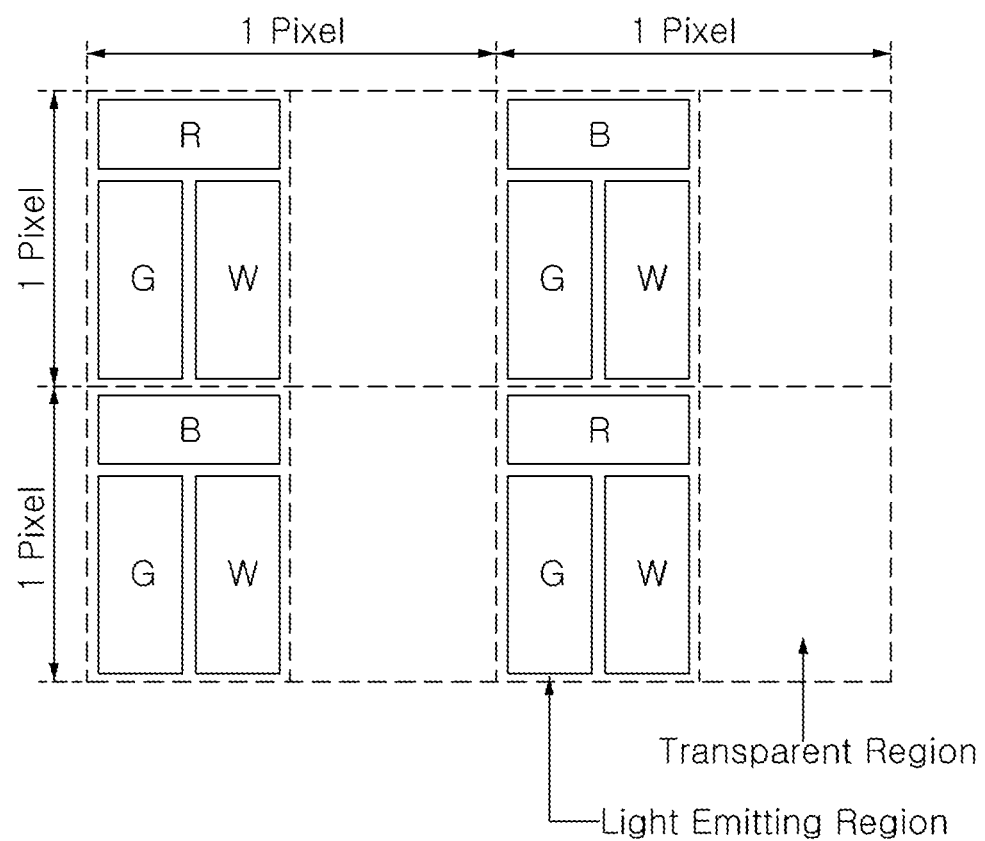

Referring to FIG. 7, a pixel may include a light emitting region and a transparent region. In the light emitting region, Red, Green, White (RGW) subpixels or Blue, Green, White (BGW) may be disposed adjacent to each other, and the transparent region having no subpixel may be disposed next to the light emitting region.

Accordingly, the display panel 11 having a plurality of pixels may display an image and transmit light. The display panel 11 may be referred to as a transparent display panel or a transparent OLED panel.

Figure 8:
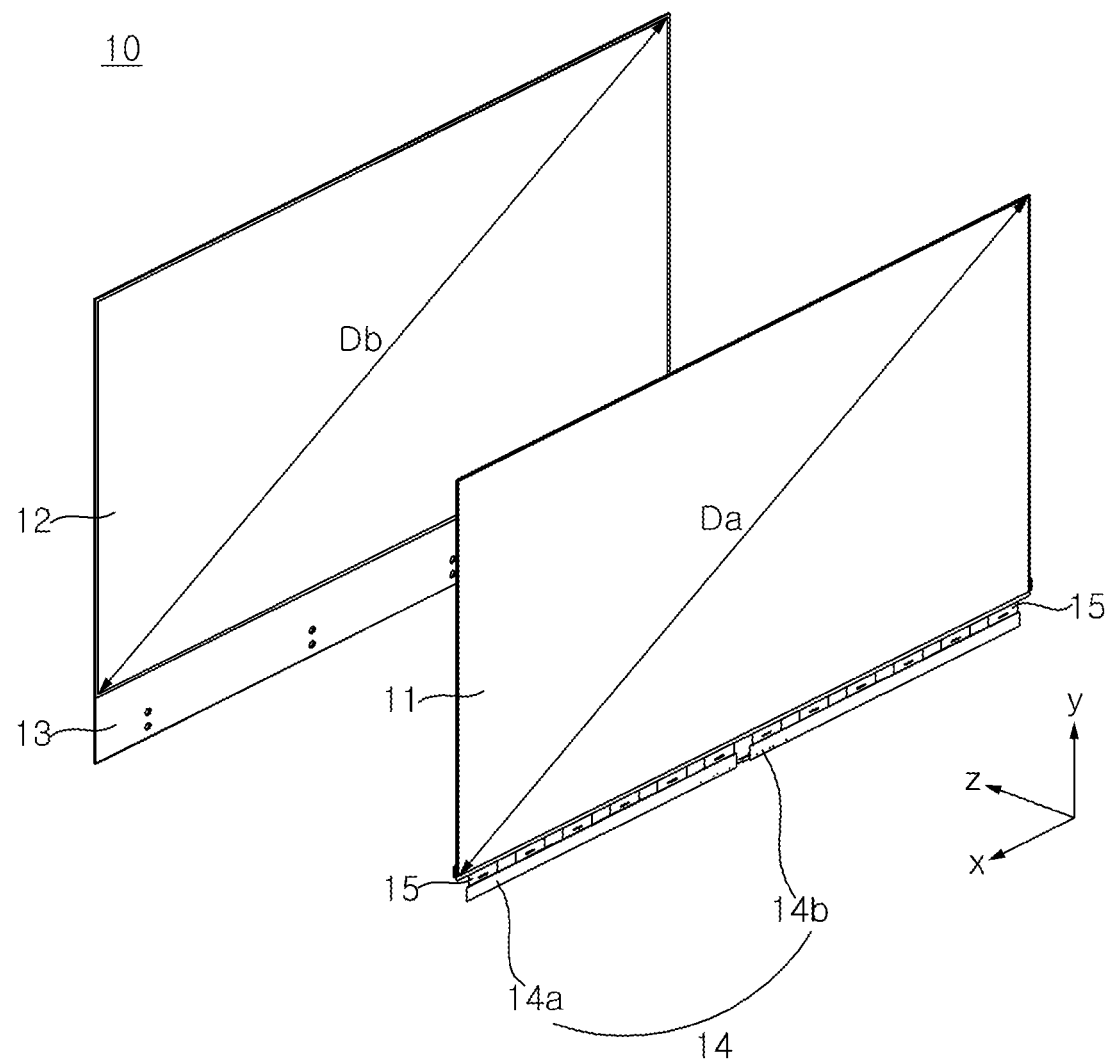

Referring to FIG. 8, the display panel 11 may divide an image into a plurality of pixels and output the image by adjusting color, brightness, and saturation for each pixel. The display panel 11 may be divided into an active area in which an image is displayed and a de-active area in which an image is not displayed. The display panel 11 may generate light corresponding to red (R), green (G), or blue (B) color according to a control signal.

A source PCB 14 may be adjacent to the lower side of the display panel 11. The source PCB 14 may extend along the lower side of the display panel 11. The source PCB 14 may be electrically connected to the display panel 11 through a chip on film (COF) 15. The source PCB 14 may be electrically connected to the timing controller board 11c (see FIG. 2) through a cable (not shown) such as a flexible flat cable (FFC).

A transparent panel 13 may be located in front of the display panel 11. The transparent panel 13 may be made of transparent glass. The transparent panel 13 may be referred to as a front panel 13. An adhesive film 12 may be located between the display panel 11 and the transparent panel 13, and may be coupled to the display panel 11 and the transparent panel 13. The adhesive film 12 may be an optically clear adhesive film (OCA film).

The display panel 11, the adhesive film 12, and the transparent panel 13 may be collectively referred to as the display 10.

Figure 9:
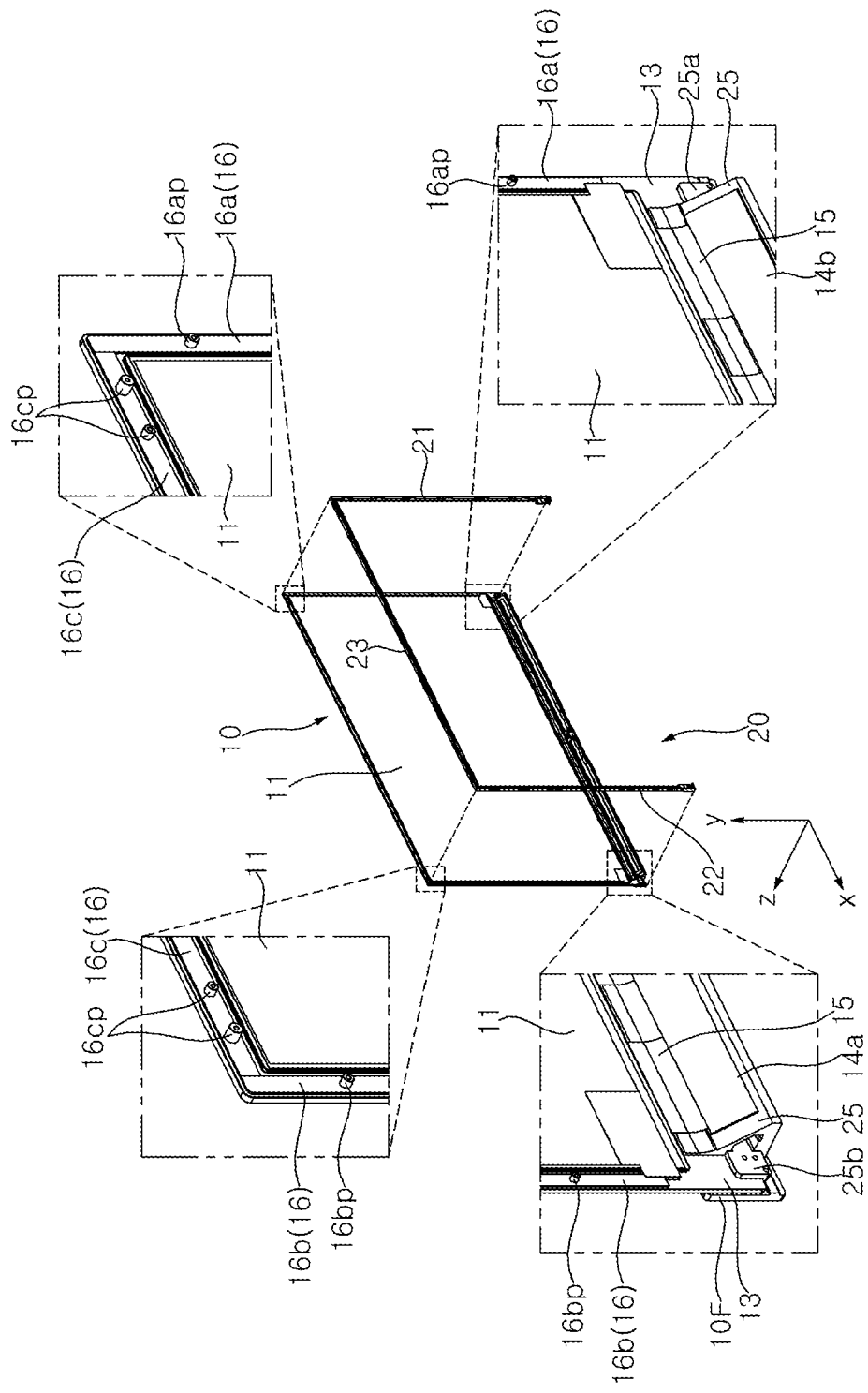

Referring to FIG. 9, a fixing member 16 may be adjacent to the circumference of the display panel 11, and may extend along the circumference of the display panel 11. For example, the fixing member 16 may be coupled to the rear surface of the adhesive film 12 (see FIG. 8) from the outside of the display panel 11.

A first fixing member 16a may extend along the right side of the display panel 11, and may be attached to or fixed to the rear surface of the transparent panel 13. A first fixing portion 16*ap* may protrude rearward from the first fixing member 16*a*.

A second fixing member 16*b* may extend along the left side of the display panel 11, and may be attached to or fixed to the rear surface of the transparent panel 13. A second fixing portion 16*bp* may protrude rearward from the second fixing member 16*b*.

A third fixing member 16*c* may extend along the upper side of the display panel 11, and may be attached to or fixed to the rear side of the transparent panel 13. A third fixing portion 16*cp* may protrude rearward from the third fixing member 16*c*.

A bracket 25 may extend along the lower side of the transparent panel 13, and may be attached to or fixed to the rear surface of the transparent panel 13. The bracket 25 may include a metal material such as aluminum Al. The bracket 25 may have a right-angled triangular cross-section. A COF 15 may be located between the lower side of the display panel 11 and the upper end of the bracket 25. A source PCB 14*a*, 14*b* may be located on the oblique side of the bracket 25. A first fixing portion 25*a* may protrude to the right from the right distal end of the bracket 25. A second fixing portion 25*b* may protrude to the left from the left distal end of the bracket 25.

Figure 10:
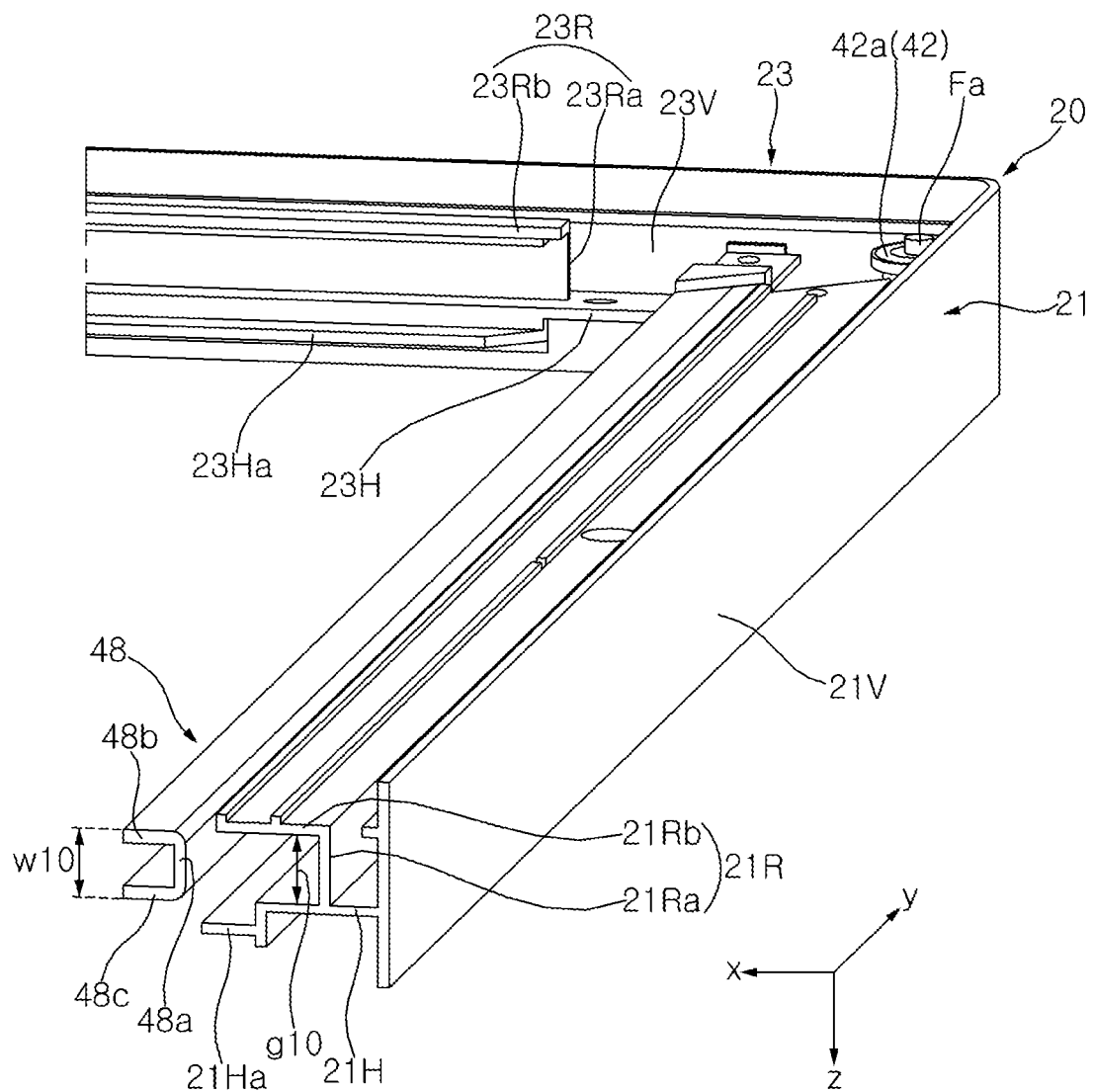

Referring to FIGS. 9 and 10, the side frame 20 may be located in a rear of the fixing member 16, and may extend along the fixing member 16. The side frame 20 may include a first side frame 21, a second side frame 22, and a third side frame 23.

The first side frame 21 may extend along the first fixing member 16*a*. The first side frame 21 may include a first horizontal portion 21H, a first vertical portion 21V, and a first rib 21R.

The first horizontal portion 21H may face the first fixing member 16*a*, and a fastening member such as a screw may penetrate the first horizontal portion 21H and be fastened to the first fixing portion 16*ap* of the first fixing member 16*a*.

The first vertical portion 21V may intersect the first horizontal portion 21H to define the second short side SS2, and may cover the right side of the first fixing member 16*a*.

A first vertical rib 21Ra of the first rib 21R may protrude rearward from the rear surface of the first horizontal portion 21H, and may extend along the first horizontal portion 21H. A first horizontal rib 21Rb of the first rib 21R may be bent from the rear end of the first vertical rib 21Ra to the opposite side of the first vertical portion 21V, and face the first horizontal portion 21H.

The second side frame 22 may extend along the second fixing member 16*b*. The second side frame 22 may be left-right symmetrical with the first side frame 21. That is, the second side frame 22 may include a second horizontal portion (fastened to the second fixing portion 16*bp*), a second vertical portion (cover the left side of the second fixing member 16*b*), and a second rib.

The third side frame 23 may extend along the third fixing member 16*c*. The third side frame 23 may include a third horizontal portion 23H, a third vertical portion 23V, and a third rib 23R.

The third horizontal portion 23H may face the third fixing member 16*c*, and a fastening member such as a screw may penetrate the third horizontal portion 23H and be fastened to the third fixing portion 16*cp* of the third fixing member 16*c*.

The third vertical portion 23V may intersect the third horizontal portion 23H to define the first long side LS1, and cover the upper side of the third fixing member 16*c*.

The third vertical rib 23Ra of the third rib 23R may protrude rearward from the rear surface of the third horizontal portion 23H, and may extend along the third horizontal portion 23H.

The third horizontal rib 23Rb of the third rib 23R may be bent from the rear end of the third vertical rib 23Ra to the opposite side of the third vertical portion 23V, and may face the third horizontal portion 23H.

For example, the first side frame 21, the second side frame 22, and the third side frame 23 may be formed as one body. The side frame 20 may cover lateral sides of the display panel 11.

Meanwhile, the lower end of the first side frame 21 may be coupled or fixed to the first fixing portion 25*a* of the bracket 25, and the lower end of the second side frame 22 may be coupled or fixed to the second fixing portion 25*b* of the bracket 25. Alternatively, the bracket 25 may also be formed as one body with the side frame 20.

Referring back to FIG. 10, a first rail 48 may extend along the first side frame 21. The first rail 48 may have a C-shaped cross section. The first rail 48 may include a side part 48*a*, a rear part 48*b*, and a front part 48*c*. The side part 48*a* may face the inside of the first vertical rib 21Ra. The rear part 48*b* may be bent from the rear end of the side part 48*a*, and may face the inside of the first horizontal rib 21Rb. The front part 48*c* may be bent from the front end of the side part 48*a*, and may face the inside of the first horizontal portion 21H. The distance w10 between the front and rear surfaces of the first rail 48 may be equal to or similar to the distance g10 between the first horizontal rib 21Rb and the first horizontal portion 21H. A guide groove 48*g*, 49*g* (see FIGS. 19 and 20) may be formed between the rear part 48*b* and the front part 48*c*.

In this case, the first rail 48 may be inserted and coupled to between the first horizontal rib 21Rb and the first horizontal portion 21H. A second rail 49 described later may be left-right symmetrical with the first rail 48 (see FIGS. 13 and 14). The second rail 49 may be coupled to the second side frame 22.

Figure 11:
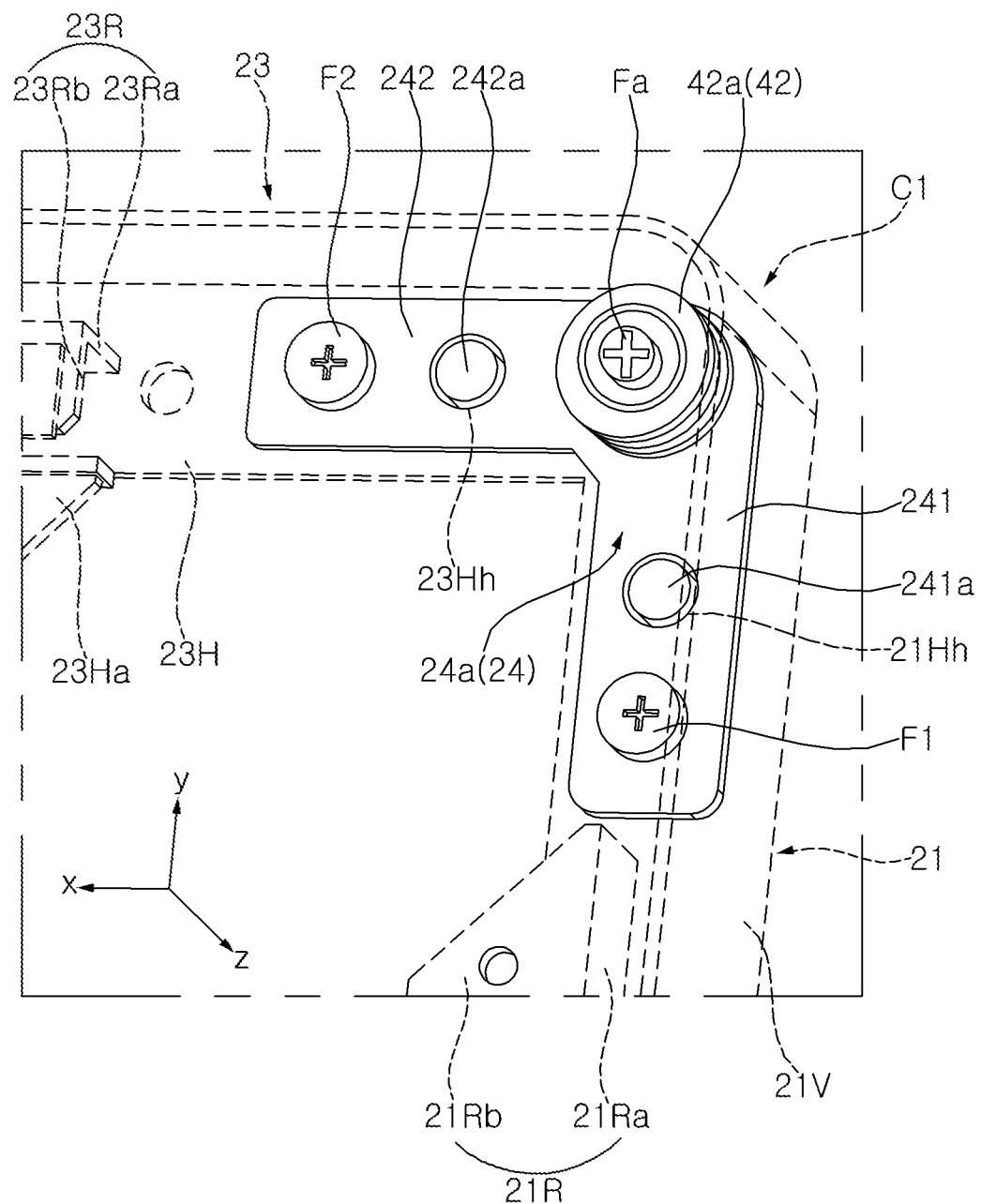

Referring to FIG. 11, a corner brace 24 may be located at both ends of the third side frame 23. A first corner brace 24*a* may be adjacent to the first corner C1 and may be connected to the third side frame 23 and the first side frame 21. A second corner brace 24*b* (see FIG. 17) may be adjacent to the second corner C2 (see FIG. 1), and may be connected to the third side frame 23 and the second side frame 22 (see FIG. 9). The second corner brace 24*b* may be left-right symmetrical with the first corner brace 24*a*.

Specifically, the corner brace 24 may have an L shape as a whole. The first part 241 may extend parallel to the first side frame 21 or the second side frame 22, and may be referred to as a vertical part 241. The second part 242 may extend parallel to the third side frame 23, and may be referred to as a horizontal part 242. The first part 241 may be located in the front surface of the first horizontal portion 21H of the first side frame 21, and a first protrusion 241*a* of the first part 241 may penetrate a hole 21Hh of the first horizontal portion 21H. A first fastening member F1, such as a screw, may penetrate the first horizontal portion 21H and be fastened to the first part 241. The second part 242 may be located in the front surface of the third horizontal portion 23H of the third side frame 23, and a second protrusion 242*a* of the second part 242 may penetrate a hole 23Hh of the third horizontal portion 23H. A second fastening member F2, such as a screw, may penetrate the third horizontal portion 23H and be fastened to the second part 242.

Accordingly, the first corner brace 24a may be coupled to the first side frame 21 and the third side frame 23, and may minimize the separating or twisting of the first side frame 21 and the third side frame 23. Similarly, the second corner brace 24b (see FIG. 17) may be coupled to the second side frame 22 and the third side frame 23, and may minimize the separating or twisting of the second side frame 22 and the third side frame 23.

Figure 12:
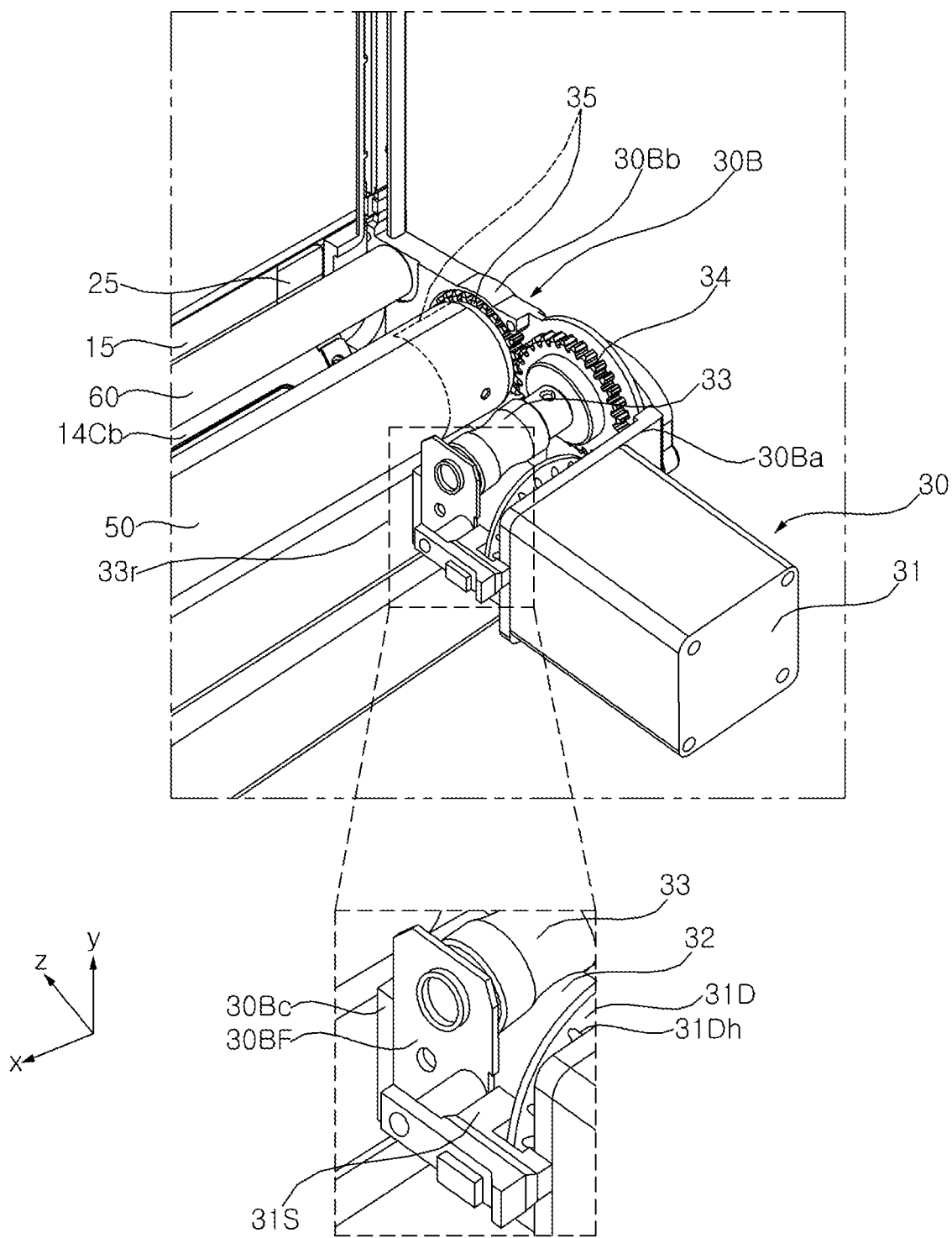
Figure 13:
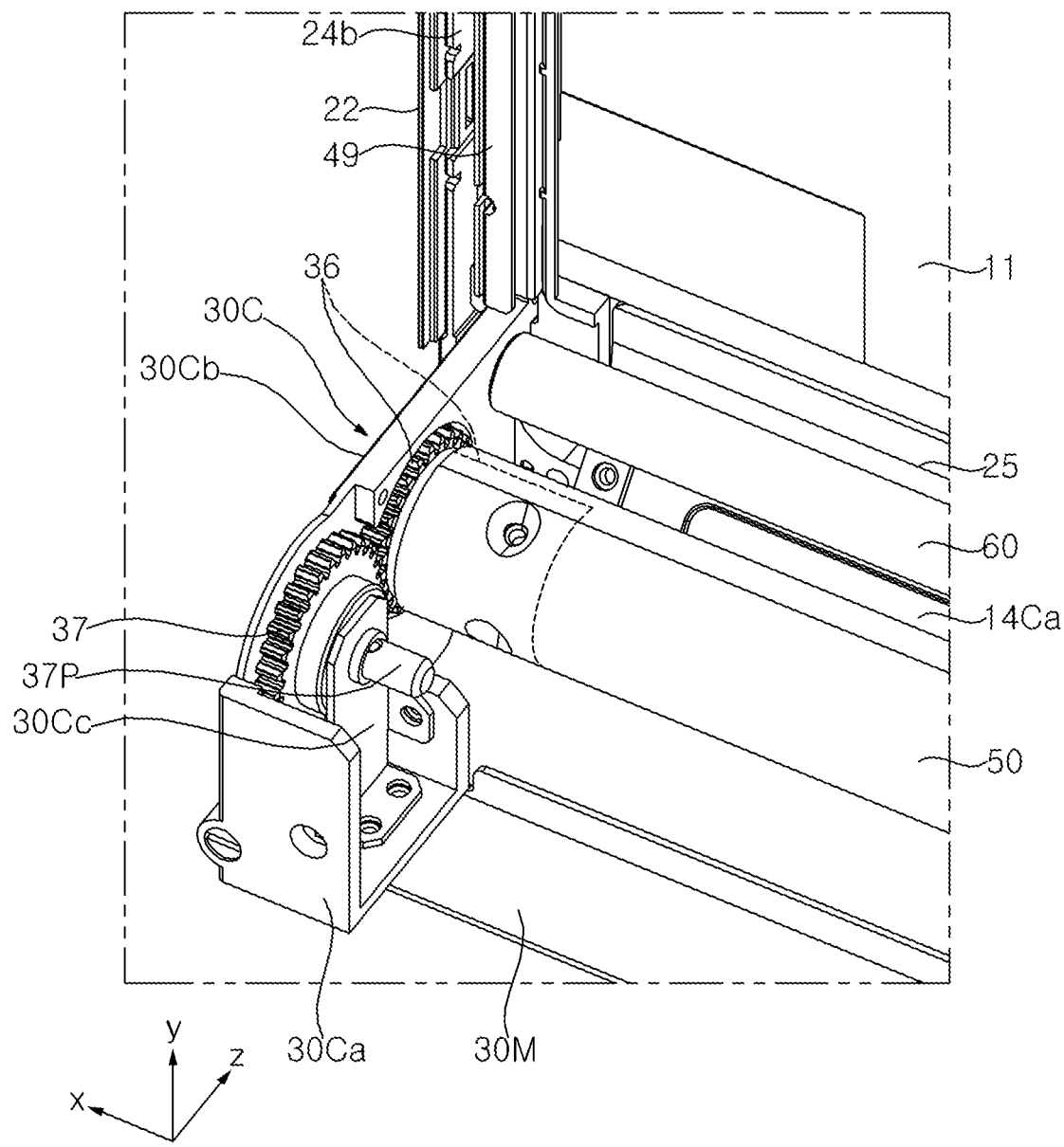

Referring to FIGS. 12 and 13, the driving assembly 30 may include a base 30M, a first mount 30B, a second mount 30C, a motor 31, a worm 32, a worm wheel 33, a first gear 34, a second gear 35, a third gear 36, and a fourth gear 37. The base 30M and the mount 30B may be collectively referred to as a frame 30M, 30B. The driving assembly 30 may be adjacent to the lower side of the display panel 11.

Alternatively, the driving assembly 30 may be adjacent to the upper, left, or right side of the display panel 11. For example, a roller 50 described below may be adjacent to the lower side of the display panel 11, and wire reels 40P and 40Q described later may be adjacent to the upper side of the display panel 11. In this case, wires 40a and 40b described later may pull a bar 52 and a cover 51 upward while being wound around the wire reels 40P and 40Q.

The base 30M may be located in a rear of the bracket 25. The base 30M may be a long plate in a left-right direction, and may be fixed to the inside of the housing 90 (see FIG. 1).

The first mount 30B may be fixed on the base 30M, and may be adjacent to the right end of the base 30M. The first mount 30B may include a first rear part 30Ba, a first side part 30Bb, and a first support part 30Bc.

The second mount 30C may be fixed on the base 30M, and may be adjacent to the left distal end of the base 30M. The second mount 30C may include a second rear part 30Ca, a second side part Cb, and a second support part 30Cc.

The motor 31 may be located in a rear of the first rear part 30Ba. The motor 31 may provide rotational force. The motor 31 may be an electric motor capable of adjusting rotation direction, rotation angle, and rotation speed. A rotation axis of the motor 31 may extend in the front-rear direction and may penetrate the first rear part 30Ba.

The worm 32 may be located between the first side part 30Bb and the first support part 30Bc. One end of the worm 32 may be fixed to the rotation axis of the motor 31, and may rotate together with the rotation axis. A screw-shaped gear teeth may be formed on the outer circumferential surface of the worm 32, and the worm 32 may be referred to as a worm shaft 32.

The worm wheel 33 may be located between the first side part 30Bb and the first support part 30Bc, and may be located above the worm 32. The worm wheel 33 may be engaged with the gear teeth of the worm 32. The rotation axis of the worm wheel 33 may be orthogonal to the rotation axis of the worm 32. Here, the rotation axis of the worm 32 may extend in the front-rear direction, and the rotation axis of the worm wheel 33 may extend in the left-right direction. The worm wheel 33 may be a helical gear.

The first gear 34 may be fixed to one end of the worm wheel 33. The rotation axis of the first gear 34 may be coaxial with the rotation axis of the worm wheel 33. The first gear 34 may be a spur gear. In addition, the first gear 34 may be in contact with or adjacent to the inside of the first side part 30Bb. A shaft 34a (see FIG. 14) of the first gear 34 may penetrate the first side part 30Bb, and provide a rotation axis of the first gear 34.

The second gear 35 may be located in front of the first gear 34, and engaged with the first gear 34. The rotation axis of the second gear 35 may be parallel to the rotation axis of the first gear 34. Accordingly, the second gear 35 may rotate together with the first gear 34. The second gear 35 may be a spur gear. In addition, the second gear 35 may be in contact with or adjacent to the inside of the first side part 30Bb. A shaft of the second gear 35 may penetrate the first side part 30Bb, and provide a rotation axis of the second gear 35.

A roller 50 may be elongated in a left-right direction parallel to the rotation axis of the second gear 35. The roller 50 may have a cylindrical shape. The second gear 35 may be fixed to the right distal end of the roller 50. Accordingly, the roller 50 may be rotated together with the second gear 35.

The third gear 36 may be fixed to the left distal end of the roller 50. The rotation axis of the third gear 36 may be parallel to the longitudinal direction of the roller 50. Accordingly, the third gear 336 may rotate together with the roller 50. The third gear 36 may be a spur gear. In addition, the third gear 36 may be in contact with or adjacent to the inside of a second side part 30Cb. A shaft of the third gear 36 may penetrate the second side part 30Cb, and provide a rotation axis of the third gear 36.

The fourth gear 37 may be located in a rear of the third gear 36, and may be engaged with the third gear 37. The rotation axis of the fourth gear 37 may be parallel to the rotation axis of the third gear 36. Accordingly, the fourth gear 37 may be rotated together with the third gear 36. The fourth gear 37 may be a spur gear. In addition, the fourth gear 37 may be located between the second side part 30Cb and the second support part 30Cc, and may be in contact with or adjacent to the inside of the second side part 30Cc. A shaft 37a (see FIG. 15) of the fourth gear 37 may penetrate the second side part 30Cb, and provide a rotation axis of the fourth gear 37. A pin 37P of the fourth gear 37 may be opposite to the shaft 37a, and rotatably coupled to the second support part 30Cc.

Meanwhile, as geared to the above-described motor 31, worm 32, and worm wheel 33 and first gear 34, the additionally provided motor 31, worm 32, and worm wheel 33 may be geared to the fourth gear 37. Even in this case, the first gear 34 and the fourth gear 37 may be rotated in the same direction.

Figure 14:
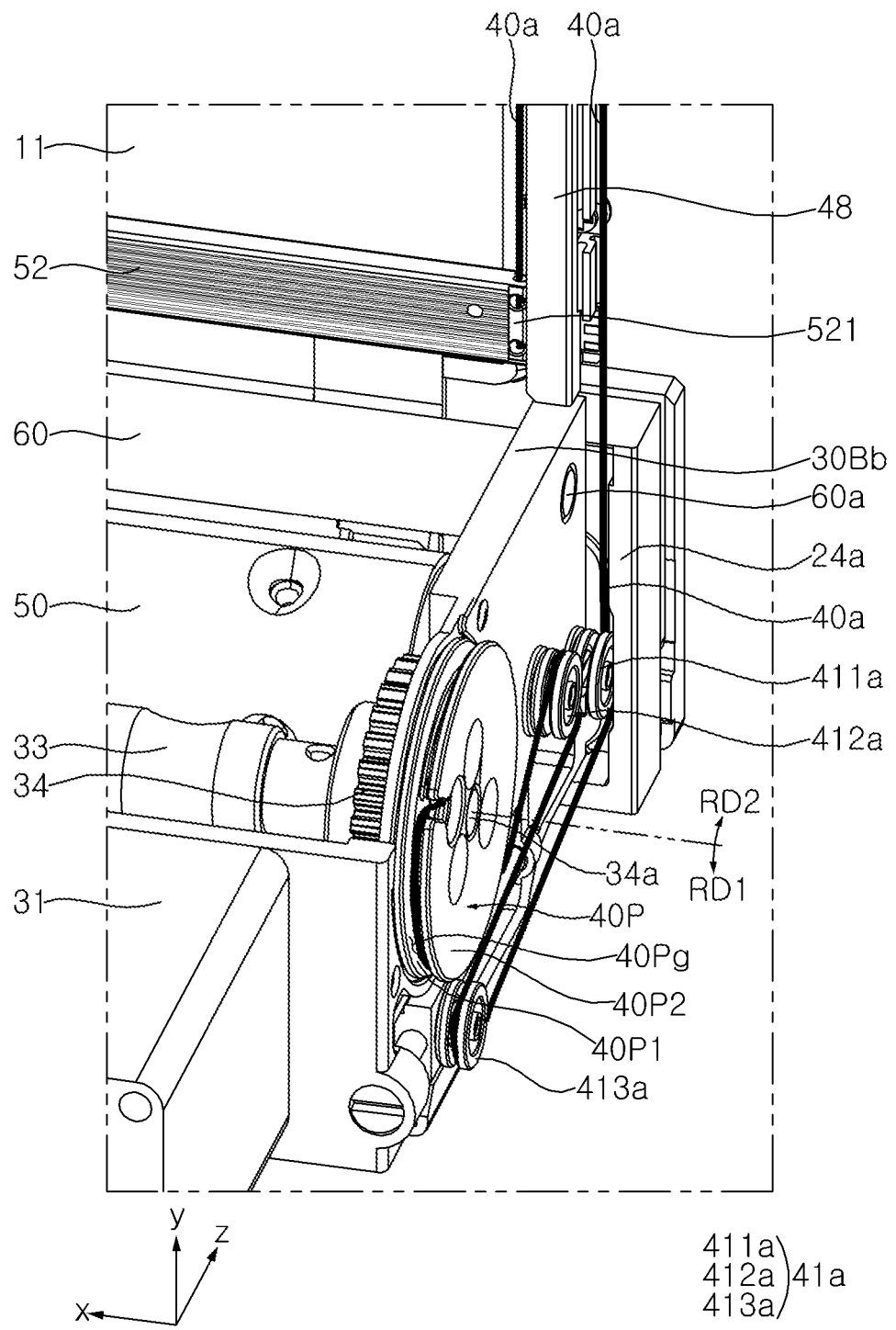
Figure 15:
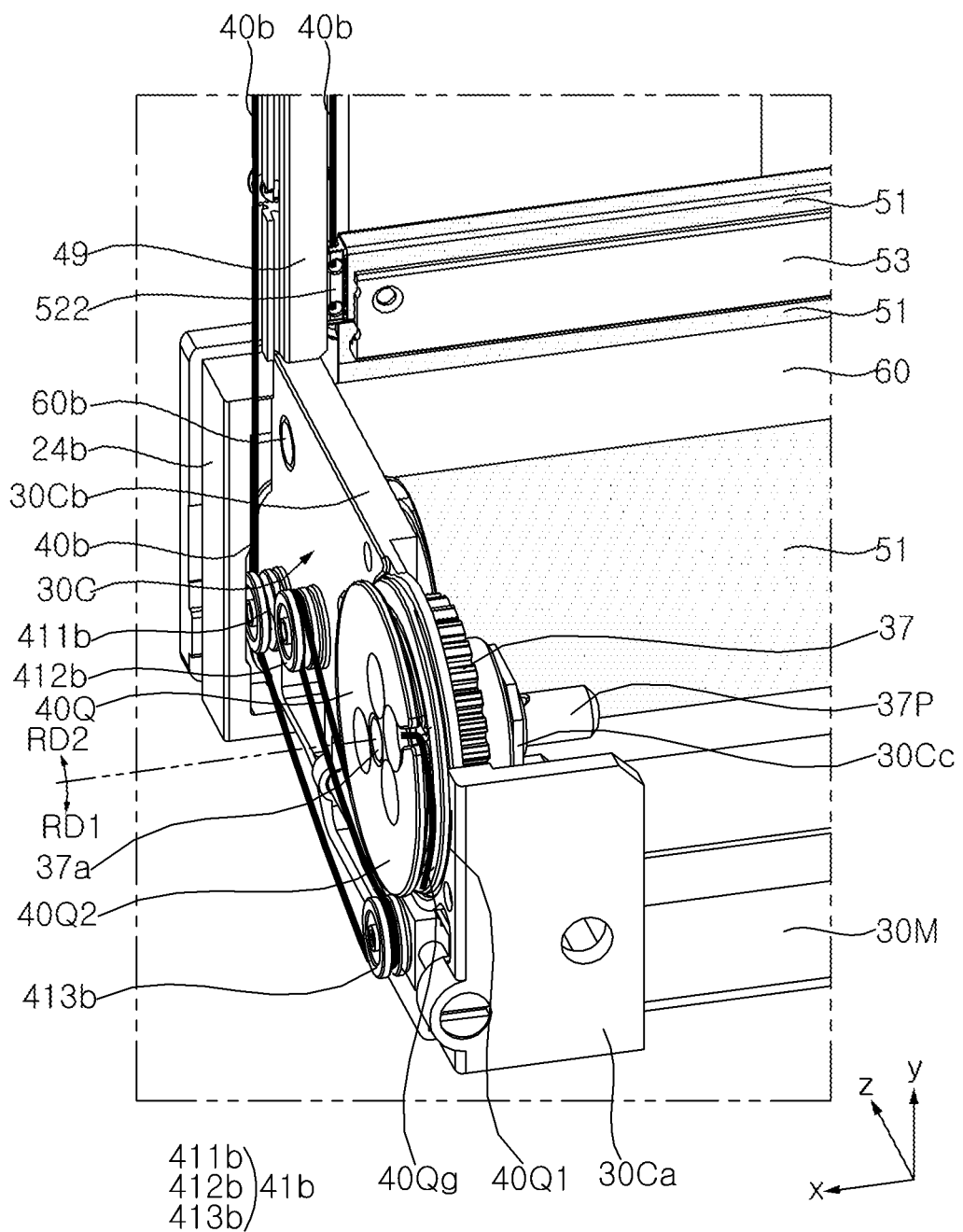

Referring to FIGS. 14 and 15, a sub roller 60 may elongated in the left-right direction which is the longitudinal direction of the roller 50. The sub roller 60 may have a cylindrical shape. The sub roller 60 may be located between the roller 50 and the display panel 11. The sub roller 60 may be referred to as an auxiliary roller 60. A first shaft 60a of the sub roller 60 may penetrate the first side part 30Bb. The first shaft 60a may provide a rotation axis of the sub roller 60. Alternatively, the sub roller 60 may be fixed to the first side part 30Bb. A second shaft 60b of the sub roller 60 may penetrate the second side part 30Cb. The second shaft 60b may provide a rotation axis of the sub roller 60. Alternatively, the sub roller 60 may be fixed to the second side part 30Cb.

A first wire reel 40P may have a flat cylinder shape as a whole, and a first groove 40Pg may be formed on an outer circumferential surface of the first wire reel 40P. The first wire reel 40P may be rotatably coupled to an outer lateral surface of the first side part 30Bb, and may be fixed to the shaft 34a of the first gear 34. Accordingly, the first wire reel 40P may be rotated together with the first gear 34. The first wire reel 40P may be referred to as a first reel 40P or a first wire drum 40P. The first wire reel 40P may include a plastic or POM material.

A first lower pulley 41a may be rotatably coupled to or fixed to an outer lateral surface of the first side part 30Bb.

The rotation axis of the first lower pulley 41a may be parallel to the rotation axis of the first and second gears 34 and 35. A first guide pulley 411a may be adjacent to the front end of the first side part 30Bb. A first tension pulley 412a, 413a may be located in a rear of the first guide pulley 411a.

A first distal end of a first wire 40a may be fixed to the first wire reel 40P. A second distal end of the first wire 40a may be adjacent to the right distal end of the bar 52, and may be fixed to the bar 52. A part of the first wire 40a between the first distal end and the second distal end may be caught on a first upper pulley 42a (see FIG. 19) described later. The first wire 40a may include a stainless SUS material, and may be coated with nylon. Meanwhile, the first wire 40a of the present disclosure may have a line or band shape. The first wire 40a may be referred to as a first connecting member 40a.

In addition, a part of the first wire 40a may be located in the first groove 40Pg of the first wire reel 40P, and may be wound around or unwound from the first groove 40Pg. The first wire 40a may be sequentially caught on the outer circumference of the first tension pulley 412a, 413a and the outer circumference of the first guide pulley 411a, and may be bent by the first tension pulley 412a, 413a and the first guide pulley 411a. The first wire 40a bent by the first guide pulley 411a may be located in the right side of the first rail 48, and may extend in a direction parallel to the first rail 48. The first wire 40a may be caught on the outer circumference of the first upper pulley 42a (see FIG. 19), and may be bent 180 degrees around the z-axis by the first upper pulley 42a. The first wire 40a bent by the first upper pulley 42a may be located in the left side of the first rail 48, may extend in a direction parallel to the first rail 48, and may be fixed to a first portion 521 adjacent to the right distal end of the bar 52.

A second wire reel 40Q may have a flat cylinder shape as a whole, and a second groove 40Qg may be formed on an outer circumferential surface of the second wire reel 40Q. The second wire reel 40Q may be rotatably coupled to an outer lateral surface of the second side part 30Cb, and may be fixed to the shaft 37a of the fourth gear 37. Accordingly, the second wire reel 40Q may be rotated together with the fourth gear 37. The second wire reel 40Q may be referred to as a second reel 40Q or a second wire drum 40Q. The second wire reel 40Q may include a plastic or POM material.

A second lower pulley 41b may be rotatably coupled to or fixed to an outer lateral surface of the second side part 30Cb. The rotation axis of the second lower pulley 41b may be parallel to the rotation axis of the third and fourth gears 36 and 37. A second guide pulley 411b may be adjacent to the front end of the second side part 30Cb. A second tension pulley 412b, 413b may be located in a rear of the second guide pulley 411b.

The first distal end of a second wire 40b may be fixed to the first wire reel 40Q. The second distal end of the second wire 40b may be adjacent to the left distal end of the bar 52, and may be fixed to the bar 52. A part of the second wire 40b between the first distal end and the second distal end may be caught on a second upper pulley 42b (see FIG. 20) described later. The second wire 40b may include a stainless SUS material, and may be coated with nylon. Meanwhile, the second wire 40b of the present disclosure may have a line or band shape. The second wire 40b may be referred to as a second connecting member 40b.

In addition, a part of the second wire 40b may be located in the second groove 40Qg of the second wire reel 40Q, and be wound around or unwound from the second groove 40Qg. The second wire 40b may be sequentially caught on the outer circumference of the second tension pulley 412b, 413b and the outer circumference of the second guide pulley 411b, and may be bent by the second tension pulley 412b, 413b and the second guide pulley 411b. The second wire 40b bent by the second guide pulley 411b may be located in the left side of the second rail 49, and may extend in a direction parallel to the second rail 49. The second wire 40b may be caught on the outer circumference of the second upper pulley 42b (see FIG. 20), and may be bent 180 degrees around the z-axis by the second upper pulley 42b. The second wire 40b bent by the second upper pulley 42b may be located in the right side of the second rail 49, extend in a direction parallel to the second rail 49, and be fixed to a second portion 522 adjacent to the left distal end of the bar 52.

Figure 16:
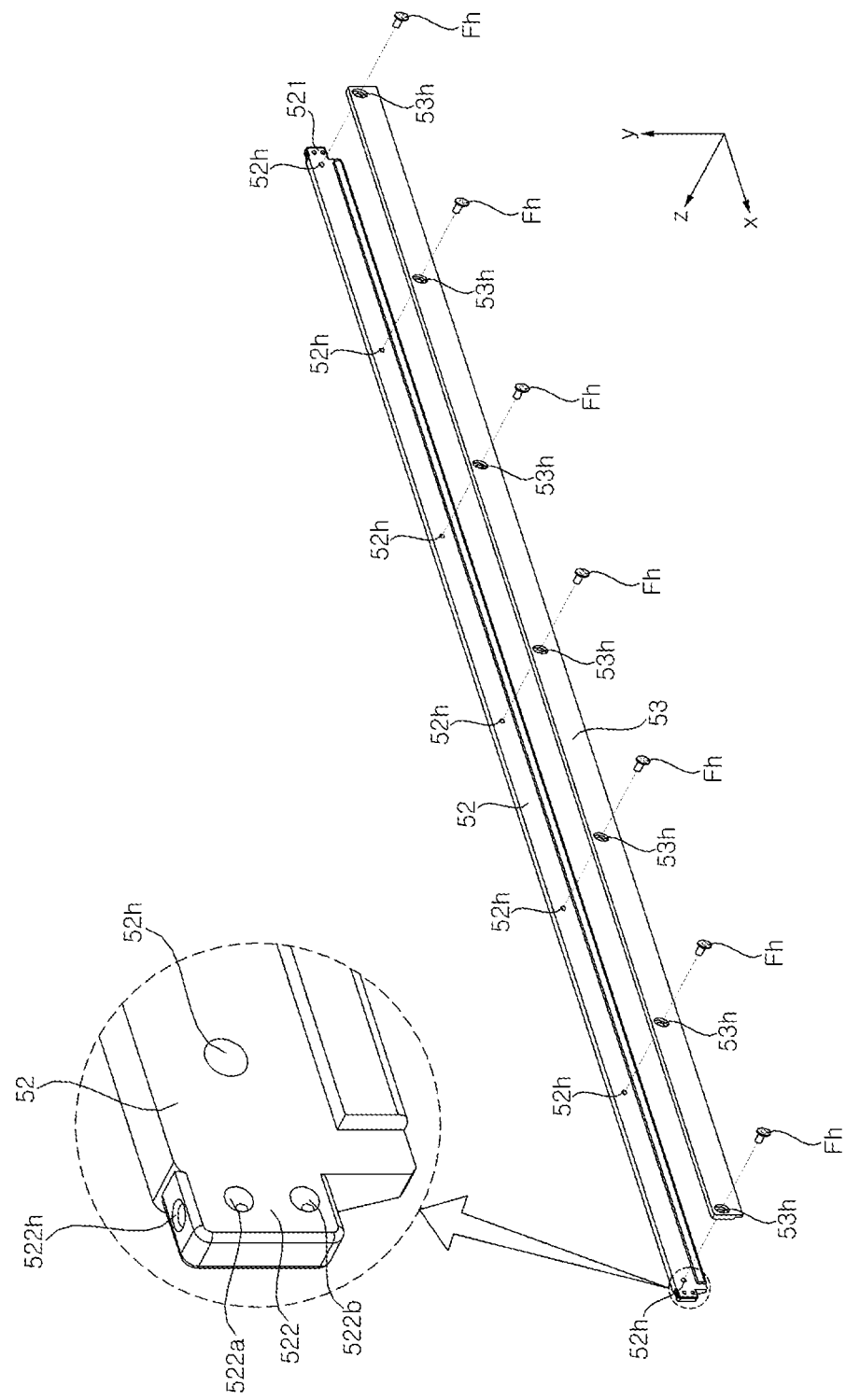
Figure 17:
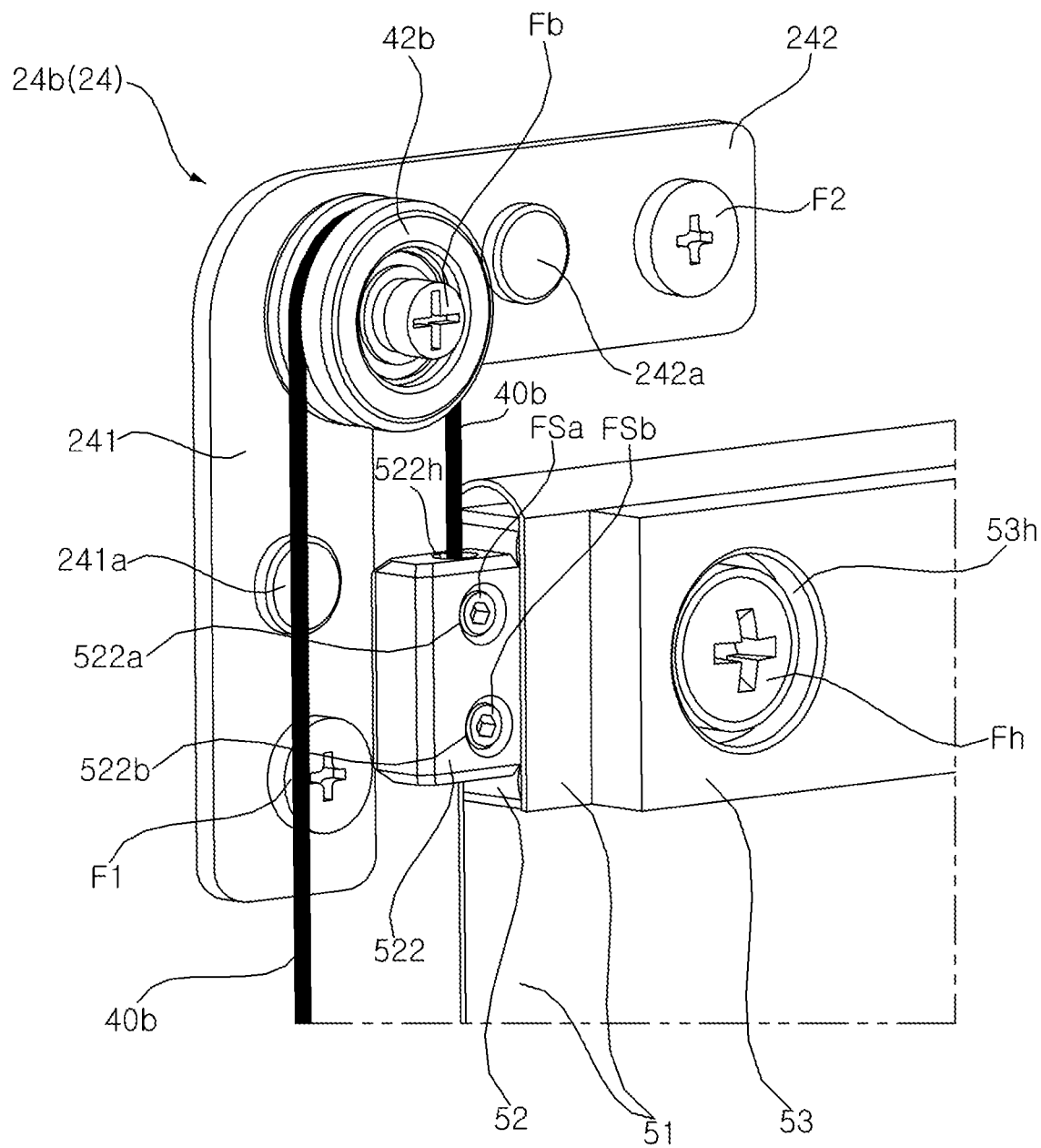
Figure 18:
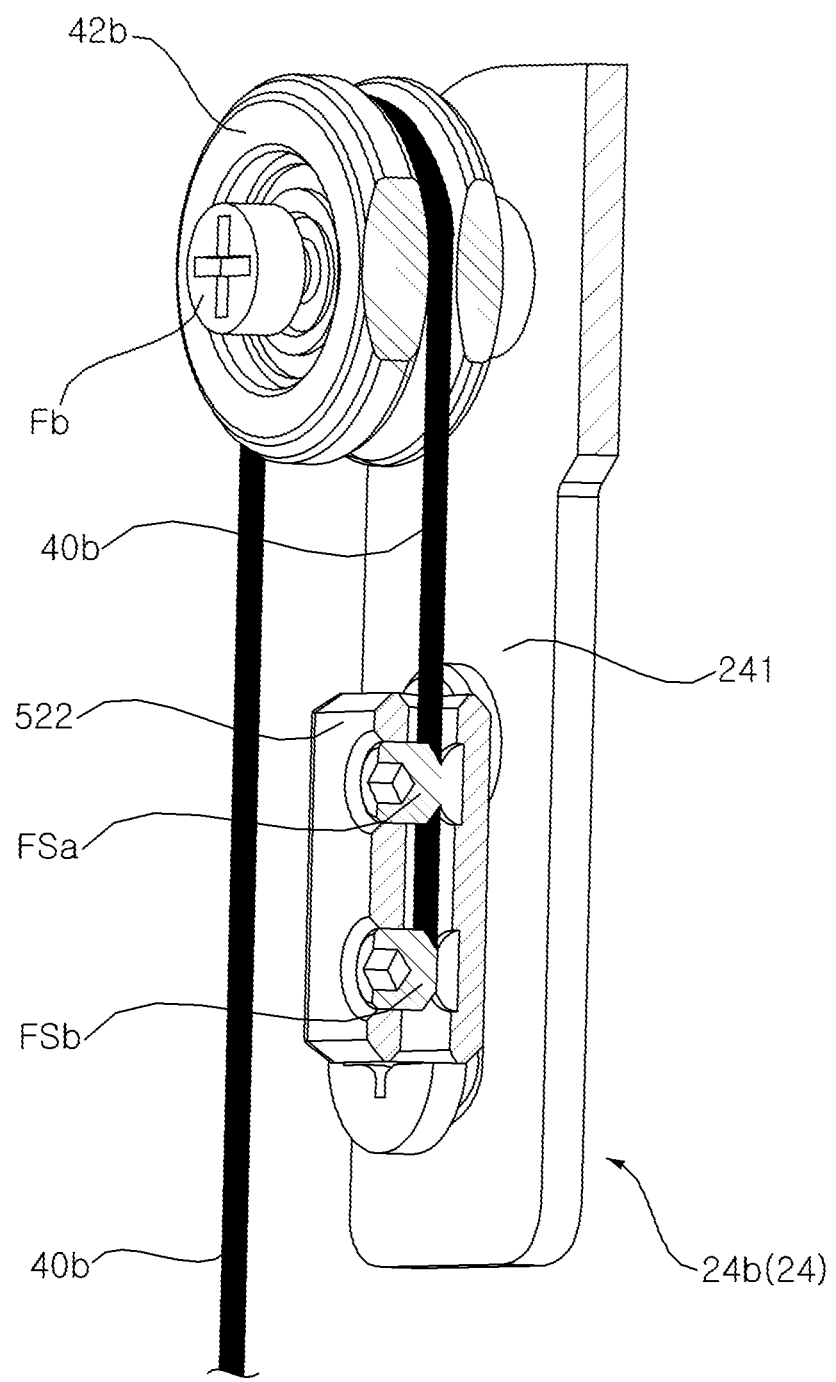

Referring to FIGS. 16 to 18, a bar 52 may be spaced apart in the radial direction of the roller 50 from the roller 50 (see FIGS. 14 and 15), and may extend in the left-right direction which is the longitudinal direction of the roller 50. The bar 52 may have a solid square lumber shape as a whole. The bar 52 may include a metal or plastic material such as stainless steel. The bar 52 may be located in a rear of the display panel 11 (see FIGS. 14 and 15), and may be located closer to the display panel 11 than the roller 50. The bar 52 may be referred to as a pole 52.

The second portion 522 may define the left distal end of the bar 52. An insertion hole 522h may be formed from the upper surface of the second portion 522 to the inside of the second portion 522. The insertion hole 522h may penetrate the lower surface of the second portion 522 or be blocked by the lower end of the second portion 522. A coupling hole 522a, 522b may be formed from the rear surface of the second portion 522 toward the insertion hole 522h. The coupling hole 522a, 522b may communicate with the insertion hole 522h. For example, the coupling hole 522a may include a first coupling hole 522a and a second coupling hole 522b spaced apart from each other in the up-down direction.

A part of the second wire 40b may be inserted into the insertion hole 522h. A fastening member FSa, FSb may be fastened to the coupling hole 522a, 522b, and may press a part of the second wire 40b inserted into the insertion hole 522h into the second portion 522. For example, the fastening member Fsa, FSb may be a set screw. Accordingly, the second wire 40b may be fixed to the second portion 522 of the bar 52. Meanwhile, the second wire 40b may form an open loop as shown in the drawing, or the second wire 40b may form a closed loop.

The first portion 521 may define the right distal end of the bar 52. The first portion 521 may be left-right symmetrical with the second portion 522. That is, a part of the first wire 40a may be inserted into the insertion hole of the first portion 521, and fixed to the first portion 521 by a fastening member fastened to the coupling hole of the first portion 521.

The length of a part of the second wire 40b inserted into the insertion hole 522h of the second portion 522 may be equal to or similar to the length of the insertion hole 522h. The length of a part of the first wire 40a inserted into the insertion hole of the first portion 521 may be equal to or similar to the length of the insertion hole. The length of a part of the second wire 40b inserted into the insertion hole 522h of the second portion 522 may be equal to or similar to the length of a part of the first wire 40a inserted into the insertion hole of the first portion 521. Accordingly, a case of tilting the bar 52, for example, a case where the first portion 521 is located below the second portion 522 or a case where the second portion 522 is located below the first portion 521, may be minimized.

Meanwhile, one end of the cover 51 may be fixed to the roller 50 (see FIGS. 14 and 15). A part of the cover 51 may cover the bar 52, and may be sandwiched between the bar 52 and a coupler 53. Here, the coupler 53 may have a long thin plate shape in the left-right direction. The fastening members Fh, such as a screw, may be fastened to the holes 53h of the coupler 53, and may press the cover 51 into grooves 52h of the bar 52. Accordingly, the cover 51 may be fixed to the bar 52. The first portion 521 may be located in the left side of the cover 51, and the second portion 522 may be located in the right side of the cover 51. The cover 51 may be hung on the sub roller 60 (see FIG. 15). The cover 51 may include a fabric material.

Figure 20:
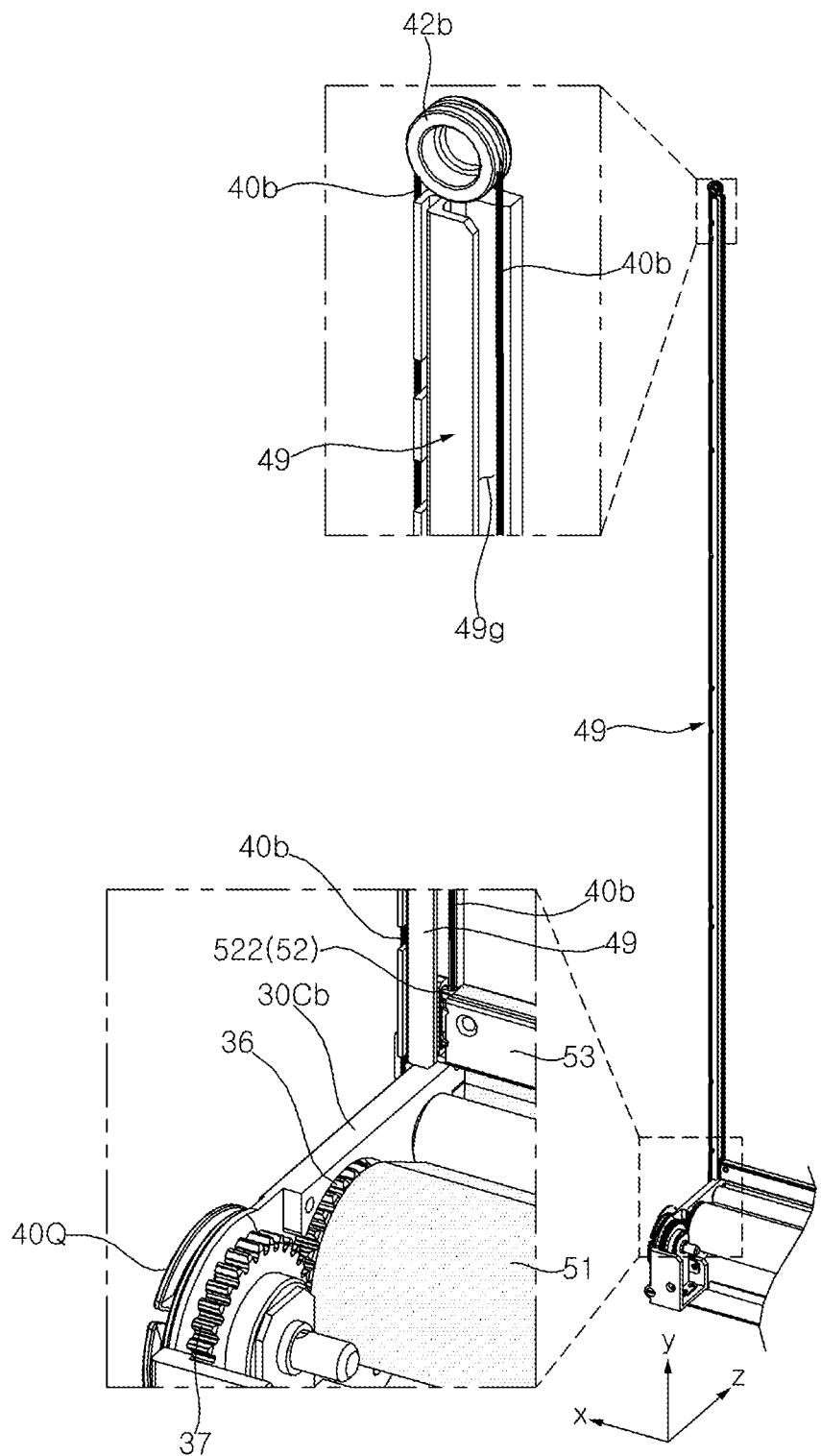

Referring to FIGS. 19 and 20, the first upper pulley 42a may be located above the first rail 48, and rotatably coupled to the first corner brace 24a (see FIG. 11). The second upper pulley 42b may be located above the second rail 49, and rotatably coupled to the second corner brace 24b (see FIG. 17).

When the motor 31 is driven, the wire reels 40P and 40Q may be rotated, and the wires 40a and 40b may be wound around and unwound from the wire reels 40P and 40Q. In addition, when the motor 31 is driven, the roller 50 may be rotated in the opposite direction to the wire reels 40P and 40Q by the engagement of the first and second gears 34 and 35, and the cover 51 may be unwound from or wound around the roller 50.

The wires 40a and 40b may be wound around wire reels 40P and 40Q rotating in a first rotation direction RD2 (see FIGS. 14 and 15), and may pull the bar 52 upward while being hung on the tension pulleys 412a, 413a, 412b, 413b (see FIGS. 14 and 15), the guide pulleys 411a and 411b (see FIGS. 14 and 15), and the upper pulleys 42a and 42b. At this time, the cover 51 may cover the rear of the display panel 11 while being gradually unwound from the roller 50 rotating in a direction opposite to the first rotation direction RD2.

The wires 40a and 40b may be unwound from the wire reels 40P and 40Q rotating in a second rotation direction RD1 (see FIGS. 14 and 15) opposite to the first rotation direction RD2, and may be pulled by the bar 52 downward while being hung on the tension pulleys 412a, 413a, 412b, 413b (see FIGS. 14 and 15), the guide pulleys 411a, 411b (see FIGS. 14 and 15), and the upper pulleys 42a, 42b. At this time, the cover 51 may be gradually wound around the roller 50 rotating in a direction opposite to the second rotation direction RD1 to gradually expose the rear of the display panel 11.

The first portion 521 of the bar 52 may be vertically movable from a first guide groove 48g of the first rail 48. The second portion 522 of the bar 52 may be vertically movable from a second guide groove 49g of the second rail 49. That is, the rails 48 and 49 may guide the vertical movement of the bar 52.

Figure 21:
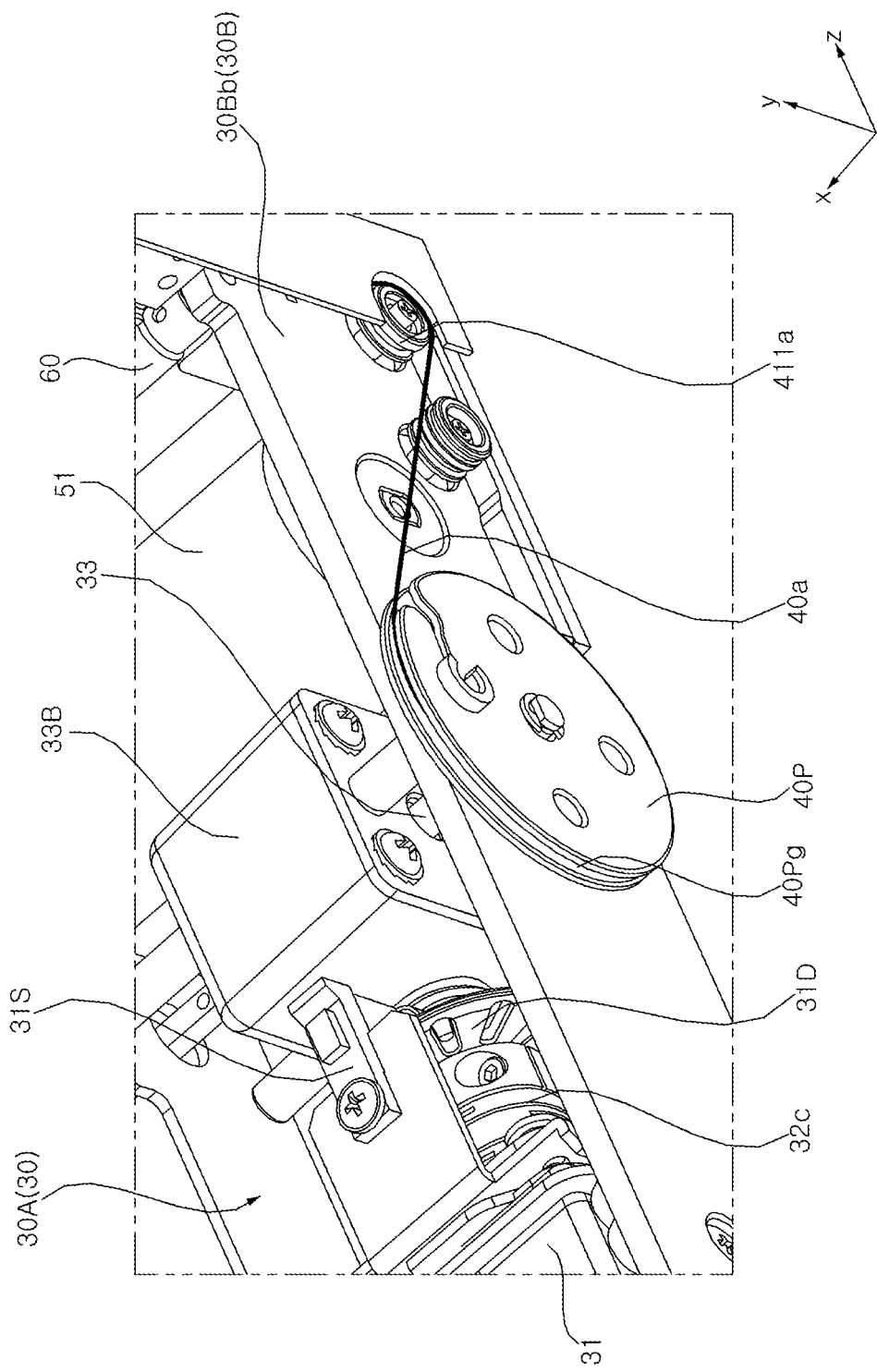
Figure 22:
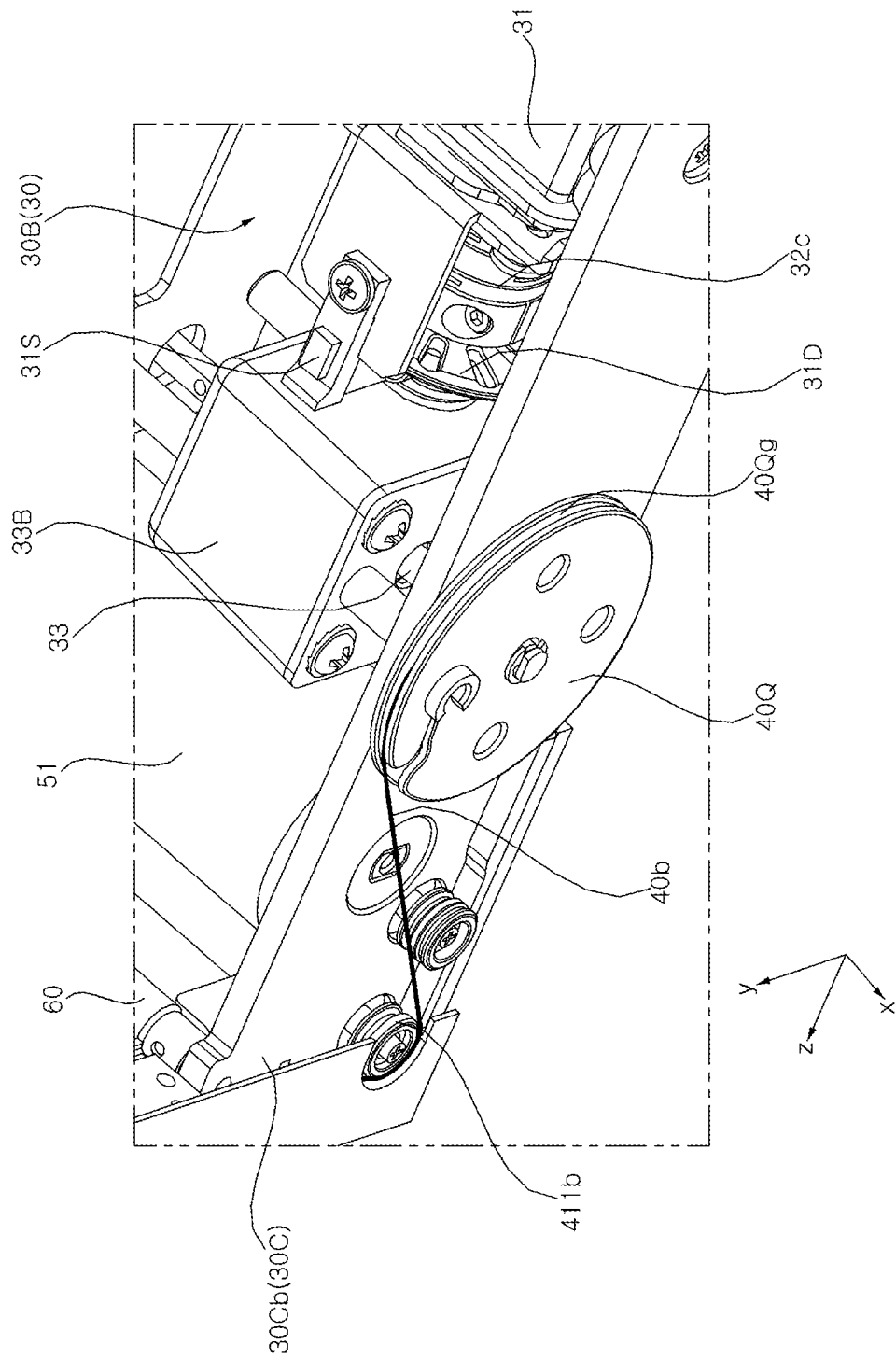

Referring to FIGS. 21 and 22, the first driving assembly 30A may provide power to rotate the first wire reel 40P, and the second driving assembly 30B may provide power to rotate the second wire reel 40Q. Each of the first driving assembly 30A and the second driving assembly 30B may include a motor 31 and a gear box 33B.

The rotation axis of the motor 31 may be connected to gears in the gearbox 33B through a coupling member 32c. A worm (not shown) in the gear box 33B may be fixed to the rotation axis of the motor 31 through a coupling member 32c. The worm wheel 33 in the gear box 33B may be engaged with the worm. The worm wheel 33 (or a member fixed to the worm wheel 33) of the first driving assembly 30A may penetrate the first side part 30Bb and be fixed to the first wire reel 40P. The worm wheel 33 (or a member fixed to the worm wheel 33) of the second driving assembly 30B may penetrate the second side part 30Cb and be fixed to the second wire reel 40Q.

When the motors 31 are driven, the wire reels 40P and 40Q may be rotated, and the wires 40a and 40b may be wound around and unwound from the wire reels 40P and 40Q. The wires 40a and 40b may be wound around the wire reels 40P and 40Q rotating in the first rotation direction, and may pull the bar 52 upward while being hung on the guide pulleys 411a and 411b and the upper pulleys 42a and 42b (see FIGS. 11 and 17). Accordingly, the cover 51 may be gradually unwound from the roller 50 and may gradually cover the rear of the display panel 11.

The wires 40a and 40b may be unwound from the wire reels 40P and 40Q rotating in a second rotation direction opposite to the first rotation direction, and may be pulled downward by the bar 52 while being hung on the guide pulleys 411a and 411b and the upper pulleys 42a and 42b (see FIGS. 11 and 17). Accordingly, the cover 51 may be gradually wound around the roller 50 to gradually expose the rear of the display panel 11.

Meanwhile, the driving assembly 30 of FIGS. 21 and 22 may not include the gears 34, 35, 36, and 37 of the driving assembly 30 described above with reference to FIGS. 12 and 13. That is, the worm wheel 33 of the driving assembly 30 of FIGS. 21 and 22 may not be geared to the roller 50 which the cover 51 is wound around or unwound from. In this case, a rotation mechanism of the roller 50 may be required instead of the gears 34, 35, 36, 37 (see FIGS. 12 and 13), and a mechanism described later with reference to FIG. 23 may be an example.

Figure 23:
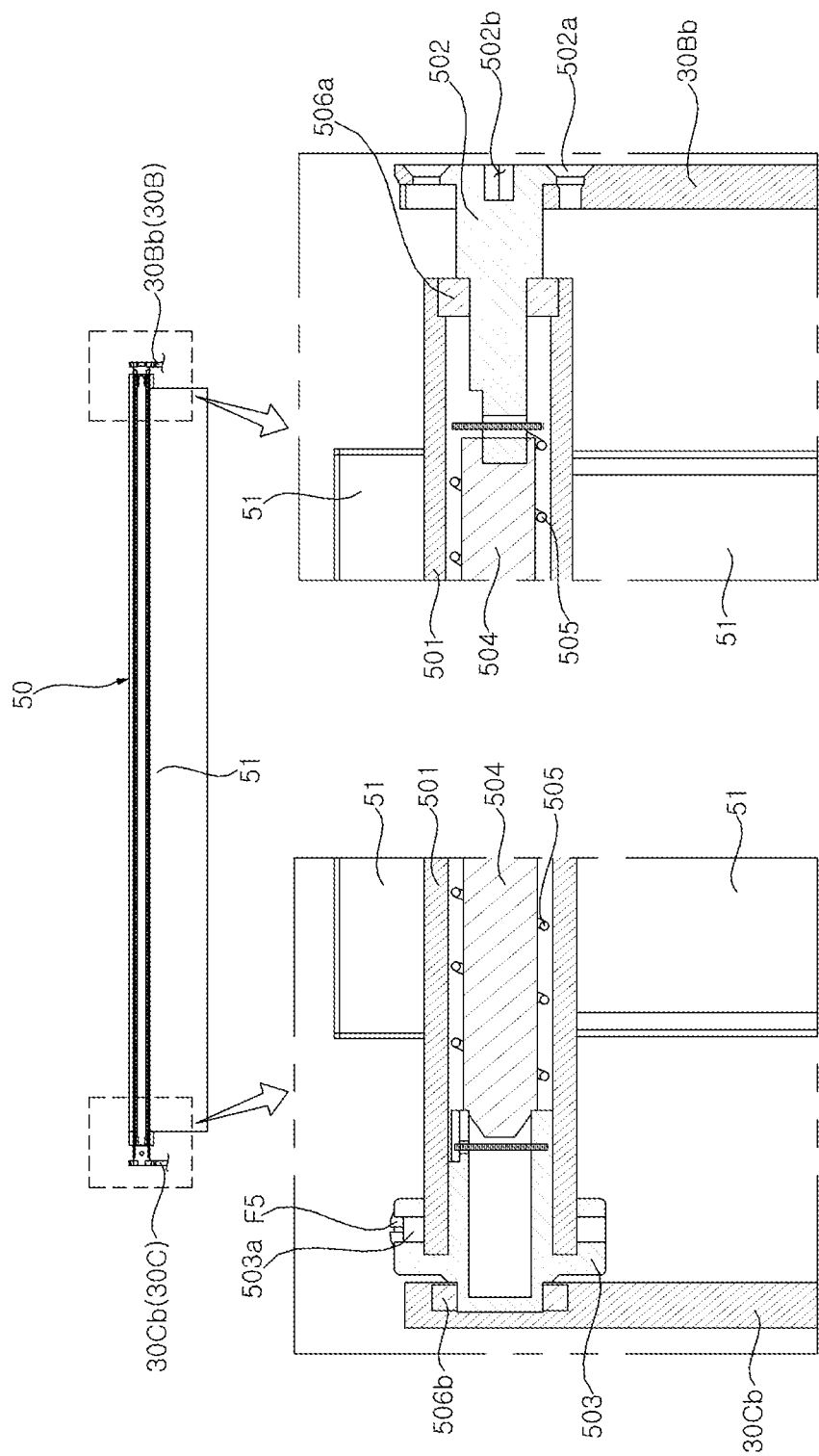

Referring to FIG. 23, the roller 50 may include a roller body 501, a fixed cap 502, a rotating cap 503, a shaft 504, and a coil spring 505.

The roller body 501 may extend in the longitudinal direction of the roller 50 and may have a hollow cylinder shape. One end of the cover 51 may be fixed to the outer circumferential surface of the roller body 501, and the cover 51 may be wound around or unwound from the outer circumferential surface of the roller body 501.

The fixed cap 502 may be fixed to the first side part 30Bb, and one end of the roller body 501 may be rotatably coupled to the fixed cap 502. The fixed cap 502 may be fixed to the first side part 30Bb through a fastening member 502a such as a screw. A part of the fixed cap 502 may be located inside the roller body 501. The bearing 506a may be located between the inner circumferential surface of the roller body 501 and the outer circumferential surface of the fixed cap 502, and may support rotation of the roller body 501.

The rotating cap 503 may be rotatably coupled to the second side part 30Cb, and the other end of the roller body 501 may be fixed to the rotating cap 503. The rotating cap 503 may be fixed to the roller body 501 through a fastening member F5 such as a screw, and may be rotated together with the roller body 501. A part of the rotating cap 503 may be inserted into the second side part 30Cb. A bearing 506b may be located between the inner side of the second side part 30Cb and the outer circumferential surface of the rotating cap 503, and may support rotation of the rotating cap 503.

The shaft 504 may be located inside the roller body 501, and may extend in the longitudinal direction of the roller body 501. One end of the shaft 504 may be fixed to the fixed cap 502, and the other end of the shaft 504 may be rotatably coupled to the rotating cap 503. That is, the roller body 501 and the rotating cap 503 may rotate with respect to the fixed cap 502 and the shaft 504.

The coil spring 505 may be wound around the outer circumference of the shaft 504 in the form of a coil inside the roller body 501. The shaft 504 may prevent twisting of coil spring 505. One end of the coil spring 505 may be fixed to the fixed cap 502, and the other end of the coil spring 505 may be fixed to the rotating cap 503. That is, when the roller body 501 and the rotating cap 503 rotate, the coil spring 505 having one end fixed to the fixed cap 502 may be elastically deformed. A user may input a load to the coil spring 505 by a wrench through an angled groove 502b formed in the distal end of the fixed cap 502.

As described above with reference to FIGS. 21 and 22, the wires 40a and 40b may pull the bar 52 upward while being wound around the wire reels 40P and 40Q, and the cover 51 fixed to the bar 52 may be unwound from the roller body 501 of the roller 50. In correspondence with the unwinding of the cover 51, the roller body 501 may be rotated in the first direction, and the coil spring 505 may be elastically deformed. The restoring force of the coil spring 505 may apply tension to the cover 51 unwound from the roller body 501, and as a result, the cover 51 may be stretched taut without wrinkles.

As described above with reference to FIGS. 21 and 22, the wires 40a and 40b may be pulled downward by the bar 52 while being unwound from the wire reels 40P and 40Q, and the cover 51 fixed to the bar 52 may be wound around the roller body 501 of the roller 50. The winding of the cover 51 and the lowering of the bar 52 may occur when the roller body 501 rotates in a second direction opposite to the first direction by the restoring force of the coil spring 505.

Figure 24:
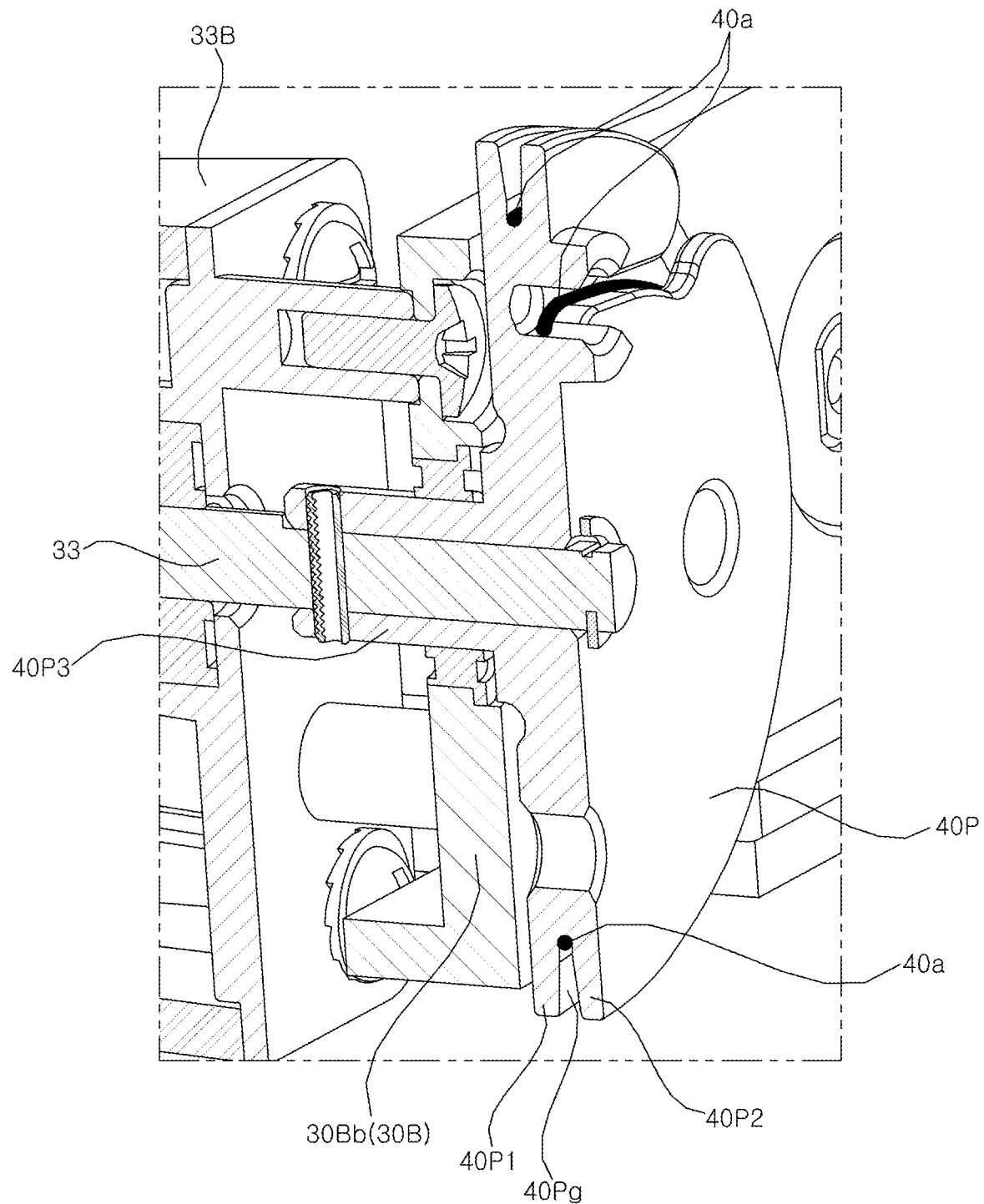
Figure 25:
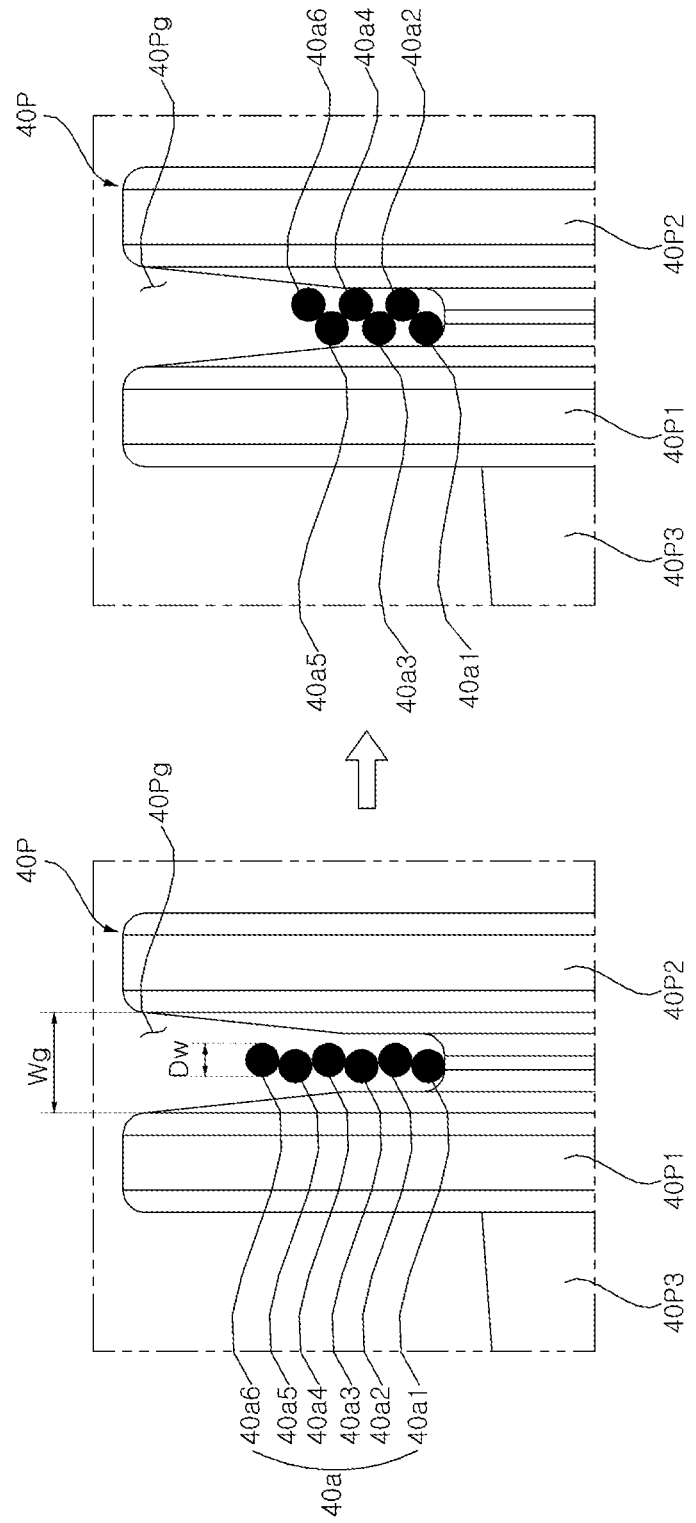

Referring to FIGS. 24 and 25, the first wire reel 40P may have a disk shape as a whole, and the first groove 40Pg may be formed on an outer circumferential surface of the first wire reel 40P. A first inner part 40P1 may define a part of the boundary of the first groove 40Pg. The first outer part 40P2 may define a part of the boundary of the first groove 40Pg. The first inner part 40P1 and the first outer part 40P2 may be connected to each other with the first groove 40Pg interposed therebetween. A first middle part 40P3 may protrude from the first inner part 40P1 and penetrate the first side part 30Bb. The worm wheel (33, or a member fixed to the worm wheel 33) may be fixed to the first wire reel 40P through the first middle part 40P3, and the first wire reel 40P may be rotated together with the worm wheel 33.

One end of the first wire 40a may be fixed to the first wire reel 40P, and the first wire 40a may be wound around or unwound from the first groove 40Pg. The width Wg of the first groove 40Pg may be larger than the diameter Dw of the first wire 40a but smaller than twice the diameter Dw. In this case, the first wire 40a may be wound around the first groove 40Pg several times in a zigzag pattern. Firstly wound first wire 40a1, third wound first wire 40a3, and fifth wound fifth wire 40a5 may be disposed in a zigzag pattern with secondly wound first wire 40a2, fourth wound first wire 40a4, and sixth wound first wire 40a6.

However, due to the tension applied to the first wire 40a, the first wire 40a wound later around the first groove 40Pg may penetrate into a gap between the firstly wound first wire 40a and the first groove 40Pg (see pictures in FIG. 25 in order from left to right). In this case, noise of a stringed instrument such as a guitar may occur, and the first wire 40a may be worn (e.g. a nylon coating layer covering the first wire 40a may be worn), thereby reducing its lifespan. In addition, a difference may occur between the length (i.e. the amount of winding of the first wire 40a) of the first wire 40a wound around the first wire reel 40P and the length (i.e. the amount of winding of the second wire 40b) of the second wire 40b wound around the second wire reel 40Q. As a result, the bar 52 fixed to the wires 40a and 40b may be inclined left and right. Here, the second wire reel 40Q may be left-right symmetrical with the first wire reel 40P, and the description of the first wire reel 40P and the first wire 40a may be applied to the second wire reel 40Q and the second wire 40b.

Meanwhile, the above-described problem may occur not only in the wire reels 40P and 40Q and the wires 40a and 40b described above with reference to FIGS. 21 and 22, but in the wire reels 40P and 40Q and the wires 40a and 40b described above with reference to FIGS. 14 and 15.

Figure 26:
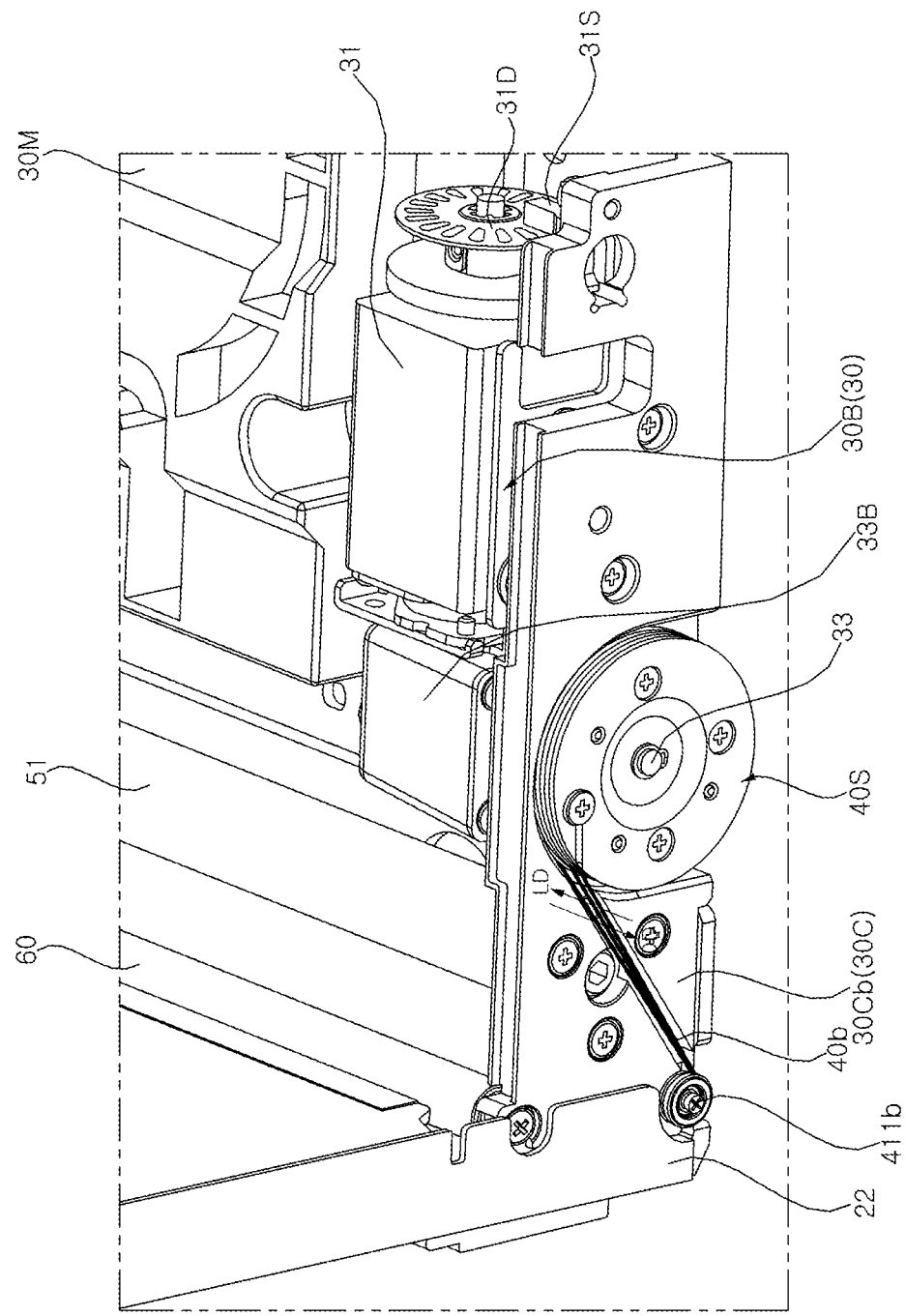
Figure 27:
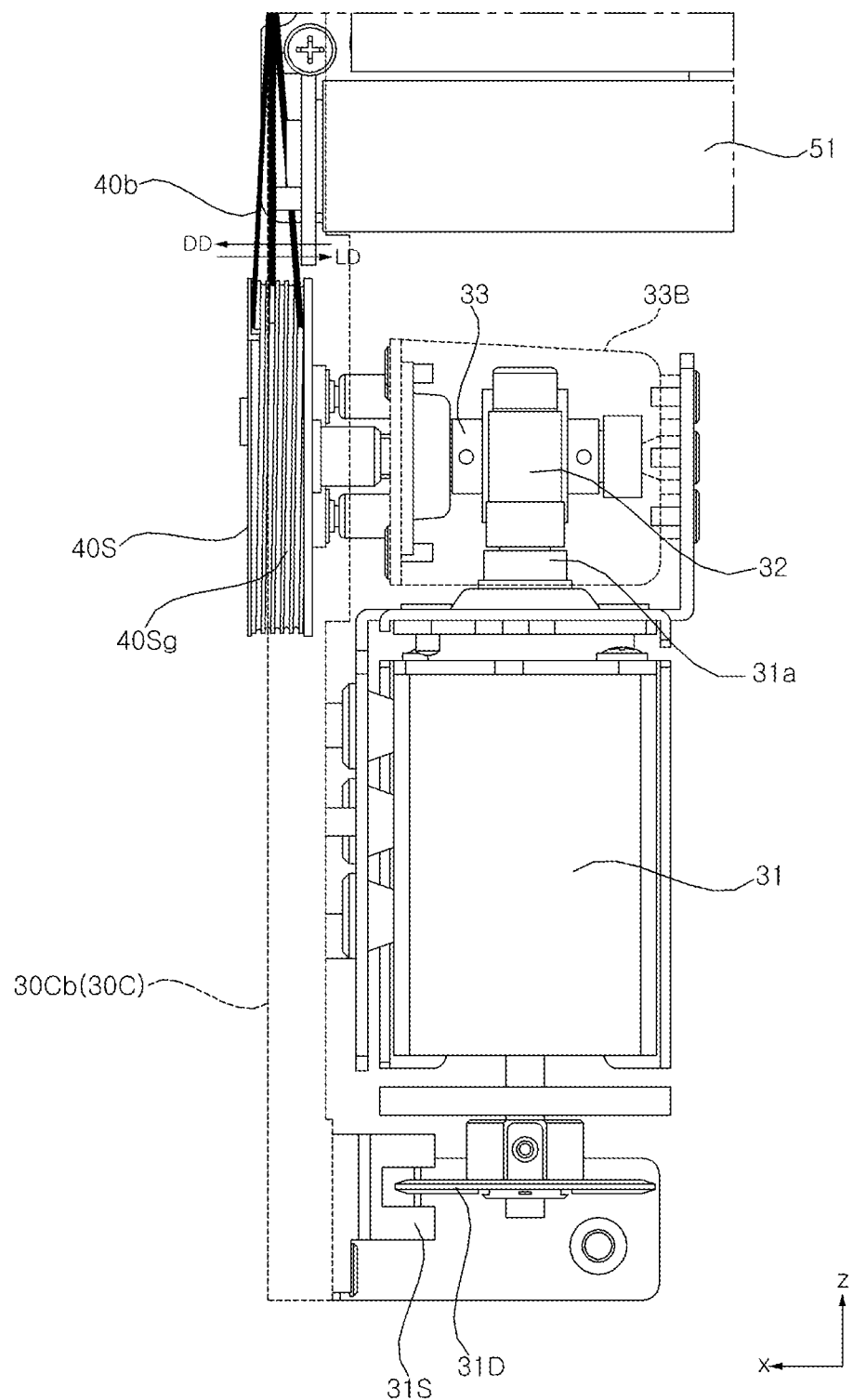
Figure 28:
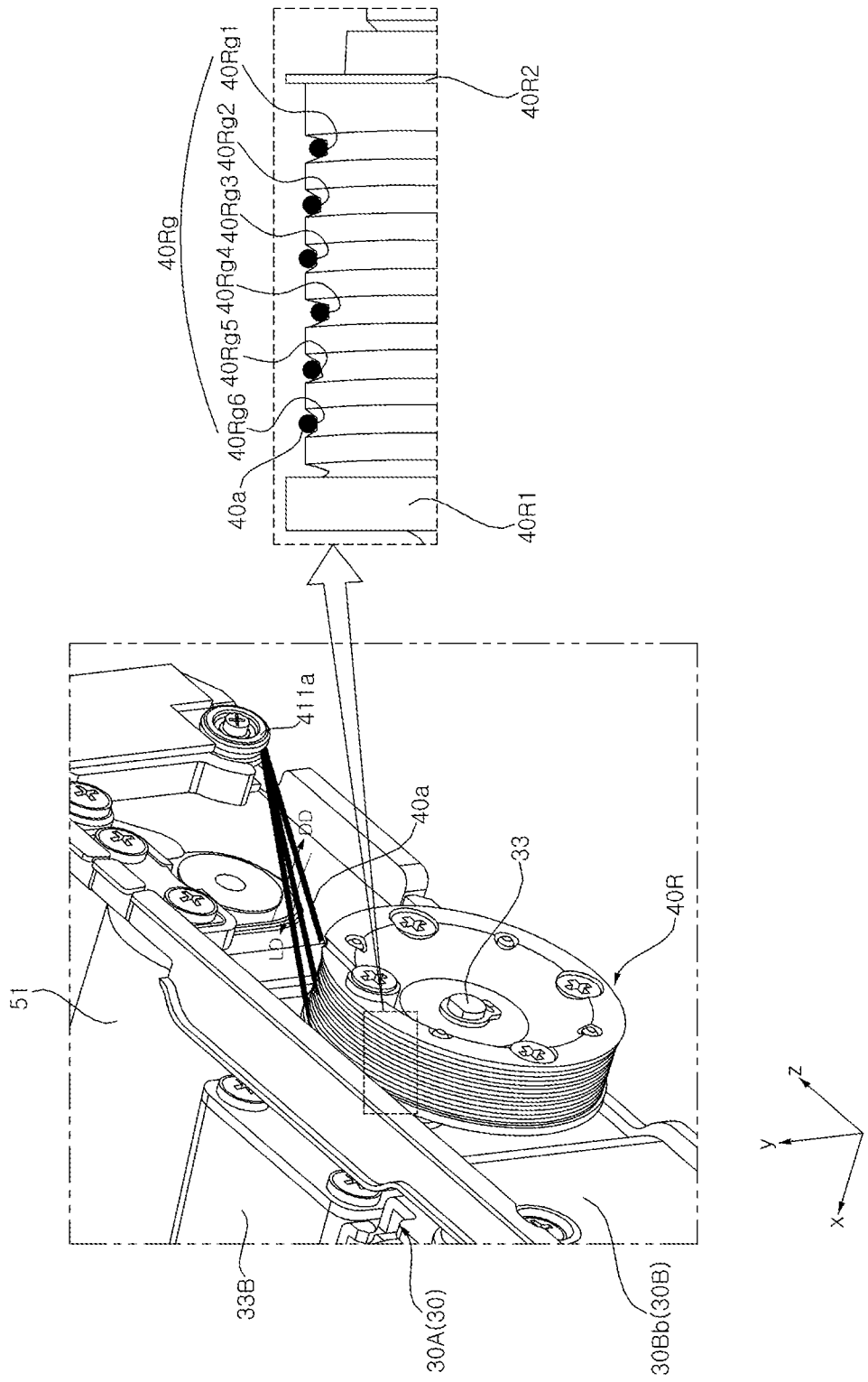

Referring to FIGS. 26 to 28, the first driving assembly 30A may provide power to rotate a first wire reel 40R, and the second driving assembly 30B may provide power to rotate a second wire reel 40S. Each of the first driving assembly 30A and the second driving assembly 30B may include the motor 31 and the gear box 33B.

A rotation axis 31a of the motor 31 may be connected to gears 32 and 33 in the gearbox 33B. The worm 32 in the gear box 33B may be fixed to the rotation axis 31a, and may extend in a direction parallel to the rotation axis 31a. The worm wheel 33 in the gear box 33B may intersect the worm 32, and be engaged with the worm 32. The worm wheel 33 (or a member fixed to the worm wheel 33) of the first driving assembly 30A may penetrate the first side part 30Bb and be fixed to the first wire reel 40R. The worm wheel 33 (or a member fixed to the worm wheel 33) of the second driving assembly 30B may penetrate the second side part 30Cb and be fixed to the second wire reel 40S.

When the motors 31 are driven, the wire reels 40R and 40S may be rotated, and the wires 40a and 40b may be wound around and unwound from the wire reels 40R and 40S.

The wires 40a and 40b may be wound around the wire reels 40R and 40S rotating in the first rotation direction, and may pull the bar 52 upward, while being hung on the guide pulleys 411a and 411b and the upper pulleys 42a and 42b (see FIGS. 11 and 17). The cover 51 fixed to the bar 52 may be gradually unwound from the roller 50 and may gradually cover the rear of the display panel 11. In correspondence with the unwinding of the cover 51, the coil spring 505 of the roller 50 may be elastically deformed (see FIG. 23).

The wires 40a and 40b may be unwound from the wire reels 40R and 40S rotating in a second rotation direction opposite to the first rotation direction, and may be pulled downward by the bar 52 while being hung on the guide pulleys 411a and 411b and the upper pulleys 42a and 42b (see FIGS. 11 and 17). The cover 51 fixed to the bar 52 may be gradually wound around the roller 50 to gradually expose the rear of the display panel 11. The winding of the cover 51 and the lowering of the bar 52 may occur when the roller 50 rotates in the second direction opposite to the first direction by the restoring force of the coil spring 505 (see FIG. 23).

Figure 29:
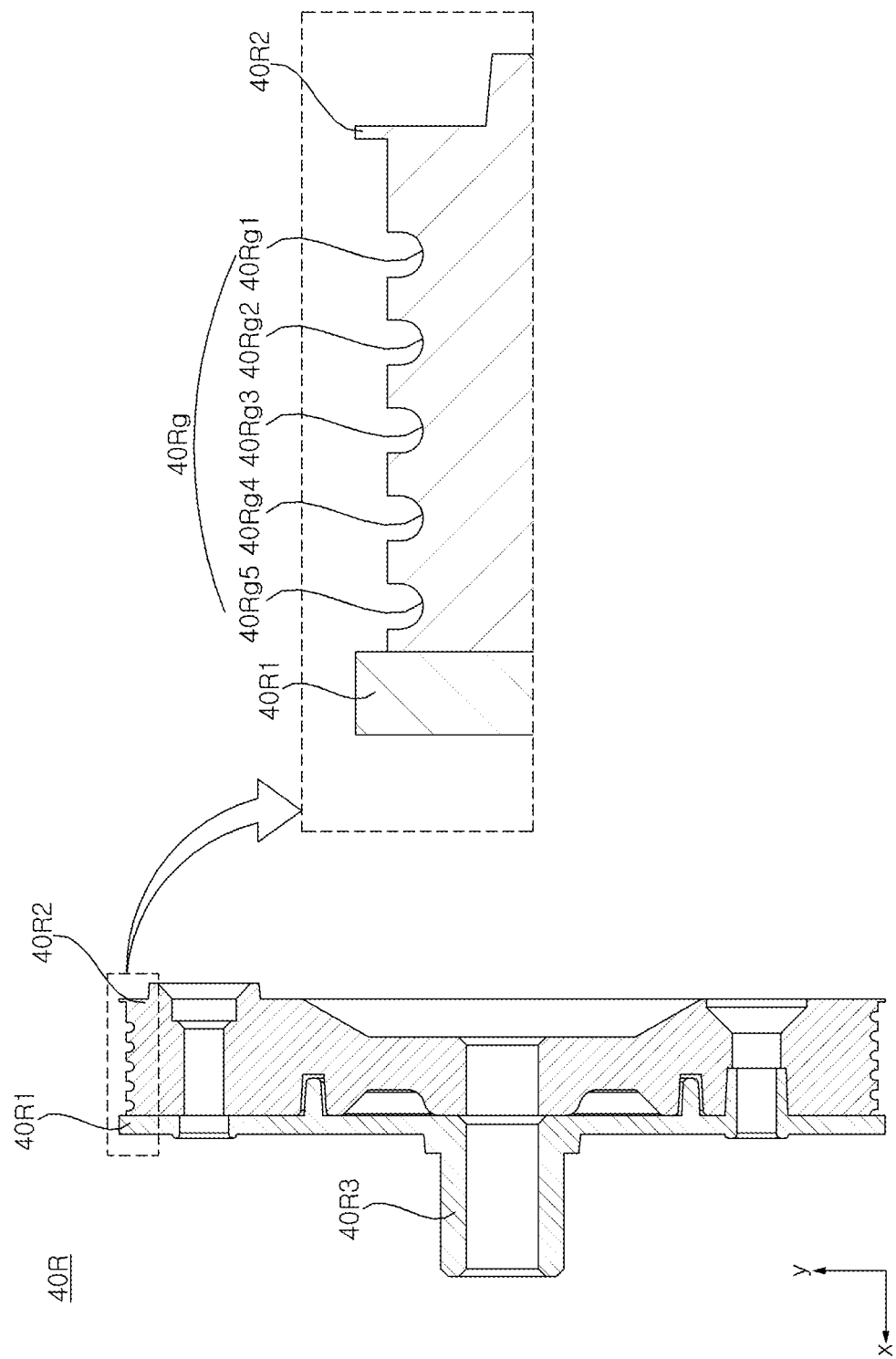

Referring to FIG. 29, the first wire reel 40R may have an overall flat cylindrical shape. The first wire reel 40R may include a first inner part 40R1, a first outer part 40R2, and a first middle part 40R3. The first inner part 40R1 may face the first side part 30Bb, and the first outer part 40R2 may opposite to the first side part 30Bb with respect to the first inner part 40R1. The first middle part 40R3 may protrude from the first inner part 40R1 and penetrate the first side part 30Bb. The worm wheel 33 (or a member fixed to the worm wheel 33) may be fixed to the first wire reel 40R through the first middle part 40R3, and the first wire reel 40R may be a worm wheel 33 (see FIG. 28).

The first inner part 40R1, the first outer part 40R2, and the first middle part 40R3 may be separately provided and coupled to each other. Alternatively, at least two of the first inner part 40R1, the first outer part 40R2, and the first middle part 40R3 may be formed as one body. The first inner part 40R1 and the first outer part 40R2 may be collectively referred to as a body 40R1, 40R2. The diameters of the body 40R1, 40R2 may be constant.

The first groove 40Rg may be formed on an outer circumferential surface of the first wire reel 40R. For example, the first groove 40Rg may be formed on the outer circumferential surface of the first outer part 40R2. The first groove 40Rg may extend in a helix on the outer circumferential surface of the first wire reel 40R with respect to a central axis (i.e. a longitudinal axis) of the first wire reel 40R. The helix may connect a first point adjacent to the outer surface (i.e. the right surface of the first wire reel 40R) of the first wire reel 40R, and a second point adjacent to the inner surface (i.e. the left surface of the first wire reel 40R) of the first wire reel 40R. The first groove 40Rg may include a plurality of paths connected to each other between the first point and the second point. For example, the first groove 40Rg may be divided into five paths according to an angle with respect to the central axis of the first wire reel 40R. The number of paths is not limited to five, and may be less or more than this. For example, the pitch of the paths of the first groove 40Rg may be about 1.25 mm.

A first path 40Rg1 may be a part of the first groove 40Rg extending by 360 degrees from the first point with respect to the central axis of the first wire reel 40R. A second path 40Rg2 may be a part of the first groove 40Rg extending by 360 degrees from the distal end of the first path 40Rg1 with respect to the central axis of the first wire reel 40R. A third path 40Rg3 may be a part of the first groove 40Rg extending by 360 degrees from the distal end of the second path 40Rg2 with respect to the central axis of the first wire reel 40R. A fourth path 40Rg4 may be a part of the first groove 40Rg extending by 360 degrees from the distal end of the third path 40Rg3 with respect to the central axis of the first wire reel 40R. A fifth path 40Rg5 may be a part of the first groove 40Rg extending by 360 degrees from the distal end of the fourth path 40Rg4 with respect to the central axis of the first wire reel 40R, and the distal end of the fifth path 40Rg5 may be formed in the second point.

One end of the first wire 40a (see FIG. 28) may be fixed to the first wire reel 40R, and the first wire 40a may be wound around or unwound from the first groove 40Rg. When the first wire reel 40R rotates in the first rotation direction, the first wire 40a is firstly wound around the first path 40Rg1, and then, may be sequentially wound around the second path 40Rg2, the third path 40Rg3, the fourth path 40Rg4, the fifth path 40Rg5, and the sixth path 40Rg6 (see arrow LD in FIG. 28). When the first wire reel 40R rotates in a second rotation direction opposite to the first rotation direction, the first wire 40a is firstly unwound from the sixth path 40Rg6, and then, may be sequentially unwound from the fifth path 40Rg5, the fourth path 40Rg4, the third path 40Rg3, the second path 40Rg2, and the first path 40Rg1 (see arrow DD in FIG. 28).

For example, the diameter of the path of the first groove 40Rg may be equal to or larger than the diameter of the first wire 40a. For example, the diameter of the path of the first groove 40Rg may be 0.64 mm, and the diameter of the first wire 40a may be 0.6 mm.

The second wire reel 40S (see FIG. 27) may be left-right symmetrical with the first wire reel 40R, and the description of the first wire reel 40R and the first wire 40a may be applied to the second wire reel 40S and the second wire 40b (see FIG. 27). The first wire reel 40R may be referred to as a first reel 40R, a first wire drum 40R, or a helical & normal type first wire drum 40R. The second wire reel 40S may be referred to as a second reel 40S, a second wire drum 40S, or a helical & normal type second wire drum 40S. The first wire reel 40R and the second wire reel 40S may include plastic or POM material.

One end of the second wire 40b may be fixed to the second wire reel 40S, and the second wire 40b may be wound around or unwound from the second groove 40Sg (see FIG. 27). When the second wire reel 40S rotates in the first rotation direction, the second wire 40b may be firstly wound around the outermost (i.e. left) path among paths of the second groove 40Sg of the second wire reel 40S, and then sequentially wound around the remaining paths from outside to inside (i.e. from left to right) (see arrow LD in FIG. 27). When the second wire reel 40S rotates in the second rotation direction opposite to the first rotation direction, the second wire 40b may be firstly unwound from the innermost (i.e. right) path among the paths of the second groove 40Sg, and then unwound sequentially from the remaining paths from inside to outside (i.e. right to left) (see arrow DD in FIG. 27).

Accordingly, the wires 40a and 40b may be sequentially wound around and unwound from the paths of the wire reels 40R and 40S. Since a part of the first wire 40a wound later around the first wire reel 40R does not overlap a part of the first wire 40a wound firstly around the first wire reel 40R, when the first wire 40a is wound around or unwound from the first wire reel 40R, noise due to overlapping of the wires may not be generated, which is the same for the second wire reel 40S and the second wire 40b. In addition, it is possible to prevent wear of the wires 40a and 40b due to overlapping of the wires.

In addition, the length (i.e. the amount of winding of the first wire 40a) of the first wire 40a wound around the first wire reel 40R and the length (i.e. the amount of winding of the second wire 40b) of the second wire 40b wound around the second wire reel 40S may be equalized, and as a result, the balance of the bar 52 fixed to the wires 40a and 40b may be maintained.

Referring to FIGS. 30 to 33, the first driving assembly 30A may provide power to rotate the first wire reel 40T, and the second driving assembly 30B may provide power to rotate the second wire reel 40U. Each of the first driving assembly 30A and the second driving assembly 30B may include a motor 31, a worm 32, a worm wheel 33, a first gear 34t, 34u, and a second gear 35t, 35u.

The rotation axis of the motor 31 may be parallel to the front-rear direction. The worm 32 may be fixed to the rotation axis of the motor 31, and may extend in a direction parallel to the rotation axis. The worm wheel 33 may extend in the left-right direction, and may be engaged with the worm 32. The first gear 34t, 34u may be fixed to the worm wheel 33. The first gear 34t, 34u may be a spur gear. The second gear 35t, 35u may be engaged with the first gear 34t, 34u, and may be fixed to one end of the roller 50. The second gear 35t, 35u may be a spur gear. The worm wheel 33 (a shaft of the first gear 34t as a member fixed to the worm wheel 33) of the first driving assembly 30A may penetrate the first side part 30Bb and be fixed to the first wire reel 40T. The worm wheel 33 of the second driving assembly 30B (or the shaft of the first gear 34u as a member fixed to the worm wheel 33) may penetrate the second side part 30Cb and be fixed to the second wire reel 40U.

When the motors 31 are driven, the wire reels 40T and 40U may be rotated, and the wires 40a and 40b may be wound around and unwound from the wire reels 40T and 40U. The roller 50 may be rotated in the opposite direction to the wire reels 40T and 40U. Meanwhile, only one of the first driving assembly 30A and the second driving assembly 30B may include the motor 31, worm 32, worm wheel 33, first gear 34t; 34u, and second gear 35t, 35u, and the remaining assembly may include the third gear 36 and the fourth gear 37 described above with reference to FIG. 13. In this case, the third gear 36 may be fixed to the roller 50, and the first gear 34t may rotate together with the fixed roller 50. In addition, the fourth gear 37 may be engaged with the third gear 36, fixed to the second wire reel 40U or the first wire reel 40T, and rotated together.

The wires 40a and 40b may be wound around the wire reels 40T and 40U rotating in the first rotation direction, and may pull the bar 52 upward while being hung on the guide pulleys 411a and 411b and the upper pulleys 42a and 42b (see FIGS. 11 and 17). The cover 51 fixed to the bar 52 may be gradually unwound from the roller 50 and gradually cover the rear of the display panel 11 while the roller 50 to which the second gear 35u is fixed rotates in the second rotation direction opposite to the first rotation direction.

The wires 40a and 40b may be unwound from the wire reels 40T and 40U rotating in the second rotation direction, and may be pulled downward by the bar 52 while being hung on the guide pulleys 411a and 411b and the upper pulleys 42a and 42b (see FIGS. 11 and 17). The cover 51 fixed to the bar 52 may be gradually wound around the roller 50 and gradually expose the rear of the display panel 11 while the roller 50 to which the second gear 35u is fixed rotates in the first rotation direction.

Figure 33:
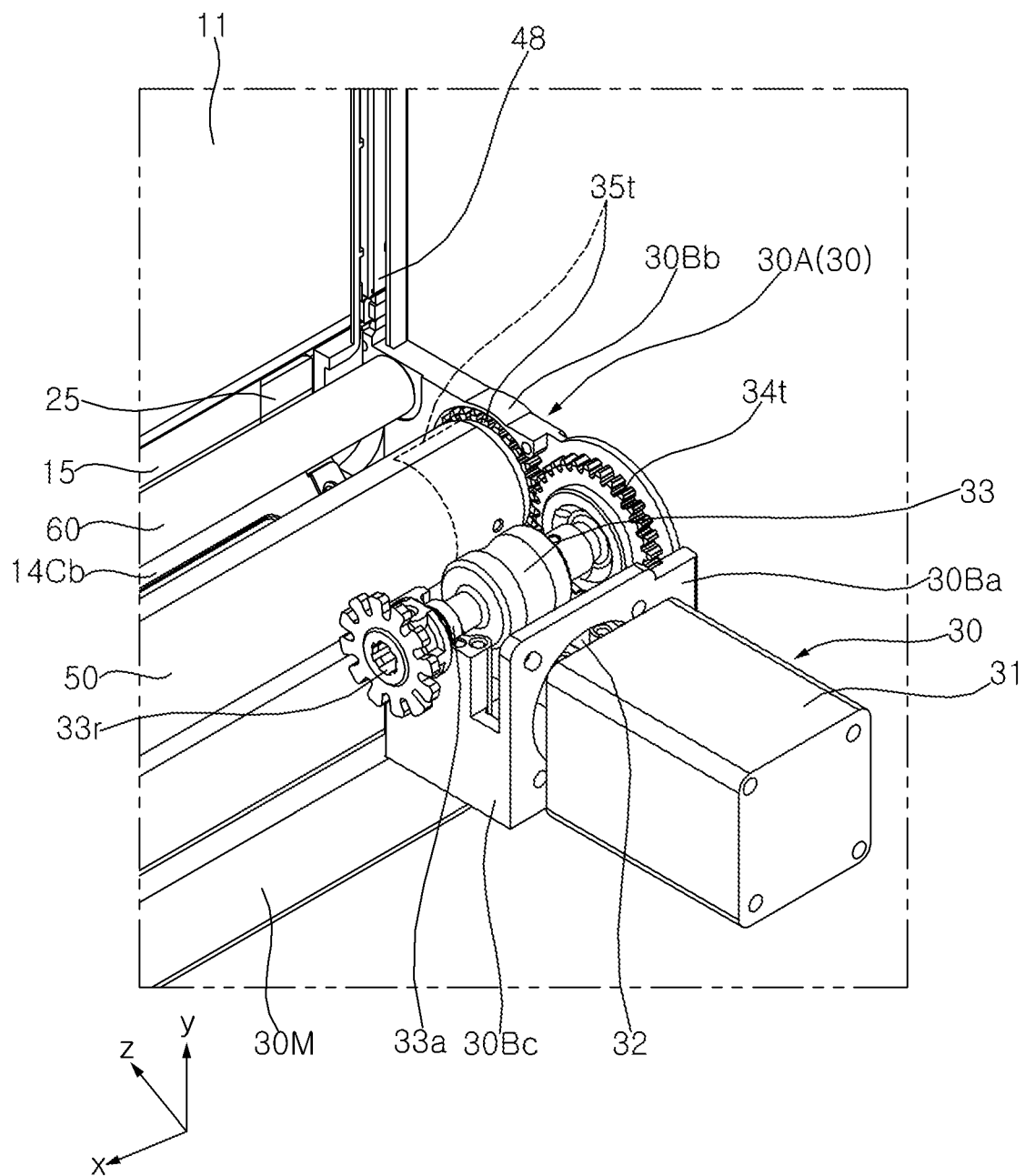
Figure 34:
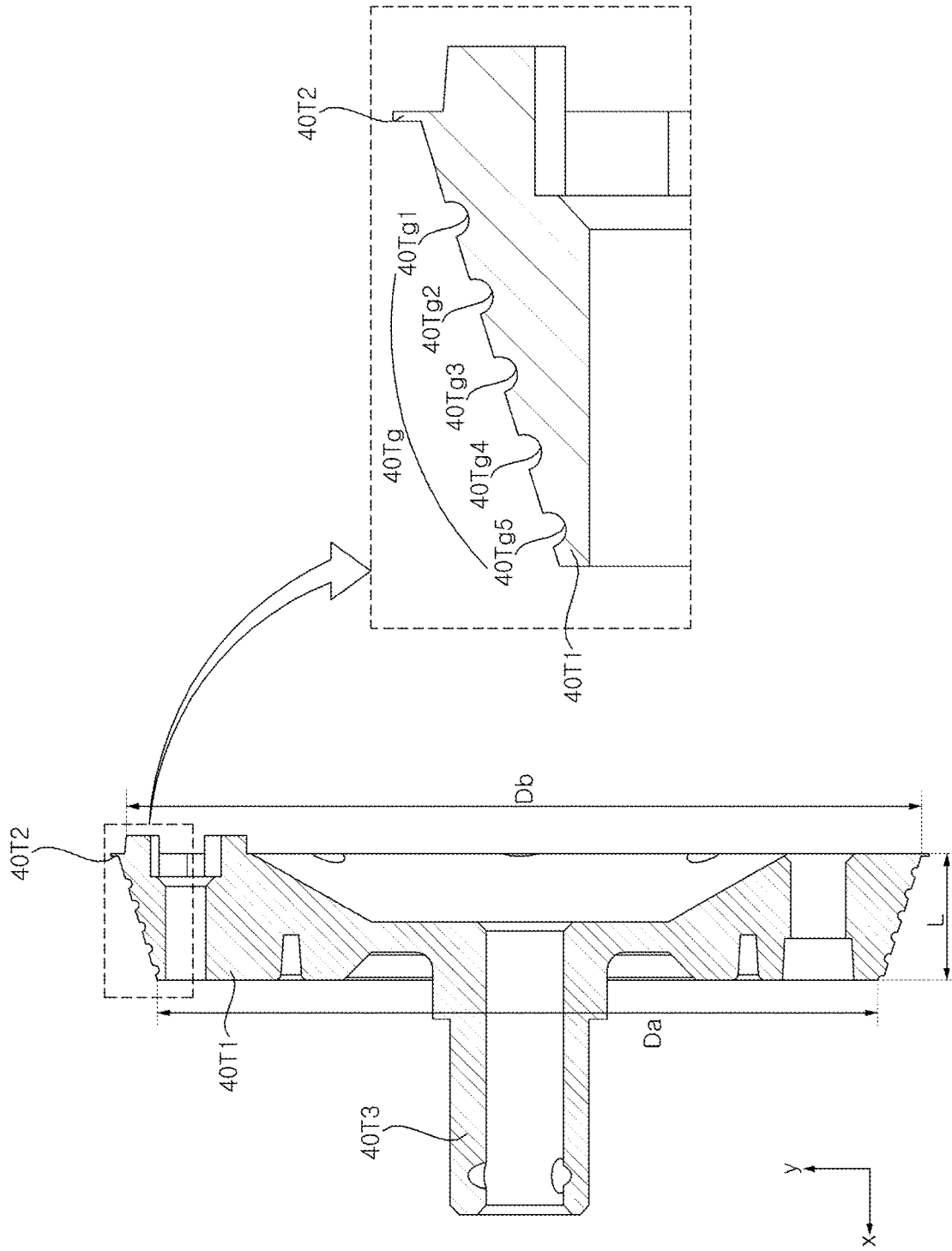

Referring to FIG. 34, the first wire reel 40T may have an overall flat truncated cone shape. The first wire reel 40T may include a first inner part 40T1, a first outer part 40T2, and a first middle part 40T3. The first inner part 40T1 may face the first side part 30Bb, and the first outer part 40T2 may opposite to the first side part 30Bb with respect to the first inner part 40T1. The first middle part 40T3 may protrude from the first inner part 40T1, and penetrate the first side part 30Bb. The worm wheel 33 (or the shaft of the first gear 34t) may be fixed to the first wire reel 40T through the first middle part 40T3, and the first wire reel 40T may be rotated together with the worm wheel 33 (see FIG. 33).

The first inner part 40T1, the first outer part 40T2, and the first middle part 40T3 may be separately provided and coupled to each other. Alternatively, at least two of the first inner part 40T1, the first outer part 40T2, and the first middle part 40T3 may be formed as one body. The first inner part 40T1 and the first outer part 40T2 may be collectively referred to as a body 40T1, 40T2.

The diameter of the body 40T1, 40T2 may gradually decrease from outside to inside (i.e. from right to left). The outer surface (i.e. the right surface) of the body 40T1, 40T2 may define the maximum diameter Db of the body 40T1, 40T2. The inner surface (i.e. the left surface) of the body 40T1, 40T2 may define the minimum diameter Da of the body 40T1, 40T2. For example, the maximum diameter Db may be about 46.8 mm and the minimum diameter Da may be about 42.4 mm.

The first groove 40Tg may be formed on an outer circumferential surface of the first wire reel 40T. A diameter of the outer circumferential surface may gradually decrease from the outside to the inside. For example, the first groove 40Tg may be formed on the outer circumferential surface of the first outer part 40T2. The first groove 40Tg may extend in a helix on the outer circumferential surface of the first wire reel 40T with respect to a central axis (i.e. a longitudinal axis) of the first wire reel 40T. The helix may connect a first point adjacent to the outer surface (i.e. the right surface of the first wire reel 40T) of the first wire reel 40T, and a second point adjacent to the inner surface (i.e. the left surface of the first wire reel 40T) of the first wire reel 40T. The first groove 40Tg may include a plurality of paths connected to each other between the first point and the second point. For example, the first groove 40Tg may be divided into five paths according to an angle with respect to the central axis of the first wire reel 40T. The number of paths is not limited to five, and may be less or more than this. For example, the pitch of the paths of the first groove 40Tg may be about 1.25 mm.

A first path 40Tg1 may be a part of the first groove 40Tg extending by 360 degrees from the first point with respect to the central axis of the first wire reel 40T. A second path 40Tg2 may be a part of the first groove 40Tg extending by 360 degrees from the distal end of the first path 40Tg1 with respect to the central axis of the first wire reel 40T. A third path 40Tg3 may be a part of the first groove 40Tg extending by 360 degrees from the distal end of the second path 40Tg2 with respect to the central axis of the first wire reel 40T. A fourth path 40Tg4 may be a part of the first groove 40Tg extending by 360 degrees from the distal end of the third path 40Tg3 with respect to the central axis of the first wire reel 40T. A fifth path 40Tg5 may be a part of the first groove 40Tg extending by 360 degrees from the distal end of the fourth path 40Tg4 with respect to the central axis of the first wire reel 40T, and the distal end of the fifth path 40Tg5 may be formed in the second point.

One end of the first wire 40a (see FIG. 32) may be fixed to the first wire reel 40T, and the first wire 40a may be wound around or unwound from the first groove 40Tg. When the first wire reel 40T rotates in the first rotation direction, the first wire 40a is firstly wound around the first path 40Tg1, and then, may be sequentially wound around the second path 40Tg2, the third path 40Tg3, the fourth path 40Tg4, and the fifth path 40Tg5 (see arrow LD in FIG. 32). When the first wire reel 40T rotates in a second rotation direction opposite to the first rotation direction, the first wire 40a is firstly unwound from the fifth path 40Tg5, and then, may be sequentially unwound from the fourth path 40Tg4, the third path 40Tg3, the second path 40Tg2, and the first path 40Tg1 (see DD in FIG. 32).

For example, the diameter of the path of the first groove 40Tg may be equal to or larger than the diameter of the first wire 40a. For example, the diameter of the path of the first groove 40Tg may be 0.64 mm, and the diameter of the first wire 40a may be 0.6 mm.

Figure 30:
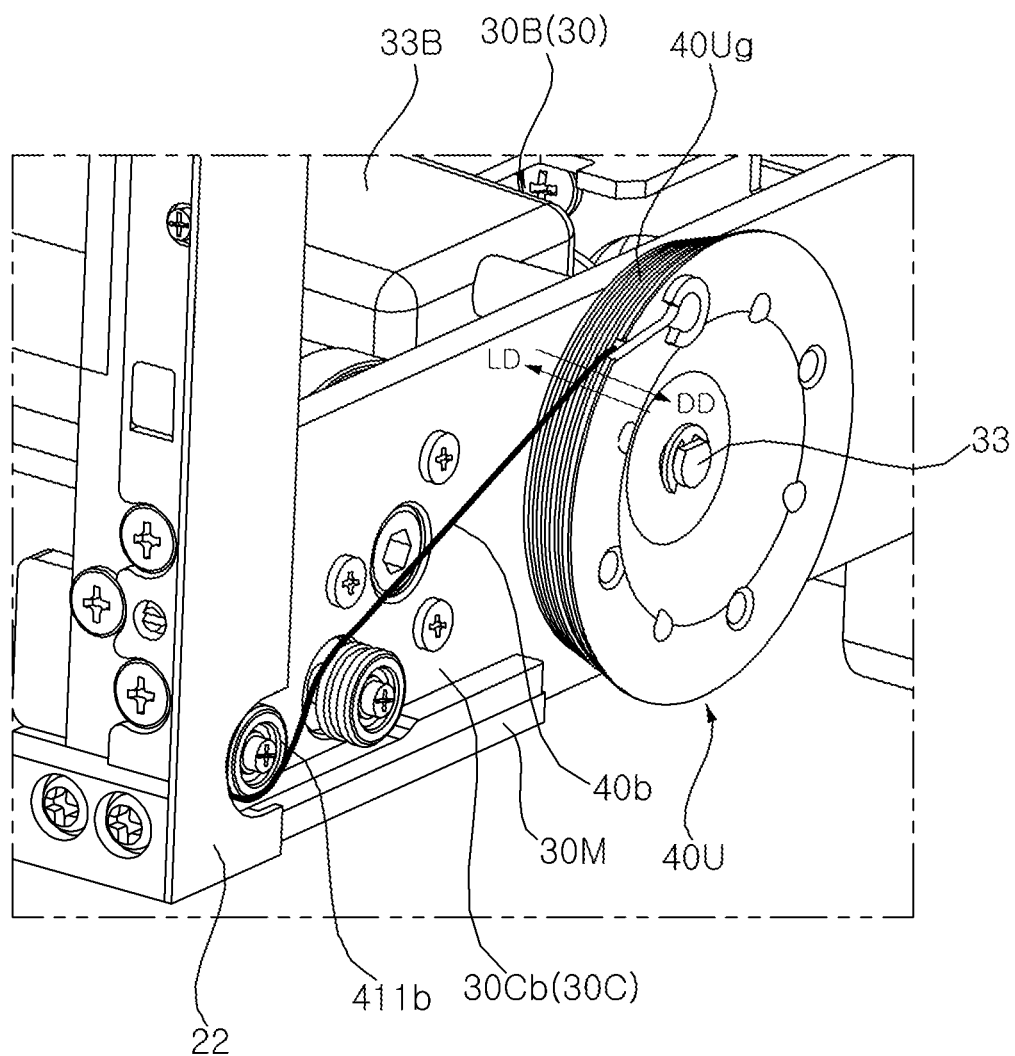

The second wire reel 40U (see FIG. 30) may be left-right symmetrical with the first wire reel 40T, and the description of the first wire reel 40T and the first wire 40a may be applied to the second wire reel 40U and the second wire 40b (see FIG. 30). The first wire reel 40T may be referred to as a first reel 40T, a first wire drum 40T, or a helical & tapered type first wire drum 40T. The second wire reel 40U may be referred to as a second reel 40U, a second wire drum 40U, or a helical & tapered type second wire drum 40U. The first wire reel 40T and the second wire reel 40U may include a plastic or POM material.

One end of the second wire 40b may be fixed to the second wire reel 40U, and the second wire 40b may be wound around or unwound from the second groove 40Ug (see FIG. 30). When the second wire reel 40U rotates in the first rotation direction, the second wire 40b may be firstly wound around the outermost (i.e. left) path among paths of the second groove 40Ug of the second wire reel 40U, and then sequentially wound around the remaining paths from outside to inside (i.e. from left to right) (see arrow LD in FIG. 30). When the second wire reel 40U rotates in a second rotation direction opposite to the first rotation direction, the second wire 40b may be firstly unwound from the innermost (i.e. right) path among the paths of the second groove 40Ug, and then unwound sequentially from the remaining paths from inside to outside (i.e. right to left) (see arrow DD in FIG. 30).

Accordingly, the wires 40a and 40b may be sequentially wound around and unwound from the paths of the wire reels 40R and 40U. Since a part of the first wire 40a wound later around the first wire reel 40T does not overlap a part of the first wire 40a wound firstly around the first wire reel 40T, when the first wire 40a is wound around or unwound from the first wire reel 40T, noise due to overlapping of the wires may not be generated, which is the same for the second wire reel 40U and the second wire 40b. In addition, it is possible to prevent wear of the wires 40a and 40b due to overlapping of the wires. In addition, the length (i.e. the amount of winding of the first wire 40a) of the first wire 40a wound around the first wire reel 40T and the length (i.e. the amount of winding of the second wire 40b) of the second wire 40b wound around the second wire reel 40U may be equalized, and as a result, the balance of the bar 52 fixed to the wires 40a and 40b may be maintained.

Figure 31:
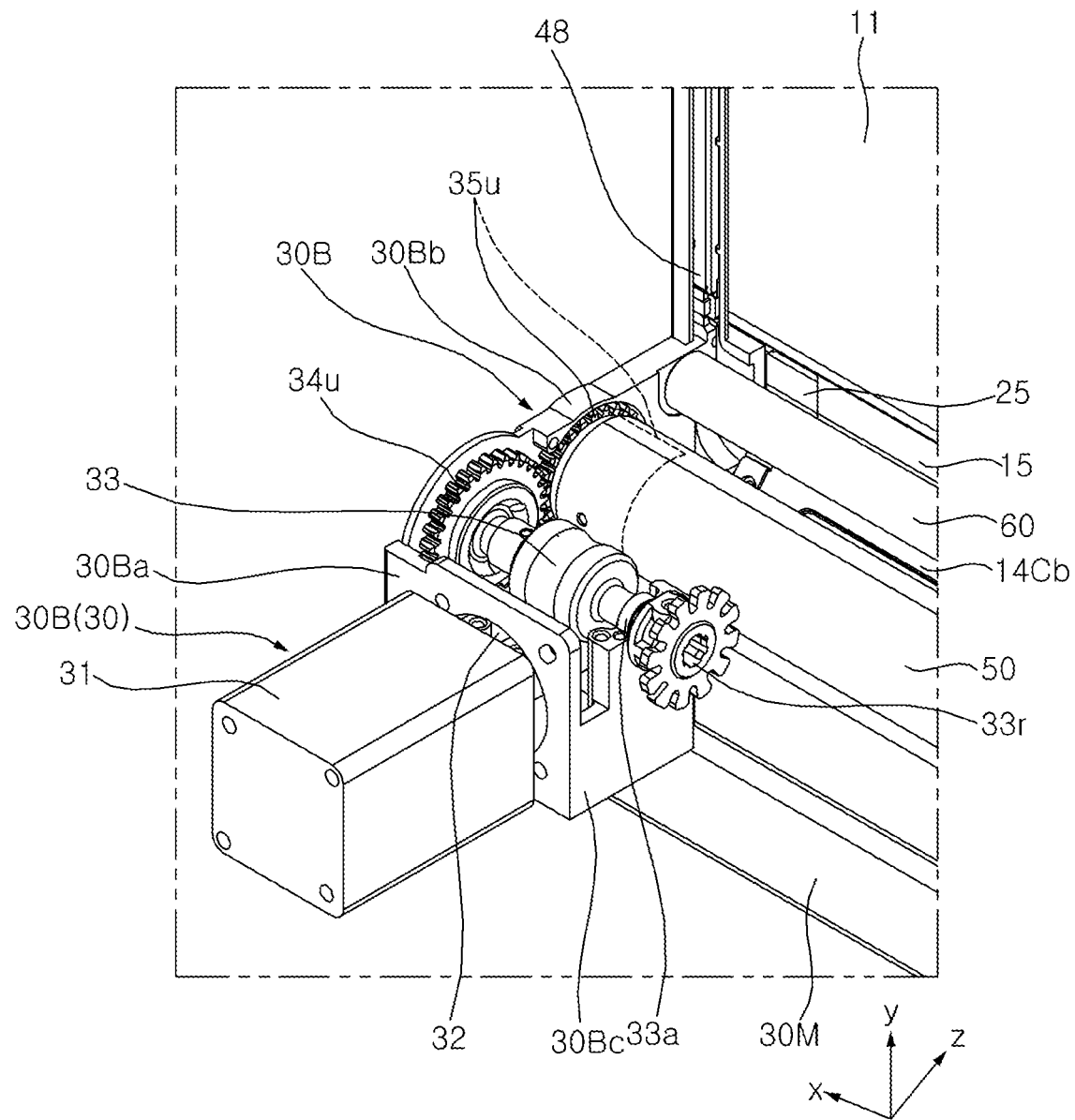
Figure 32:
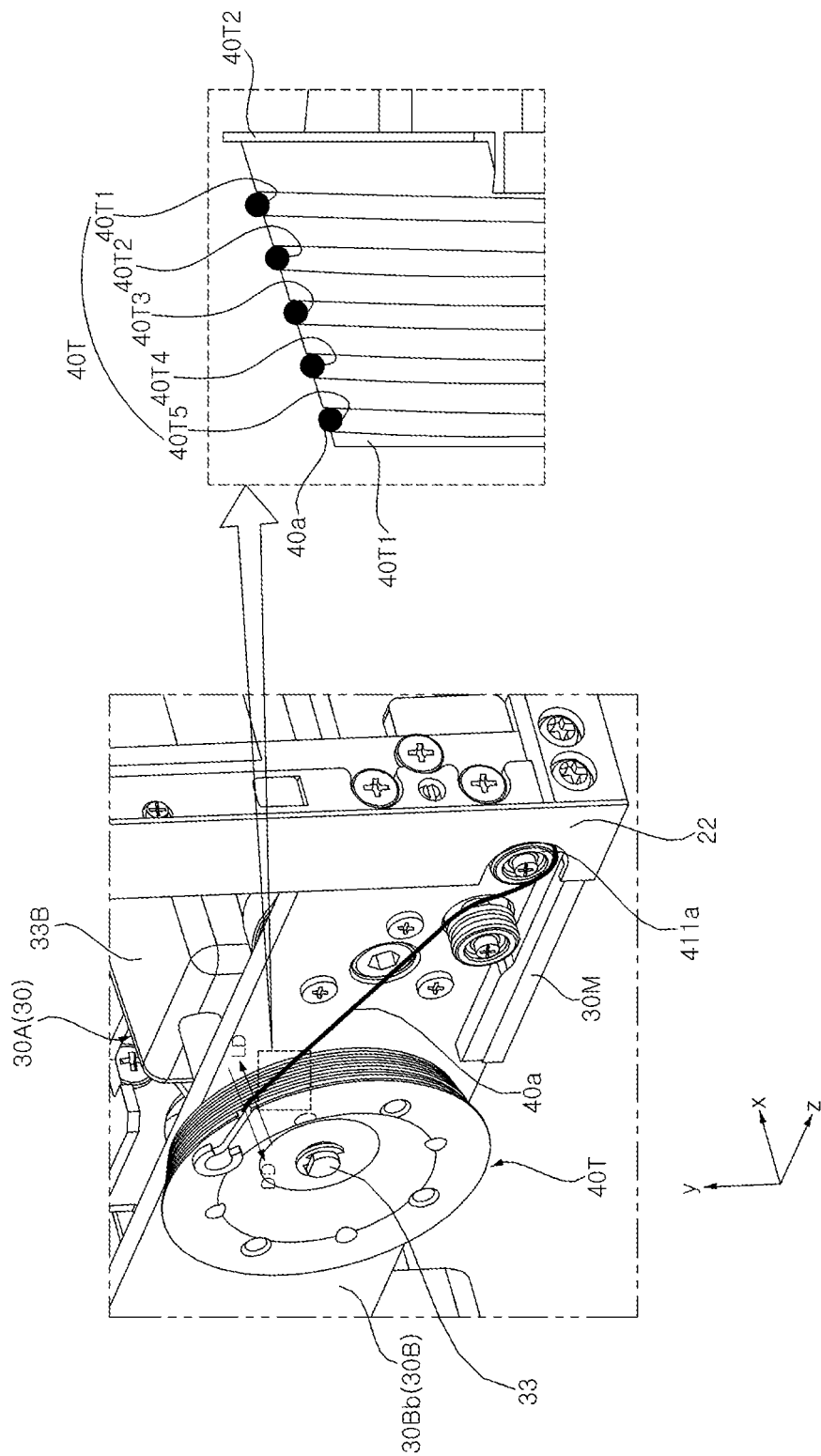

Meanwhile, the roller 50 may be rotated in the opposite direction to the wire reels 40T and 40U (see FIGS. 32 and 30) by the first gear (34t, see FIG. 33; 34u, see FIG. 31). The cover 51 may be wound around the outer circumferential surface of the roller 50 a plurality of times. With respect to the central axis (i.e. the longitudinal axis) of the roller 50, the radius of the cover 51 firstly wound around the roller 50 may be smaller than the radius of the cover 51 wound later around the roller 50. When the roller 50 on which the cover 51 is wound in several layers rotates by 360 degrees, the cover 51 may be unwound from the roller 50 by a first length. Then, when the roller 50 is further rotated by 360 degrees, the cover 51 may be unwound from the roller 50 by a second length. Here, the second length may be smaller than the first length.

At this time, it may be necessary to match the length (or the length of the cover 51 wound around the roller 50) of the cover 51 unwound from the roller 50 with the length (or the length of the wires 40a and 40b unwound from the wire reels 40T and 40U) of the wires 40a and 40b wound around the wire reels 40T and 40U. With respect to the central axis of the wire reels 40T and 40U, the radius of the path (path located relatively outside) of the grooves 40Tg and 40Ug on which the wires 40a and 40b are wound firstly may be larger than the radius of the path (path located relatively inside) of the grooves 40Tg and 40Ug on which the wires 40a and 40b are wound later. For example, the radius of the outer circumferential surface of the wire reels 40T and 40U may gradually decrease from the outer surface toward the inner surface, and the grooves 40Tg and 40Ug may be formed in a helix on the outer circumferential surface of the wire reels 40T and 40U.

Referring to FIGS. 32 and 33, for example, while the first wire reel 40T and the roller 50 rotate by 360 degrees in opposite directions, the first wire 40a may be wound around the first path 40Tg1, and the cover 51 may be unwound from the roller 50 by a first length. The length of the first path 40Tg1 may be equal to or slightly larger than the first length.

Subsequently, while the first wire reel 40T and the roller 50 further rotate by 360 degrees in opposite directions, the first wire 40a may be wound around the second path 40Tg2, and the cover 51 may be unwound from the roller 50 by a second length. The second length may be smaller than the first length, and the length of the second path 40Tg2 may be equal to or slightly larger than the second length.

Subsequently, while the first wire reel 40T and the roller 50 further rotate by 360 degrees in opposite directions, the first wire 40a may be wound around the third path 40Tg3, and the cover 51 may be unwound from the roller 50 by a third length. The third length may be smaller than the second length, and the length of the third path 40Tg3 may be equal to or slightly larger than the third length.

Subsequently, while the first wire reel 40T and the roller 50 further rotate by 360 degrees in opposite directions, the first wire 40a may be wound around the fourth path 40Tg4, and the cover 51 may be unwound from the roller 50 by a fourth length. The fourth length may be smaller than the third length, and the length of the fourth path 40Tg4 may be equal to or slightly larger than the fourth length.

Subsequently, while the first wire reel 40T and the roller 50 further rotate by 360 degrees in opposite directions, the first wire 40a may be wound around the fourth path 40Tg4, and the cover 51 may be unwound from the roller 50 by a fifth length. The fifth length may be smaller than the fourth length, and the length of the fifth path 40Tg5 may be equal to or slightly larger than the fifth length.

Accordingly, the amount of winding and unwinding of the wires 40a and 40b may be matched with the amount of unwinding and winding of the cover 51. That is, while the wire reels 40T and 40U and the roller 50 rotate, the cover 51 may be unwound from or wound around the roller 50 by a length corresponding to a length by which the wires 40a and 40b are wound around or unwound from the wire reels 40T and 40U. As a result, the cover 51 unwound from the roller 50 may remain taut. In addition, the helical tapered type wire drums (40T, 40U, see FIGS. 30 and 33) may be beneficial in reducing a length L (see FIG. 34) in comparison with the helical normal type wire drums (40R, 40S, see FIGS. 26 and 28).

In comparison, if the radii of the grooves 40T, 40U in the wire reels 40T, 40U are constant despite the fact that the wire reels 40T, 40U and the roller 50 are rotated together through the engagement structure of the gears (34t, 35t; 34u, 35u), the cover 51 may be unwound from the roller 50 by a length larger than the length by which the wires 40a, 40b are wound around the wire reels 40T, 40U. As a result, the cover 51 unwound from the roller 50 may not be taut in a bulging shape.

Figure 35:
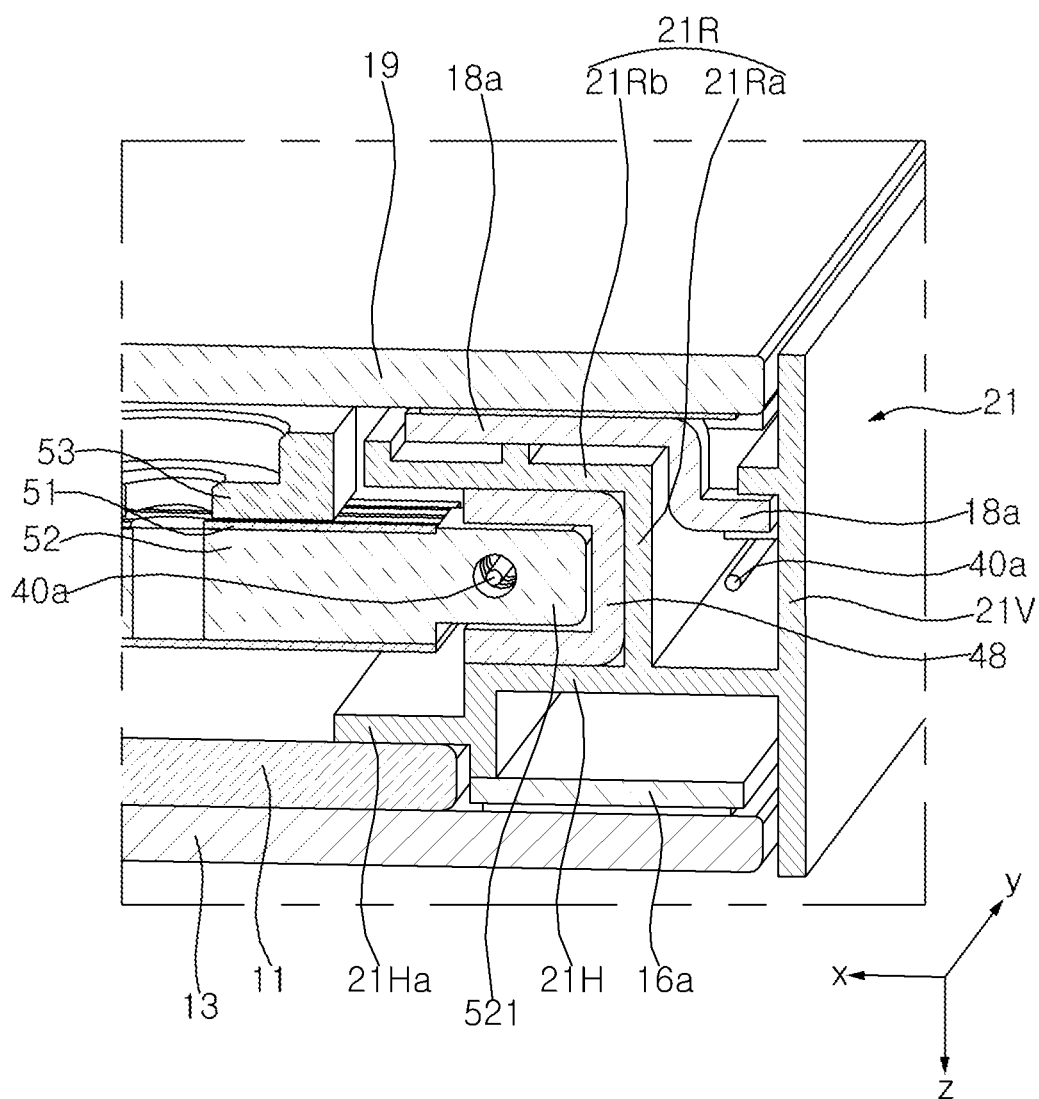
Figure 36:
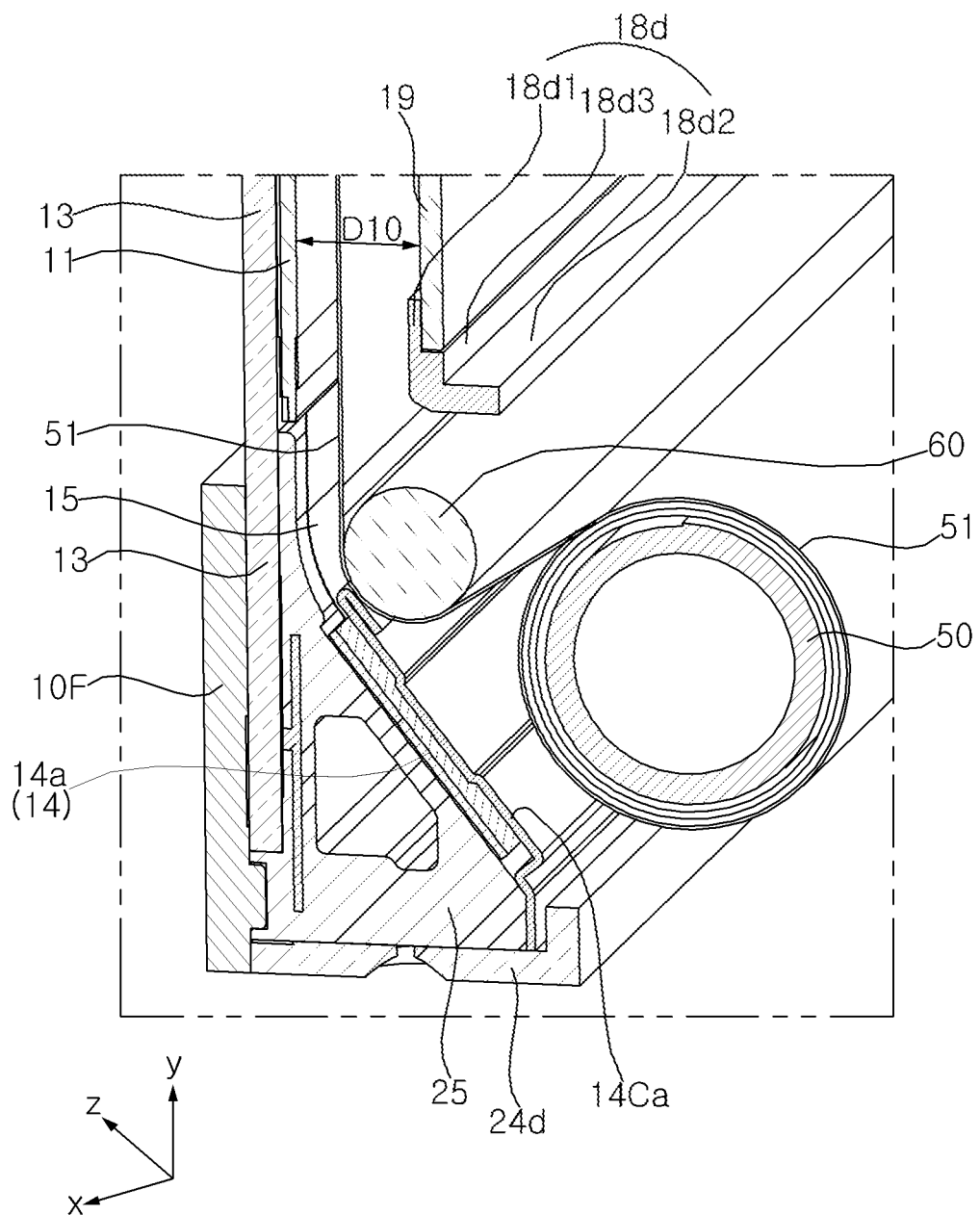

Referring to FIGS. 35 and 36, a back cover 19 may be coupled to the side frame 21 through a cover frame 18a, 18d, and may be located in the rear of the display panel 11. The back cover 19 may be made of transparent glass. The bar 52 to which the cover 51 is fixed and the coupler 53 may rise or fall in a space (see reference numeral D10 in FIG. 23) between the display panel 11 and the back cover 19.

The cover 51 may be hung on the sub roller 60, and may be located parallel to the display panel 11 at between the display panel 11 and the back cover 19.

Figure 37:
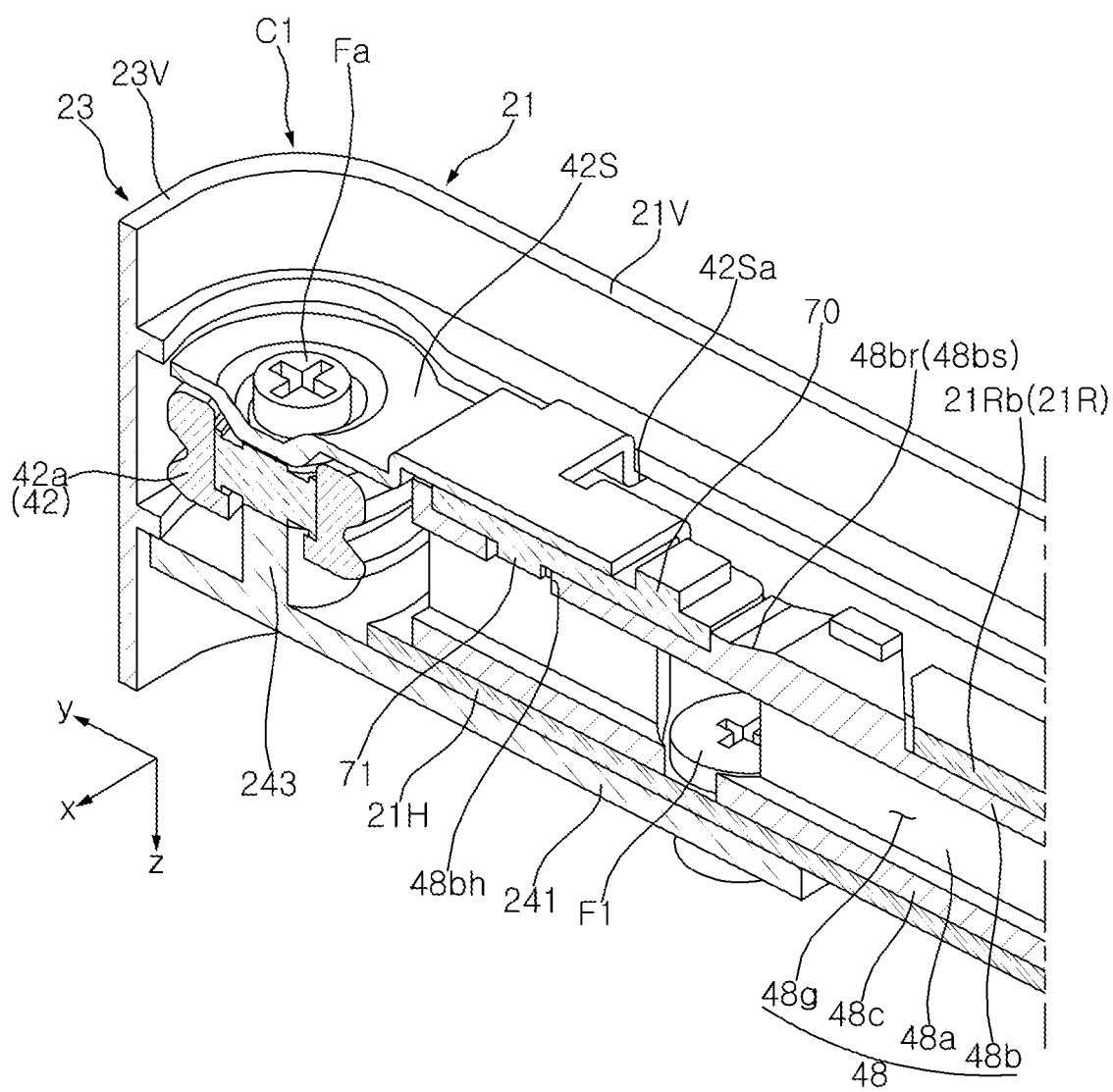
Figure 38:
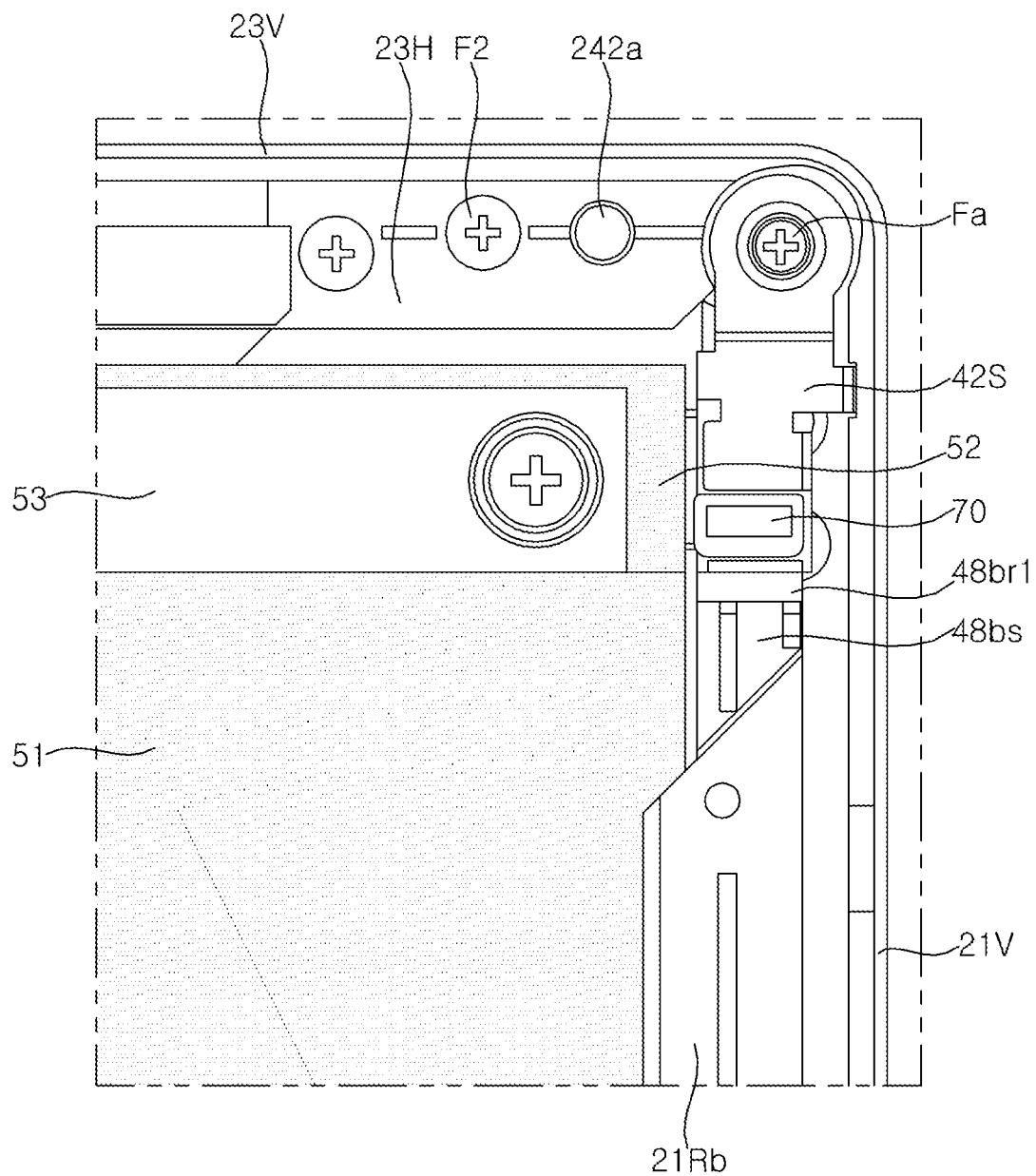

Referring to FIGS. 37 and 38, a sensor 70 may be mounted on a seating portion 48bs forming an upper portion of the first rail 48. A sensing unit 71 of the sensor 70 may be provided on one surface of the substrate of the sensor 70 facing the first rail 48, and may face the first guide groove 48*g* of the first rail 48 through a sensor hole 48*bh* of the first rail 48.

For example, the sensor 70 may be a proximity sensor. The sensor 70 may emit an electromagnetic field or electromagnetic waves (e.g. infrared rays), and may receive the electric field and a return signal. An object sensed by the sensor 70 may be the first portion 521 (see FIG. 35) of the bar 52 moving along the first guide groove 48*g*. When the first portion 521 is made of a metal material, the sensor 70 may be an inductive sensor. When the first portion 521 is made of a plastic material, the sensor 70 may be a capacitive sensor or a photoelectric sensor. For another example, the sensor 70 may be a photosensor.

Accordingly, the sensor 70 may detect the first portion 521 moving along the first guide groove 48*g*.

Referring to FIG. 37, for example, when the sensor 70 does not detect the first portion 521, the controller C (see FIG. 2) may continuously raise the cover 51 in response to a deployment operation of raising the cover 51.

Referring to FIG. 38, for example, when the sensor 70 detects the first portion 521, the controller C (see FIG. 2) determines that the cover 51 has risen to the maximum, and stops the deployment operation.

The above-mentioned sensor 70 may be installed not only in the upper portion of the first rail 48 but also in the upper portion of the second rail 49. Alternatively, the sensor 70 may be installed in the upper portion of the second rail 49, instead of the upper portion of the first rail 48.

Figure 39:
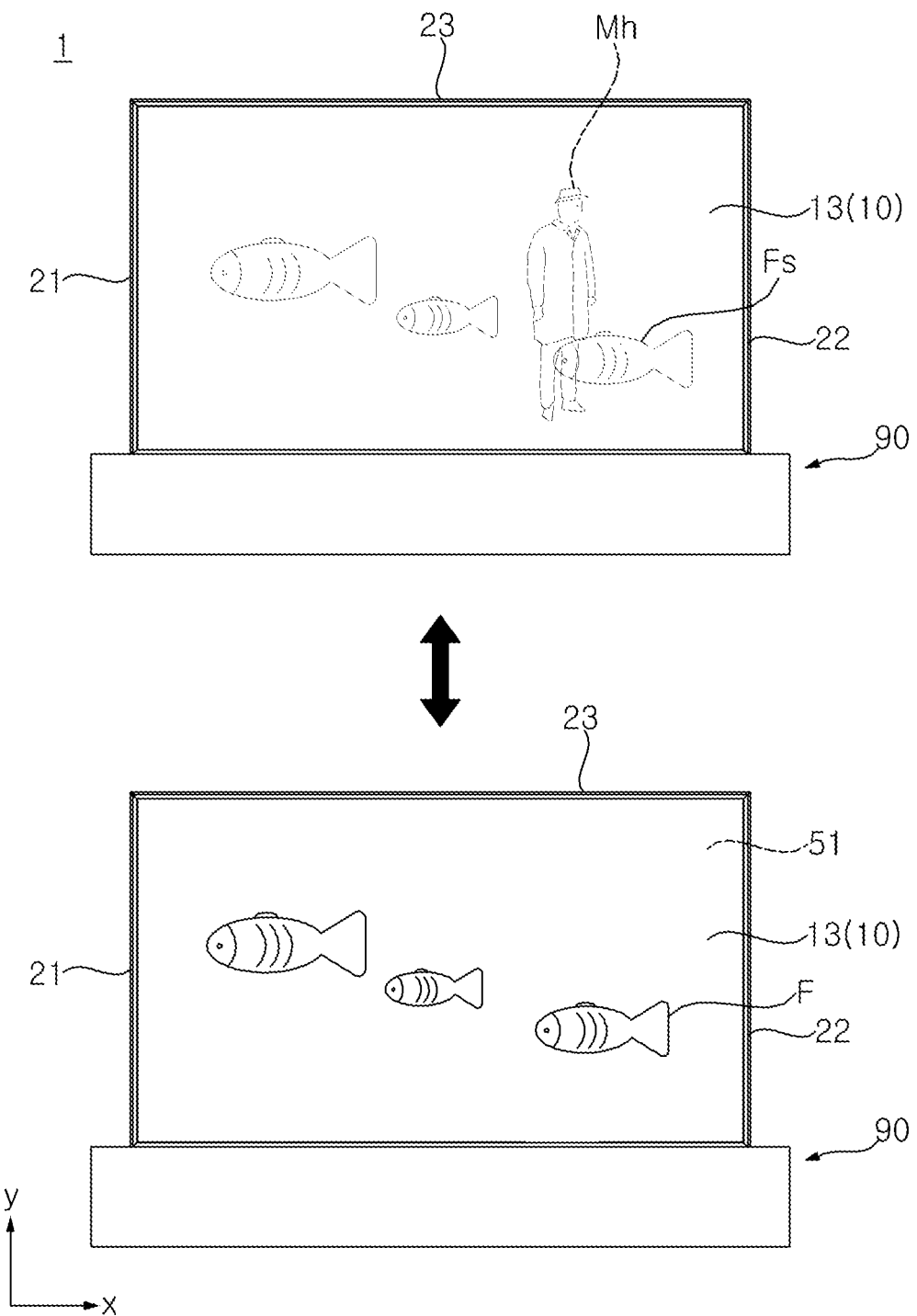

Referring to the upper drawing of FIG. 39, the cover 51 may not cover the rear of the display 10. For example, the display 10 may not output an image, and a user in front of the display 10 may see a rear of the display 10 (see the man wearing a hat Mh indicated by a dotted line). As another example, the display 10 may output an image, and a user in front of the display 10 may see the image (see the fish Fs indicated by a solid line) and the rear of the display 10 (see the man wearing a hat Mh indicated by a dotted line). Such a mode may be referred to as a light transmission mode.

Referring to the lower drawing of FIG. 39, the cover 51 may cover the rear of the display 10. The display 10 may or may not output an image, and a user in front of the display 10 cannot see the rear of the display 10. Such a mode may be referred to as a light blocking mode. The visibility of the image output from the display 10 in the light blocking mode may be enhanced than the visibility of the image output from the display 10 in the light transmission mode (see comparison of fish Fs indicated by thin line and fish F indicated by thick line in FIG. 39).

Figure 40:
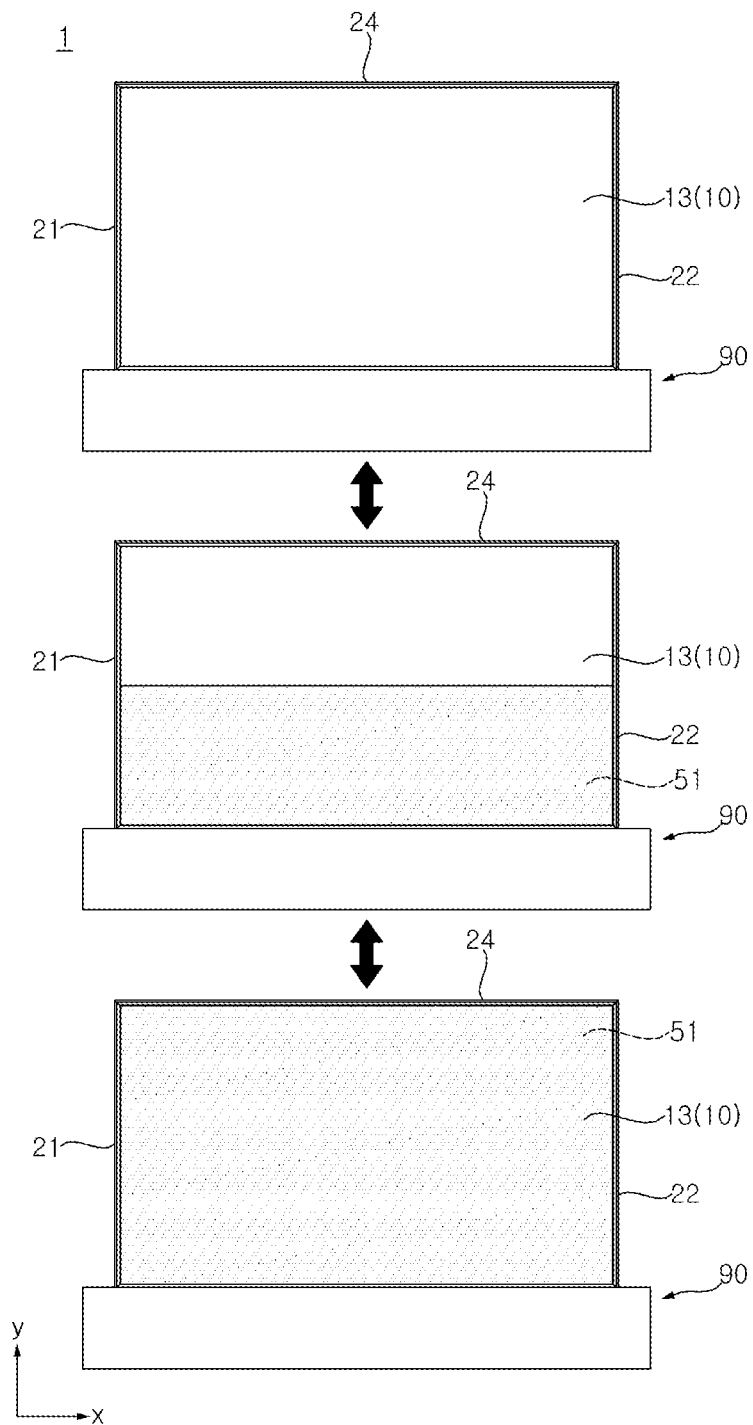

Referring to the upper drawing of FIG. 40, the cover 51 may not cover the rear of the display 10. Such a mode may be referred to as a full light transmission mode.

Referring to the middle drawing of FIG. 40, the cover 51 may cover a part of the rear of the display 10. Such a mode may be referred to as a partial light blocking mode or a partial light transmission mode.

Referring to the lower drawing of FIG. 40, the cover 51 may entirely cover the rear of the display 10. Such a mode may be referred to as a full light blocking mode.

The controller C of the display device 1 (see FIG. 2) may switch the light blocking or transmission mode of the display 10 by adjusting the position of the cover 51.

Referring to FIGS. 1 to 40, a display device according to an aspect of the present disclosure may include: a display panel displaying an image, and having a light transmittance; a frame to which the display panel is coupled; a roller extending along one side of the display panel, and rotatably coupled to the frame; a cover unwound from or wound around the roller; a bar which extends along the roller, which is positioned behind the display panel, to which one end of the cover is fixed, and which is movably coupled to the frame; a pair of reels which opposite each other with respect to the roller, and which are coupled to the frame; a driving assembly which rotates the pair of reels; and a pair of wires which are wound around or unwound from the pair of reels, and which are fixed to the bar, wherein the reel may include a groove which is formed in a helix shape on an outer circumferential surface of the reel, and around which the wire is wound or from which the wire is unwound.

The groove may be divided into a plurality of paths according to an angle with respect to a central axis of the reel, and the wire may be sequentially wound around or unwound from the plurality of paths.

The outer circumferential surface of the reel may be formed between a first side surface and a second side surface of the reel, and a diameter of the reel may be maintained constant between the first side surface and the second side surface of the reel.

The reel may have a cylindrical shape.

The roller may include: a fixed cap fixed to one side of the frame; a roller body which extends in a longitudinal direction of the roller, and from which the cover unwound or around which the cover wound, the roller body having one end rotatably coupled to the fixed cap and the other end rotatably coupled to the other side of the frame; and a coil spring located inside the roller body, the coil spring which is fixed to one end fixed to the fixed cap and the other end of the roller body, and the coil spring may be elastically deformed when the cover is unwound from the roller body.

The roller may further include a shaft which is located inside the roller body, and around which the coil spring is wound.

driving assembly may include: a motor; and a gear for transmitting a power of the motor to the reel.

The outer circumferential surface of the reel may be formed between a first side surface and a second side surface of the reel, and a diameter of the reel may become smaller from the first side surface of the reel to the second side surface.

The reel may have a truncated cone shape.

With respect to a central axis of the roller, a radius of the cover firstly wound around the roller may be smaller than a radius of the cover later wound around the roller, and the wire may be wound around the groove in a direction from the first side surface toward the second side surface and pulls the cover so that the cover is unwound from the roller.

While the reel and the roller rotate at a specific angle, the wire may be wound around the groove by a first length and the cover is unwound from the roller by a second length, and the first length may correspond to the second length.

The driving assembly may include: a motor; and gears which transmit a power of the motor to the reel and the roller.

The gears may include: a first gear engaged with a rotation axis of the motor, and fixed to the reel; and a second gear engaged with the first gear, and fixed to the roller.

The pair of reels may include: a first reel adjacent to one end of the roller; and a second reel adjacent to the other end of the roller, and the pair of wires may include: a first wire fixed to the bar adjacent to one end of the bar; and a second wire fixed to the bar adjacent to the other end of the bar, and the display device may further include: a first pulley having a first guide pulley adjacent to the first reel and a first upper pulley adjacent to the other side of the display panel, the first pulley on which a portion of the first wire is hung; and a second pulley having a second guide pulley adjacent to the second reel and a second upper pulley adjacent to the other side of the display panel, the second pulley on which a portion of the second wire is hung.

The bar may include: a first portion which defines one end of the bar, and into which a portion of a first wire of the pair of wires is inserted; and a second portion which defines the other end of the bar, and into which a portion of a second wire of the pair of wires is inserted, and the display device may further include: a first fastening member fastened to the first portion, and pressing the portion of the first wire toward an inside of the first portion; and a second fastening member fastened to the second portion, and pressing the part of the second wire toward an inside of the second portion.

The display device may further include a coupler coupled to the bar, and the portion of the first wire and the portion of the second wire may be sandwiched between the bar and the coupler.

The cover may cover the rear surface of the display panel while moving in a first direction, and may open the rear surface of the display panel while moving in a second direction opposite to the first direction.

Effects of the display device according to the present disclosure are described as follows.

According to at least one of the embodiments of the present disclosure, it is possible to provide a display device having a transparent display panel.

According to at least one of the embodiments of the present disclosure, it is possible to provide a cover for opening or closing the rear of a transparent display panel and a mechanism thereof.

According to at least one of the embodiments of the present disclosure, it is possible to provide a structure capable of minimizing noise and wear that may occur during movement of a cover.

According to at least one of the embodiments of the present disclosure, it is possible to provide a structure capable of minimizing the inclination of a cover to one side.

According to at least one of the embodiments of the present disclosure, it is possible to provide a structure capable of applying tension to a cover unwound from a roller.

According to at least one of the embodiments of the present disclosure, it is possible to provide a structure capable of matching the length of a cover being unwound from a roller and the length of a wire being wound around a reel.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

The foregoing embodiments are merely examples and are not to be considered as limiting the present disclosure. The scope of the present disclosure should be determined by rational interpretation of the appended claims, and all modifications within the equivalents of the disclosure are intended to be included within the scope of the present disclosure.

What is claimed is:

1. A display device comprising:
   a display panel displaying an image, and having a light transmittance;
   a frame to which the display panel is coupled;
   a roller extending along one side of the display panel, and rotatably coupled to the frame;
   a cover unwound from or wound around the roller;
   a bar which extends along the roller, which is positioned behind the display panel, to which one end of the cover is fixed, and which is movably coupled to the frame;
   a pair of reels which opposite each other with respect to the roller, and which are coupled to the frame;
   a driving assembly which rotates the pair of reels; and
   a pair of wires which are wound around or unwound from the pair of reels, and which are fixed to the bar,
   wherein the reel comprises a groove which is formed in a helix shape on an outer circumferential surface of the reel, and around which the wire is wound or from which the wire is unwound.

2. The display device of claim 1, wherein the groove is divided into a plurality of paths according to an angle with respect to a central axis of the reel,
   wherein the wire is sequentially wound around or unwound from the plurality of paths.

3. The display device of claim 1, wherein the outer circumferential surface of the reel is formed between a first side surface and a second side surface of the reel,
   wherein a diameter of the reel is maintained constant between the first side surface and the second side surface of the reel.

4. The display device of claim 1, wherein the reel has a cylindrical shape.

5. The display device of claim 3, wherein the roller comprises:
   a fixed cap fixed to one side of the frame;
   a roller body which extends in a longitudinal direction of the roller, and from which the cover unwound or around which the cover wound, the roller body having one end rotatably coupled to the fixed cap and the other end rotatably coupled to the other side of the frame; and
   a coil spring located inside the roller body, the coil spring which is fixed to one end fixed to the fixed cap and the other end of the roller body,
   wherein the coil spring is elastically deformed when the cover is unwound from the roller body.

6. The display device of claim 5, wherein the roller further comprises a shaft which is located inside the roller body, and around which the coil spring is wound.

7. The display device of claim 3, wherein the driving assembly comprises:
   a motor; and
   a gear for transmitting a power of the motor to the reel.

8. The display device of claim 1, wherein the outer circumferential surface of the reel is formed between a first side surface and a second side surface of the reel,
   wherein a diameter of the reel becomes smaller from the first side surface of the reel to the second side surface.

9. The display device of claim 1, wherein the reel has a truncated cone shape.

10. The display device of claim 8, wherein, with respect to a central axis of the roller, a radius of the cover firstly wound around the roller is smaller than a radius of the cover later wound around the roller, and the wire is wound around the groove in a direction from the first side surface toward the second side surface and pulls the cover so that the cover is unwound from the roller.

11. The display device of claim 10, wherein, while the reel and the roller rotate at a specific angle, the wire is wound around the groove by a first length and the cover is unwound from the roller by a second length, wherein the first length corresponds to the second length.

12. The display device of claim 8, wherein the driving assembly comprises:

a motor; and gears which transmit a power of the motor to the reel and the roller.

13. The display device of claim 12, wherein the gears comprise:

a first gear engaged with a rotation axis of the motor, and fixed to the reel; and a second gear engaged with the first gear, and fixed to the roller.

14. The display device of claim 1, wherein the pair of reels comprise:

a first reel adjacent to one end of the roller; and a second reel adjacent to the other end of the roller, wherein the pair of wires comprise:

a first wire fixed to the bar adjacent to one end of the bar; and a second wire fixed to the bar adjacent to the other end of the bar, and further comprise:

a first pulley having a first guide pulley adjacent to the first reel and a first upper pulley adjacent to the other side of the display panel, the first pulley on which a portion of the first wire is hung; and a second pulley having a second guide pulley adjacent to the second reel and a second upper pulley adjacent to the other side of the display panel, the second pulley on which a portion of the second wire is hung.

15. The display device of claim 1, wherein the bar comprises:

a first portion which defines one end of the bar, and into which a portion of a first wire of the pair of wires is inserted; and a second portion which defines the other end of the bar, and into which a portion of a second wire of the pair of wires is inserted, and further comprises:

a first fastening member fastened to the first portion, and pressing the portion of the first wire toward an inside of the first portion; and a second fastening member fastened to the second portion, and pressing the portion of the second wire toward an inside of the second portion.

\* \* \* \* \*